United States Patent
Schumacher et al.

(10) Patent No.: US 8,332,366 B2
(45) Date of Patent: Dec. 11, 2012

(54) SYSTEM AND METHOD FOR AUTOMATIC WEIGHT GENERATION FOR PROBABILISTIC MATCHING

(75) Inventors: Scott Schumacher, Northridge, CA (US); Scott Ellard, Marietta, GA (US); Norman S. Adams, Cave Creek, AZ (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 11/809,792

(22) Filed: Jun. 1, 2007

(65) Prior Publication Data

US 2008/0005106 A1 Jan. 3, 2008

Related U.S. Application Data

(60) Provisional application No. 60/810,396, filed on Jun. 2, 2006.

(51) Int. Cl.
*G06F 7/00* (2006.01)
*G06F 17/30* (2006.01)

(52) U.S. Cl. .......................................... 707/688; 707/748
(58) Field of Classification Search ................... 707/2–7, 707/101, 688, 736, 737, 748; 703/2; 706/45, 706/52; 702/179; 704/243; 382/170; 705/33
See application file for complete search history.

(56) References Cited

U.S. PATENT DOCUMENTS

| | | | |
|---|---|---|---|
| 4,531,186 A | 7/1985 | Knapman | |
| 5,020,019 A | 5/1991 | Ogawa | |
| 5,134,564 A * | 7/1992 | Dunn et al. | 705/33 |
| 5,247,437 A | 9/1993 | Vale et al. | |
| 5,321,833 A | 6/1994 | Chang et al. | |
| 5,323,311 A | 6/1994 | Fukao et al. | |
| 5,333,317 A | 7/1994 | Dann | |
| 5,381,332 A | 1/1995 | Wood | |
| 5,442,782 A | 8/1995 | Malatesta et al. | |

(Continued)

FOREIGN PATENT DOCUMENTS

WO 9855947 A1 12/1998

(Continued)

OTHER PUBLICATIONS

International Preliminary Report on Patentability issued in PCT/US2007/013049, mailed Dec. 23, 2008.

(Continued)

*Primary Examiner* — Hung T Vy
(74) *Attorney, Agent, or Firm* — Elissa Y. Wang; Edell, Shapiro & Finnan, LLC

(57) ABSTRACT

Embodiments of the invention provide a system and method of automatically generating weights for matching data records. Each field of a record may be compared by an exact match and/or close matches and each comparison can result in a mathematical score which is the sum of the field comparisons. To sum up the field scores accurately, the automatic weight generation process comprises an iterative process. In one embodiment, initial weights are computed based upon unmatched-set probabilities and default discrepancy weights associated with attributes in the comparison algorithm. A bulk cross-match is performed across the records using the initial weights and a candidate matched set is computed for updating the discrepancy probabilities. New weights are computed based upon the unmatched probabilities and the updated discrepancy probabilities. Test for convergence between the new weights and the old weights. Repeat with the new weight table until the weights converge to their final value.

27 Claims, 14 Drawing Sheets

U.S. PATENT DOCUMENTS

| | | | |
|---|---|---|---|
| 5,497,486 A | 3/1996 | Stolfo et al. | |
| 5,535,322 A | 7/1996 | Hecht | |
| 5,535,382 A | 7/1996 | Ogawa | |
| 5,537,590 A | 7/1996 | Amado | |
| 5,555,409 A | 9/1996 | Leenstra et al. | |
| 5,561,794 A | 10/1996 | Fortier | |
| 5,583,763 A | 12/1996 | Atcheson et al. | |
| 5,600,835 A | 2/1997 | Garland et al. | |
| 5,606,690 A | 2/1997 | Hunter et al. | |
| 5,615,367 A | 3/1997 | Bennett et al. | |
| 5,640,553 A | 6/1997 | Schultz | |
| 5,651,108 A | 7/1997 | Cain et al. | |
| 5,675,752 A | 10/1997 | Scott et al. | |
| 5,675,753 A | 10/1997 | Hansen et al. | |
| 5,694,594 A | 12/1997 | Chang | |
| 5,694,693 A | 12/1997 | Hutchins et al. | |
| 5,710,916 A | 1/1998 | Barbara et al. | |
| 5,734,907 A | 3/1998 | Jarossay et al. | |
| 5,765,150 A | 6/1998 | Burrows | |
| 5,774,661 A | 6/1998 | Chatterjee | |
| 5,774,883 A | 6/1998 | Andersen | |
| 5,774,887 A | 6/1998 | Wolff et al. | |
| 5,778,370 A | 7/1998 | Emerson | |
| 5,787,431 A | 7/1998 | Shaughnessy | |
| 5,787,470 A | 7/1998 | DeSimone et al. | |
| 5,790,173 A | 8/1998 | Strauss | |
| 5,796,393 A | 8/1998 | MacNaughton et al. | |
| 5,805,702 A | 9/1998 | Curry | |
| 5,809,499 A * | 9/1998 | Wong et al. | 707/6 |
| 5,819,264 A | 10/1998 | Palmon et al. | |
| 5,835,712 A | 11/1998 | DuFresne | |
| 5,835,912 A | 11/1998 | Pet | |
| 5,848,271 A | 12/1998 | Caruso et al. | |
| 5,859,972 A | 1/1999 | Subramaniam et al. | |
| 5,862,322 A | 1/1999 | Anglin et al. | |
| 5,862,325 A | 1/1999 | Reed et al. | |
| 5,878,043 A | 3/1999 | Casey | |
| 5,893,074 A | 4/1999 | Hughes et al. | |
| 5,893,110 A | 4/1999 | Weber et al. | |
| 5,905,496 A | 5/1999 | Lau et al. | |
| 5,930,768 A | 7/1999 | Hooban | |
| 5,960,411 A | 9/1999 | Hartman et al. | |
| 5,963,915 A | 10/1999 | Kirsch | |
| 5,987,422 A | 11/1999 | Buzsaki | |
| 5,991,758 A * | 11/1999 | Ellard | 707/6 |
| 5,999,937 A | 12/1999 | Ellard | |
| 6,014,664 A | 1/2000 | Fagin et al. | |
| 6,016,489 A | 1/2000 | Cavanaugh et al. | |
| 6,018,733 A | 1/2000 | Kirsch et al. | |
| 6,018,742 A | 1/2000 | Herbert, III | |
| 6,026,433 A | 2/2000 | D'Arlach et al. | |
| 6,049,847 A | 4/2000 | Vogt et al. | |
| 6,067,549 A | 5/2000 | Smalley et al. | |
| 6,069,628 A | 5/2000 | Farry et al. | |
| 6,078,325 A | 6/2000 | Jolissaint et al. | |
| 6,108,004 A | 8/2000 | Medl | |
| 6,134,581 A | 10/2000 | Ismael et al. | |
| 6,185,608 B1 | 2/2001 | Hon et al. | |
| 6,223,145 B1 | 4/2001 | Hearst | |
| 6,269,373 B1 | 7/2001 | Apte et al. | |
| 6,297,824 B1 | 10/2001 | Hearst et al. | |
| 6,298,478 B1 | 10/2001 | Nally et al. | |
| 6,311,190 B1 | 10/2001 | Bayer et al. | |
| 6,327,611 B1 | 12/2001 | Everingham | |
| 6,330,569 B1 | 12/2001 | Baisley et al. | |
| 6,356,931 B2 | 3/2002 | Ismael et al. | |
| 6,374,241 B1 | 4/2002 | Lamburt et al. | |
| 6,385,600 B1 | 5/2002 | McGuinness et al. | |
| 6,389,429 B1 * | 5/2002 | Kane et al. | 707/200 |
| 6,446,188 B1 | 9/2002 | Henderson et al. | |
| 6,449,620 B1 | 9/2002 | Draper | |
| 6,457,065 B1 | 9/2002 | Rich et al. | |
| 6,460,045 B1 | 10/2002 | Aboulnaga et al. | |
| 6,496,793 B1 | 12/2002 | Veditz et al. | |
| 6,502,099 B1 | 12/2002 | Rampy et al. | |
| 6,510,505 B1 | 1/2003 | Burns et al. | |
| 6,523,019 B1 * | 2/2003 | Borthwick | 706/45 |
| 6,529,888 B1 * | 3/2003 | Heckerman et al. | 706/45 |
| 6,556,983 B1 | 4/2003 | Altschuler et al. | |
| 6,557,100 B1 | 4/2003 | Knutson | |
| 6,621,505 B1 | 9/2003 | Beauchamp et al. | |
| 6,633,878 B1 | 10/2003 | Underwood | |
| 6,633,882 B1 * | 10/2003 | Fayyad et al. | 707/101 |
| 6,633,992 B1 | 10/2003 | Rosen | |
| 6,647,383 B1 | 11/2003 | August et al. | |
| 6,662,180 B1 | 12/2003 | Aref et al. | |
| 6,687,702 B2 | 2/2004 | Vaitheeswaran et al. | |
| 6,704,805 B1 | 3/2004 | Acker et al. | |
| 6,718,535 B1 | 4/2004 | Underwood | |
| 6,742,003 B2 | 5/2004 | Heckerman et al. | |
| 6,757,708 B1 | 6/2004 | Craig et al. | |
| 6,795,793 B2 * | 9/2004 | Shayegan et al. | 702/179 |
| 6,807,537 B1 * | 10/2004 | Thiesson et al. | 706/52 |
| 6,842,761 B2 | 1/2005 | Diamond et al. | |
| 6,842,906 B1 | 1/2005 | Bowman-Amuah | |
| 6,879,944 B1 * | 4/2005 | Tipping et al. | 703/2 |
| 6,907,422 B1 | 6/2005 | Predovic | |
| 6,912,549 B2 | 6/2005 | Rotter et al. | |
| 6,922,695 B2 | 7/2005 | Skufca et al. | |
| 6,957,186 B1 | 10/2005 | Guheen et al. | |
| 6,990,636 B2 | 1/2006 | Beauchamp et al. | |
| 6,996,565 B2 | 2/2006 | Skufca et al. | |
| 7,035,809 B2 | 4/2006 | Miller et al. | |
| 7,043,476 B2 | 5/2006 | Robson | |
| 7,099,857 B2 | 8/2006 | Lambert | |
| 7,143,091 B2 | 11/2006 | Charnock et al. | |
| 7,155,427 B1 | 12/2006 | Prothia | |
| 7,181,459 B2 | 2/2007 | Grant et al. | |
| 7,249,131 B2 | 7/2007 | Skufca et al. | |
| 7,330,845 B2 | 2/2008 | Lee et al. | |
| 7,487,173 B2 | 2/2009 | Medicke et al. | |
| 7,526,486 B2 | 4/2009 | Cushman, II et al. | |
| 7,567,962 B2 | 7/2009 | Chakrabarti et al. | |
| 7,620,647 B2 | 11/2009 | Stephens et al. | |
| 7,627,550 B1 | 12/2009 | Adams et al. | |
| 7,685,093 B1 | 3/2010 | Adams et al. | |
| 7,698,268 B1 | 4/2010 | Adams et al. | |
| 7,788,274 B1 | 8/2010 | Ionescu | |
| 2002/0007284 A1 | 1/2002 | Schurenberg et al. | |
| 2002/0073099 A1 | 6/2002 | Gilbert et al. | |
| 2002/0080187 A1 | 6/2002 | Lawton | |
| 2002/0087599 A1 | 7/2002 | Grant et al. | |
| 2002/0095421 A1 | 7/2002 | Koskas | |
| 2002/0099694 A1 | 7/2002 | Diamond et al. | |
| 2002/0152422 A1 | 10/2002 | Sharma et al. | |
| 2002/0156917 A1 | 10/2002 | Nye | |
| 2002/0178360 A1 | 11/2002 | Wenocur et al. | |
| 2003/0004770 A1 | 1/2003 | Miller et al. | |
| 2003/0004771 A1 | 1/2003 | Yaung | |
| 2003/0018652 A1 | 1/2003 | Heckerman et al. | |
| 2003/0023773 A1 | 1/2003 | Lee et al. | |
| 2003/0051063 A1 | 3/2003 | Skufca et al. | |
| 2003/0065826 A1 | 4/2003 | Skufca et al. | |
| 2003/0065827 A1 | 4/2003 | Skufca et al. | |
| 2003/0105825 A1 | 6/2003 | Kring et al. | |
| 2003/0120630 A1 | 6/2003 | Tunkelang | |
| 2003/0145002 A1 * | 7/2003 | Kleinberger et al. | 707/5 |
| 2003/0158850 A1 | 8/2003 | Lawrence et al. | |
| 2003/0174179 A1 | 9/2003 | Suermondt et al. | |
| 2003/0182101 A1 | 9/2003 | Lambert | |
| 2003/0195836 A1 * | 10/2003 | Hayes et al. | 705/37 |
| 2003/0195889 A1 | 10/2003 | Yao et al. | |
| 2003/0195890 A1 | 10/2003 | Oommen | |
| 2003/0220858 A1 | 11/2003 | Lam et al. | |
| 2003/0227487 A1 | 12/2003 | Hugh | |
| 2004/0107189 A1 | 6/2004 | Burdick et al. | |
| 2004/0107205 A1 | 6/2004 | Burdick et al. | |
| 2004/0122790 A1 | 6/2004 | Walker et al. | |
| 2004/0143477 A1 | 7/2004 | Wolff | |
| 2004/0143508 A1 | 7/2004 | Bohn et al. | |
| 2004/0181526 A1 | 9/2004 | Burdick et al. | |
| 2004/0181554 A1 | 9/2004 | Heckerman et al. | |
| 2004/0220926 A1 | 11/2004 | Lamkin et al. | |
| 2004/0260694 A1 | 12/2004 | Chaudhuri et al. | |
| 2005/0004895 A1 | 1/2005 | Schurenberg et al. | |
| 2005/0015381 A1 | 1/2005 | Clifford et al. | |
| 2005/0015675 A1 | 1/2005 | Kolawa et al. | |

| | | |
|---|---|---|
| 2005/0050068 A1 | 3/2005 | Vaschillo et al. |
| 2005/0055345 A1 | 3/2005 | Ripley |
| 2005/0060286 A1 | 3/2005 | Hansen et al. |
| 2005/0071194 A1 | 3/2005 | Bormann et al. |
| 2005/0075917 A1 | 4/2005 | Flores et al. |
| 2005/0114369 A1 | 5/2005 | Gould et al. |
| 2005/0149522 A1* | 7/2005 | Cookson et al. ............ 707/7 |
| 2005/0154615 A1 | 7/2005 | Rotter et al. |
| 2005/0210007 A1 | 9/2005 | Beres et al. |
| 2005/0228808 A1 | 10/2005 | Mamou et al. |
| 2005/0240392 A1 | 10/2005 | Munro et al. |
| 2005/0256740 A1 | 11/2005 | Kohan et al. |
| 2005/0256882 A1 | 11/2005 | Able et al. |
| 2005/0273452 A1 | 12/2005 | Molloy et al. |
| 2006/0053151 A1 | 3/2006 | Gardner et al. |
| 2006/0053172 A1 | 3/2006 | Gardner et al. |
| 2006/0053173 A1 | 3/2006 | Gardner et al. |
| 2006/0053382 A1 | 3/2006 | Gardner et al. |
| 2006/0064429 A1 | 3/2006 | Yao |
| 2006/0074832 A1 | 4/2006 | Gardner et al. |
| 2006/0074836 A1 | 4/2006 | Gardner et al. |
| 2006/0080312 A1 | 4/2006 | Friedlander et al. |
| 2006/0116983 A1 | 6/2006 | Dettinger et al. |
| 2006/0117032 A1 | 6/2006 | Dettinger et al. |
| 2006/0129605 A1 | 6/2006 | Doshi |
| 2006/0129971 A1 | 6/2006 | Rojer |
| 2006/0136205 A1* | 6/2006 | Song ..................... 704/243 |
| 2006/0161522 A1 | 7/2006 | Dettinger et al. |
| 2006/0167896 A1 | 7/2006 | Kapur et al. |
| 2006/0179050 A1 | 8/2006 | Giang et al. |
| 2006/0190445 A1 | 8/2006 | Risberg et al. |
| 2006/0195560 A1 | 8/2006 | Newport |
| 2006/0265400 A1 | 11/2006 | Fain et al. |
| 2006/0271401 A1 | 11/2006 | Lassetter et al. |
| 2006/0271549 A1 | 11/2006 | Rayback et al. |
| 2006/0287890 A1 | 12/2006 | Stead et al. |
| 2007/0005567 A1 | 1/2007 | Hermansen et al. |
| 2007/0016450 A1 | 1/2007 | Bhora et al. |
| 2007/0055647 A1 | 3/2007 | Mullins et al. |
| 2007/0067285 A1 | 3/2007 | Blume et al. |
| 2007/0073678 A1 | 3/2007 | Scott et al. |
| 2007/0073745 A1 | 3/2007 | Scott et al. |
| 2007/0094060 A1 | 4/2007 | Apps et al. |
| 2007/0150279 A1 | 6/2007 | Gandhi et al. |
| 2007/0192715 A1 | 8/2007 | Kataria et al. |
| 2007/0198481 A1 | 8/2007 | Hogue et al. |
| 2007/0198600 A1 | 8/2007 | Betz |
| 2007/0214129 A1 | 9/2007 | Ture et al. |
| 2007/0214179 A1 | 9/2007 | Hoang |
| 2007/0217676 A1* | 9/2007 | Grauman et al. ............ 382/170 |
| 2007/0250487 A1 | 10/2007 | Reuther |
| 2007/0260492 A1 | 11/2007 | Feied et al. |
| 2007/0276844 A1 | 11/2007 | Segal et al. |
| 2007/0276858 A1 | 11/2007 | Cushman et al. |
| 2007/0299697 A1 | 12/2007 | Friedlander et al. |
| 2007/0299842 A1 | 12/2007 | Morris et al. |
| 2008/0005106 A1 | 1/2008 | Schumacher et al. |
| 2008/0016218 A1 | 1/2008 | Jones et al. |
| 2008/0069132 A1 | 3/2008 | Ellard et al. |
| 2008/0120432 A1 | 5/2008 | Lamoureux et al. |
| 2008/0126160 A1 | 5/2008 | Takuechi et al. |
| 2008/0243832 A1 | 10/2008 | Adams et al. |
| 2008/0243885 A1 | 10/2008 | Harger et al. |
| 2008/0244008 A1 | 10/2008 | Wilkinson et al. |
| 2009/0089317 A1 | 4/2009 | Ford et al. |
| 2009/0089332 A1 | 4/2009 | Harger et al. |
| 2009/0089630 A1 | 4/2009 | Goldenberg et al. |
| 2009/0198686 A1 | 8/2009 | Cushman, II et al. |
| 2010/0114877 A1 | 5/2010 | Adams et al. |
| 2010/0174725 A1 | 7/2010 | Adams et al. |
| 2010/0175024 A1 | 7/2010 | Schumacher et al. |
| 2011/0010214 A1 | 1/2011 | Carruth |
| 2011/0010346 A1 | 1/2011 | Goldenberg et al. |
| 2011/0010401 A1 | 1/2011 | Adams et al. |
| 2011/0010728 A1 | 1/2011 | Goldenberg et al. |
| 2011/0047044 A1 | 2/2011 | Wright et al. |
| 2011/0191349 A1 | 8/2011 | Ford et al. |

FOREIGN PATENT DOCUMENTS

| | | |
|---|---|---|
| WO | 0159586 | 8/2001 |
| WO | 0159586 A2 | 8/2001 |
| WO | 0175679 A1 | 10/2001 |
| WO | 03021485 | 3/2003 |
| WO | 2004023297 A1 | 3/2004 |
| WO | 2004023311 A1 | 3/2004 |
| WO | 2004023345 A1 | 3/2004 |
| WO | 2009042931 A1 | 4/2009 |
| WO | 2009042941 A1 | 4/2009 |

OTHER PUBLICATIONS

Fair, "Record Linkage in the National Dose Registry of Canada", European Journal of Cancer, Pergamon Press, Oxford, GB, vol. 33, pp. S37-S43, XP005058648 ISSN: 0959-8949, Apr. 1997.

International Search Report and Written Opinion issued in PCT/US2007/013049, mailed Jun. 13, 2008.

International Search Report and Written Opinion, for PCT/US2007/012073, Mailed Jul. 23, 2008, 12 pages.

Office Action issued in U.S. Appl. No. 11/809,792, mailed Aug. 21, 2009, 14 pages.

Oracle Data Hubs: "The Emperor Has No Clothes?", Feb. 21, 2005, Google.com, pp. 1-9.

IEEE, no matched results, Jun. 30, 2009, p. 1.

IEEE No matched Results, 1 Page, Sep. 11, 2009.

Office Action issued in U.S. Appl. No. 11/522,223 dated Aug. 20, 2008, 16 pgs.

Office Action issued in U.S. Appl. No. 11/522,223 dated Feb. 5, 2009, Adams, 17 pages.

Notice of Allowance issued for U.S. Appl. No. 11/522,223, dated Sep. 17, 2009, 20 pages.

De Rose, et al. "Building Structured Web Community Portals: A Top-Down, Compositional, and Incremental Approach", VDLB, ACM, pp. 399-410, Sep. 2007.

Microsoft Dictionary, "normalize", at p. 20, Fifth Edition, Microsoft Corp., downloaded from http://proquest.safaribooksonline.com/0735614954 on Sep. 8, 2008.

Office Action issued in U.S. Appl. No. 11/521,928 dated Apr. 1, 2009, 22 pages.

Office Action issued in U.S. Appl. No. 11/521,928 dated Sep. 16, 2008, 14 pages.

Notice of Allowance issued for U.S. Appl. No. 11/521,928, dated Sep. 18, 2009, 20 pages.

Gopalan Suresh Raj, Modeling Using Session and Entity Beans, Dec. 1998, Web Cornucopia, pp. 1-15.

Scott W. Ambler, Overcoming Data Design Challenges, Aug. 2001, p. 1-3.

XML, JAVA, and the future of the Web, Bosak, J., Sun Microsystems, Mar. 10, 1997, pp. 1-9.

Integrated Document and Workflow Management applied to Offer Processing a Machine Tool Company, Stefan Morschheuser, et al., Dept. of Information Systems I, COOCS '95 Milpitas CA, ACM 0-89791-706-5/95, p. 106-115.

Hamming Distance, HTML. Wikipedia.org, Available: http://en.wikipedia.org/wiki/Hamming_distance (as of May 8, 2008).

Office Action Issued in U.S. Appl. No. 11/521,946 mailed May 14, 2008, 10 pgs.

Office Action issued in U.S. Appl. No. 11/521,946 mailed Dec. 9, 2008, 10 pgs.

Office Action issued in U.S. Appl. No. 11/521,946 mailed May 13, 2009, 12 pgs.

Freund et al., Statistical Methods, 1993, Academic Press Inc., United Kingdom Edition, p. 112-117.

Merriam-Webster dictionary defines "member" as "individuals".

Waddington, D., "Does it signal convergence of operational and analytic MDM?" retrieved from the internet:<URL: http://www.intelligententerprise.com>, 2 pages, Aug. 2006.

International Search Report mailed on Oct. 10, 2008, for PCT Application No. PCT/US07/20311 (10 pp).

International Search Report and Written Opinion issued in PCT/US07/89211, mailing date of Jun. 20, 2008.

International Search Report and Written Opinion for PCT1US08158404, dated Aug. 15, 2008.
International Preliminary Report on Patentability Under Chapter 1 for PCT Application No. PCT/US2008/058665, issued Sep. 29, 2009, mailed Oct. 8, 2009, 6 pgs.
International Search Report and Written Opinion mailed on Dec. 3, 2008 for International Patent Application No. PCT/US2008/077985.
Gu, Lifang, et al., "Record Linkage: Current Practice and Future Directions," CSIRO Mathematical and Informational Sciences, 2003, pp. 1-32.
O'Hara-Schettino, et al., "Dynamic Navigation in Multiple View Software Specifications and Designs," Journal of Systems and Software, vol. 41, Issue 2, May 1998, pp. 93-103.
International Search Report and Written Opinion mailed on Oct. 10, 2008 for PCT Application No. PCT/US08/68979.
International Search Report and Written Opinion mailed on Dec. 2, 2008 for PCT/US2008/077970.
Martha E. Fair, et al., "Tutorial on Record Linkage Slides Presentation", Chapter 12, pp. 457-479.
International Search Report and Written Opinion mailed on Aug. 28, 2008 for Application No. PCT1US2008158665, 7 pgs.
C.C. Gotlieb, Oral Interviews with C.C. Gotlieb, Apr. 1992, May 1992, ACM, pp. 1-72.
Google.com, no match results, Jun. 30, 2009, p. 1.
Supplementary European Search Report for EP 07 79 5659 dated May 18, 2010, 5 pages.
European Communication for EP 98928878 (PCT/US9811438) dated Feb. 16, 2006.
European Communication for EP 98928878 (PCT/US9811438) dated Mar. 10, 2008.
European Communication for EP 98928878 (PCT/US9811438) dated Jun. 26, 2006.
Gill, "OX-LINK: The Oxford Medical Record Linkage System", Internet Citation, 1997.
Newcombe et al., "The Use of Names for Linking Personal Records", Journal of the American Statistical Association, vol. 87, Dec. 1, 1992, pp. 335-349.
European Communication for EP 07795659 (PCT/US2007013049) dated May 27, 2010.
Jason Woods, et al., "Baja Identity Hub Configuration Process", Publicly available on Apr. 2, 2009, Version 1.3.
Initiate Systems, Inc. "Refining the Auto-Link Threshold Based Upon Scored Sample", Publicly available on Apr. 2, 2009; memorandum.
Initiate Systems, Inc. "Introduction", "False-Positive Rate (Auto-Link Threshold)", Publicly available on Apr. 2, 2009; memorandum.
Jason Woods, "Workbench 8.0 Bucket Analysis Tools", Publicly available on Apr. 2, 2009.
"Parsing" Publicly available on Oct. 2, 2008.
Initiate, "Business Scenario: Multi-Lingual Algorithm and Hub," Publicly available on Apr. 2, 2009.
Initiate, "Business Scenario: Multi-Lingual & Many-To-Many Entity Solutions", Publicly available on Apr. 2, 2009.
Initiate, "Relationships-MLH", presentation; Publicly available on Sep. 28, 2007.
Initiate, "Multi-Lingual Hub Support via Memtype Expansion", Publicly available on Apr. 2, 2009.
Initiate Systems, Inc. "Multi-Language Hubs", memorandum; Publicly available on Apr. 2, 2009.
Initiate, "Business Scenario: Support for Members in Multiple Entities", Publicly available on Oct. 2, 2008.
Initiate, "Group Entities", Publicly available on Mar. 30, 2007.
Jim Cushman, MIO 0.5: MIO As a Source; Initiate; Publicly available on Oct. 2, 2008.
Initiate, "Provider Registry Functionality", Publicly available on Oct. 2, 2008.
Edward Seabolt, "Requirement Specification Feature #NNNN Multiple Entity Relationship", Version 0.1-Draft; Publicly available on Oct. 2, 2008.
Initiate, "Aruba Training Engine Callouts", presentation; Publicly available on Mar. 30, 2007.
Initiate, "Business Scenario: Callout to Third Party System", Publicly available on Oct. 2, 2008.
John Dorney, "Requirement Specification Feature #Nnnn Conditional Governance", Version 1.0- Draft; Publicly available on Oct. 2, 2008.
Initiate, Release Content Specification, Identity Hub Release 6.1, RCS Version 1.0; Publicly available on Sep. 16, 2005.
Initiate, "Initiate Identity Hub™ Manager User Manual", Release 6.1; Publicly available on Sep. 16, 2005.
End User Training CMT; CIO Maintenance Tool (CMT) Training Doc; Publicly available on Sep. 29, 2006.
"Hierarchy Viewer—OGT 3.0t", Publicly available on Sep. 25, 2008.
"Building and Searching the OGT", Publicly available on Sep. 29, 2006.
Sean Stephens, "Requirement Specification B2B Web Client Architecture", Version 0.1-Draft; Publicly available on Sep. 25, 2008.
"As of: OGT 2.0", Publicly available on Sep. 29, 2006.
Initiate, "Memtype Expansion Detailed Design", Publicly available on Apr. 2, 2009.
Initiate, "Java SDK Self-Training Guide", Release 7.0; Publicly available on Mar. 24, 2006.
Ohgaya, Ryosuke et al., "Conceptual Fuzzy Sets-, NAFIPS 2002, Jun. 27-29, 2002, pp. 274-279.Based Navigation System for Yahoo!".
Xue, Gui-Rong et al., "Reinforcing Web-Object Categorization Through Interrelationships", Data Mining and Knowledge Discover, vol. 12, Apr. 4, 2006, pp. 229-248.
Adami, Giordano et al., "Clustering Documents in a Web Directory", WIDM '03, New Orleans, LA, Nov. 7-8, 2003, pp. 66-73.
Chen, Hao et al., "Bringing Order to the Web: Automatically Categorizing Search Results", CHI 2000, CHI Letters, vol. 2, Issue 1, Apr. 1-6, 2000, pp. 145-152.
"Implementation Defined Segments—Exhibit A", Publicly available on Mar. 20, 2008.
Initiate, "Implementation Defined Segments—Gap Analysis", Publicly available on Mar. 20, 2008.
"Supporting Hierarchies", Publicly available on Nov. 29, 2007.
Xue, Gui-Rong et al., "Implicit Link Analysis for Small Web Search", SIGIR '03, Toronto, Canada, Jul. 28-Aug. 1, 2003, pp. 56-63.
Liu, Fang et al., "Personalized Web Search for iMproving Retrieval Effectiveness", IEEE Transactions on Knowledge and Data Engineering vol. 16, No. 1, Jan. 2004, pp. 28-40.
Anyanwu, Kemafor et al. "SemRank: Ranking complex Relationship Search Results on the Semantic Web", WWW 2005, Chiba, Japan May 10-14, 2005, pp. 117-127.
International Preliminary Report on Patentability, PCT/US2008/58404, Mar. 21, 2011, 4 pages.
European Search Report/EP07795659.7, Apr. 15, 2011, 7 pages.
Emdad Ahmed, "A Survey on Bioinformatics Data and Service Integration Using Ontology and Declaration Workflow Query Language", Department of Computer Science, Wayne State University, USA, Mar. 15, 2007, pp. 1-67.
International Preliminary Report on Patentability, PCT/US2007/89211, Apr. 30, 2012, 6 pages.
European Search Report/EP07795108.5, May 29, 2012, 6 pages.

* cited by examiner

SYSTEM AND METHOD FOR AUTOMATIC WEIGHT GENERATION FOR PROBABILISTIC MATCHING

CROSS-REFERENCE TO RELATED APPLICATIONS

This application claims priority from U.S. Provisional Patent Application No. 60/810,396, filed Jun. 2, 2006, entitled "A SYSTEM AND METHOD FOR AUTOMATIC WEIGHT GENERATION FOR PROBABILISTIC MATCHING," the entire content of which is hereby incorporated herein by reference for all purposes.

TECHNICAL FIELD OF THE INVENTION

This invention relates generally to probabilistic matching of records across computer data sources. More particularly, the invention relates to embodiments of a system and method of automatic weight generation for probabilistic matching of data records across databases where a match score indicates the likelihood of records belonging to the same entity.

BACKGROUND OF THE INVENTION

Data about entities, such as people, products, or parts may be stored in digital format in a computer database. These computer databases permit the data about an entity to be accessed rapidly and permit the data to be cross-referenced to other relevant pieces of data about the same entity. The databases also permit a person to query the database to find data records pertaining to a particular entity. The terms data set, data file, and data source may also refer to a database. A database, however, has several limitations which may limit the ability of a person to find the correct data about an entity within the database. The actual data within the database is only as accurate as the person who entered the data. Thus, a mistake in the entry of the data into the database may cause a person looking for data about an entity in the database to miss some relevant data about the entity because, for example, a last name of a person was misspelled. Another kind of mistake involves creating a new separate record for an entity that already has a record within the database. In a third problem, several data records may contain information about the same entity, but, for example, the names or identification numbers contained in the two data records may be different so that the database may not be able to associate the two data records to each other.

For a business that operates one or more databases containing a large number of data records, the ability to locate relevant information about a particular entity within and among the respective databases is very important, but not easily obtained. Once again, any mistake in the entry of data (including without limitation the creation of more than one data record for the same entity) at any information source may cause relevant data to be missed when the data for a particular entity is searched for in the database. In addition, in cases involving multiple information sources, each of the information sources may have slightly different data syntax or formats which may further complicate the process of finding data among the databases. An example of the need to properly identify an entity referred to in a data record and to locate all data records relating to an entity in the health care field is one in which a number of different hospitals associated with a particular health care organization may have one or more information sources containing information about their patient, and a health care organization collects the information from each of the hospitals into a master database. It is necessary to link data records from all of the information sources pertaining to the same patient to enable searching for information for a particular patient in all of the hospital records.

There are several problems which limit the ability to find all of the relevant data about an entity in such a database. Multiple data records may exist for a particular entity as a result of separate data records received from one or more information sources, which leads to a problem that can be called data fragmentation. In the case of data fragmentation, a query of the master database may not retrieve all of the relevant information about a particular entity. In addition, as described above, the query may miss some relevant information about an entity due to a typographical error made during data entry, which leads to the problem of data inaccessibility. In addition, a large database may contain data records which appear to be identical, such as a plurality of records for people with the last name of Smith and the first name of Jim. A query of the database will retrieve all of these data records and a person who made the query to the database may often choose, at random, one of the data records retrieved which may be the wrong data record. The person may not often typically attempt to determine which of the records is appropriate. This can lead to the data records for the wrong entity being retrieved even when the correct data records are available. These problems limit the ability to locate the information for a particular entity within the database.

To reduce the amount of data that must be reviewed and prevent the user from picking the wrong data record, it is also desirable to identify and associate data records from the various information sources that may contain information about the same entity. There are conventional systems that locate duplicate data records within a database and delete those duplicate data records, but these systems only locate data records which are identical to each other. Thus, these conventional systems cannot determine if two data records, with for example slightly different last names, nevertheless contain information about the same entity. Consequently, the determination of whether records belong together remains very much a labor-intensive process.

SUMMARY OF THE INVENTION

Embodiments of the invention provide a system and method of automatic weight generation useful in facilitating the determination of whether records belong together (e.g., the statistical likelihood that they are related to the same entity). For example, in some embodiments of the invention, a computer information processing system may implement computer program algorithms for matching data records. Some algorithms may match search criteria with data source systems by comparing individual fields of a record. In some embodiments, each field may be compared by an exact match (e.g., identical last names) and/or by close matches. As an example, close matches can be characterized by nicknames, typos (edit distance), abbreviations, previous names, etc. Matching according to one embodiment of the invention accounts for anonymous values (e.g., an anonymous name "John Doe", a default social security number "111-11-1111", or some other standardized value). In one embodiment, anonymous values are treated as equivalent to empty values.

According to one embodiment of the invention, each comparison can result in a mathematical score which is the sum of the field comparisons. To sum up the field scores accurately, each type of comparison or comparison function can have a weighting factor associated thereto. For example, an exact match may be weighted much higher than an abbreviation match, and a social security number match may be weighted much higher than a date-of-birth match. According to one embodiment of the invention, weighting can account for other factors such as the frequency of the component in the data source records. For example, a match on "John Smith" may be weighted much less than matches on a name like "Moonbeam Horsefeather". According to one embodiment of the invention, the weighting also accounts for differing data quality. For example, if an accurate data set has a mismatch on date-of-birth, then the penalty, negative weight factor, may be greater than on an inaccurate data set.

In some cases, weights for record matching may be determined by a highly trained and extremely skilled specialist who sets and validates weights through analysis of the data source records with the aid of some utility software tools. As the data grows rapidly and changes continuously over time, it has become very difficult if not cost prohibitive to accurately and correctly establish weighting in a timely manner. For these reasons, conventional record matching systems are typically configured statically using a set of sample records which yields less accurate matches.

Embodiments of the invention provide a system and method of automatically generating weights for record matching. More particularly, one embodiment of the invention provides a search engine capable of performing complex weight generation across data record matching (e.g., from multiple data sources) with little or no human intervention. The data sources can be a single database, multiple data bases at a single physical location, multiple data bases at different locations or a network, etc. In one embodiment, an automatic weight generation process according to the invention may comprise the following:

1) Create tables for unmatched-set probabilities for all attributes involved in the comparison algorithm.
2) Set default discrepancy weights for these attributes.
3) Calculate the weights based upon these tables.
4) Perform record comparison across the data using the weights.
5) Determine a candidate matched set for each attributed involved in the comparison algorithm.
6) Calculate the discrepancy probabilities from these candidate matched sets.
7) Calculate new weights based upon the unmatched probability tables and the new discrepancy tables. Information from the unmatched set probabilities and the matched set probabilities are combined to form the actual weights.
8) Test for convergence between the new weights computed in step 7 and the old weights used in step 4.
9) If this difference is larger then repeat beginning at step 4 with the new weight table until the weights converge to their final value.
10) Calculate nominal auto-link and clerical-review thresholds.

In one embodiment, an automatic weight generation process according to the invention may further comprise generating tables for adaptive weighting. In one embodiment, an automatic weight generation process according to the invention may further comprise generating candidate anonymous data useful for locating and removing erroneous data.

Embodiments of the invention can provide many advantages, including speed, accuracy, and performance. For example, for applications against data sources containing a certain number of records, automatic weight generation can occur in hours instead of lengthy data analysis over weeks. Additionally, due to a repeatable, automated process eliminating any manual analysis and editing of individual weight values, the invention is less error prone. In embodiments of the invention, thousands of weights can be automatically generated to account for details in specific data (e.g., frequencies, errors, anonymous values, etc.) without human intervention. Furthermore, embodiments of the system and process of the invention disclosed herein can be applied to 10 millions or more record data sets, making the invention particularly useful in a high performance search engine implementation. The user experience is enriched by allowing monitoring of the process and generated weights. With this invention, a highly skilled specialist is not required to configure and tune the probabilistic weight generation.

Embodiments of the invention disclosed herein can be implemented by programming one or more computer systems or devices with computer-executable instructions embodied in a computer-readable medium. When executed by a processor, these instructions operate to cause these computer systems and devices to perform one or more functions particular to embodiments of the invention disclosed herein (e.g., generate an appropriate confidence level or score for each event.) Programming techniques, computer languages, devices, and computer-readable media necessary to accomplish this are known in the art and thus will not be further described herein.

Additional details, advantages and other aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements). In one embodiment, the system and method of the invention is particularly applicable to a system and method for indexing information from multiple information sources about companies to an explicit business hierarchy such as Dun and Bradstreet (D&B), Experian, or Equifax. It is in this context that the invention will be described. It will be appreciated, however, that the system and method in accordance with the invention has utility in a large number of applications that involve identifying, associating, and structuring into hierarchy information about entities.

Figure 1:
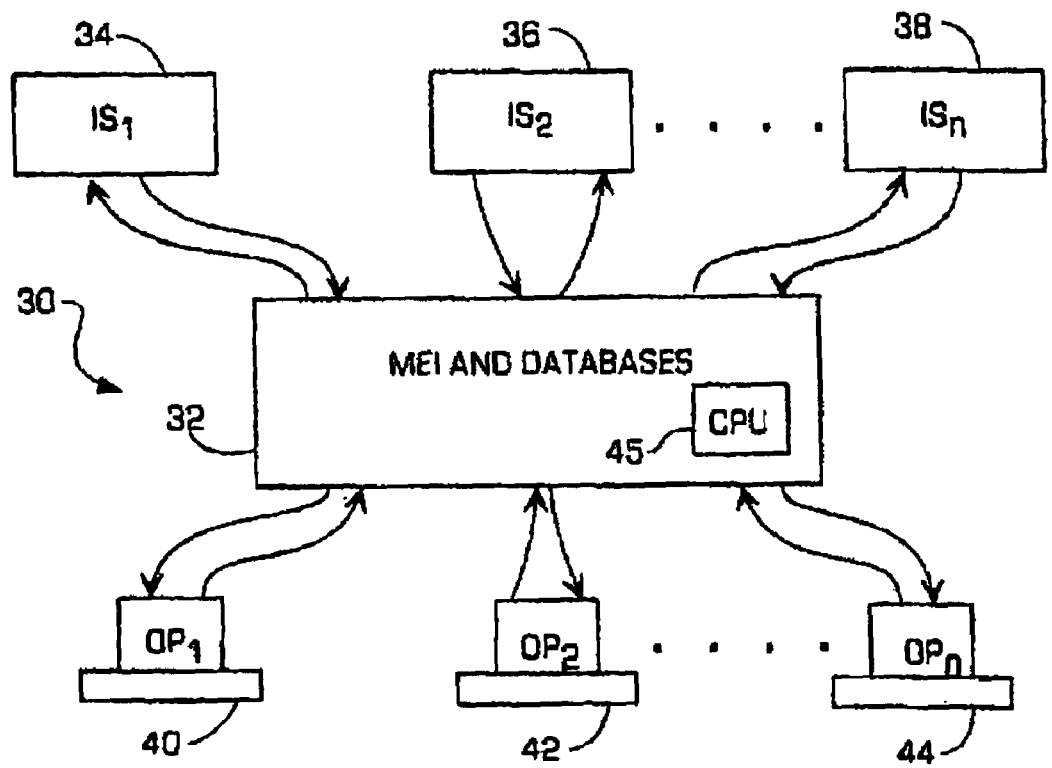
FIG. 1 is a block diagram illustrating a database system that may include a master entity index system in which an automatic weight generation process may be implemented according to one embodiment of the invention.

In describing embodiments of the systems and methods of the present invention, it may first be helpful to go over examples of embodiments of systems and methods for associating entities which may be utilized in conjunction with embodiments of the present invention such has those described in U.S. Pat. No. 5,991,758 by inventor Scott Ellard, entitled "System and Method for Indexing Information about Entities from Different Information Sources," which is hereby incorporated by reference in its entirety. FIG. 1 is a block diagram illustrating a master entity index system 30 in accordance with the invention. The master entity index system may include a master entity index (MEI) 32 that processes, updates and stores data records about one or more entities from one or more information sources 34, 36, 38 and responds to commands or queries from a plurality of operators 40, 42, 44, where the operators may be either users or information systems. The MEI may operate with data records from a single information source or, as shown, data records from one or more information sources. The entities tracked using the MEI may include for example, patients in a hospital, participants in a health care system, parts in a warehouse or any other entity that may have data records and information contained in data records associated with it. The MEI may be a computer system with a central processing unit 45 executing a software application that performs the function of the MEI. The MEI may also be implemented using hardware circuitry.

As shown, the MEI 32 may receive data records from the information sources as well as write corrected data back into the information sources. The corrected data communicated to the information sources may include information that was correct, but has changed, information about fixing information in a data record or information about links between data records. In addition, one of the users 40-44 may transmit a query to the MEI 32 and receive a response to the query back from the MEI. The one or more information sources may be, for example, different databases that possibly have data records about the same entities. For example, in the health care field, each information source may be associated with a particular hospital in the health care organization and the health care organization may use the master entity index system to relate the data records within the plurality of hospitals so that a data record for a patient in Los Angeles may be located when that same patient is on vacation and enters a hospital in New York. The MEI 32 of the master entity index system 30 may be located at a central location and the information sources and users may be located remotely from the MEI and may be connected to the MEI by, for example, a communications link, such as the Internet. The MEI, the one or more information sources and the plurality of users may also be connected together by a communications network, such as a wide area network. The MEI may have its own database that stores the complete data records in the MEI, but the MEI may also only contain sufficient data to identify a data record (e.g., an address in a particular information source) or any portion of the data fields that comprise a complete data record so that the MEI retrieves the entire data record from the information source when needed. The MEI may link data records together containing information about the same entity in an entity identifier or associative database, as described below, separate from the actual data record. Thus, the MEI may maintain links between data records in one or more information sources, but does not necessarily maintain a single uniform data record for an entity. Now, an example of the master entity index system for a health care organization in accordance with the invention will be described.

Figure 2:
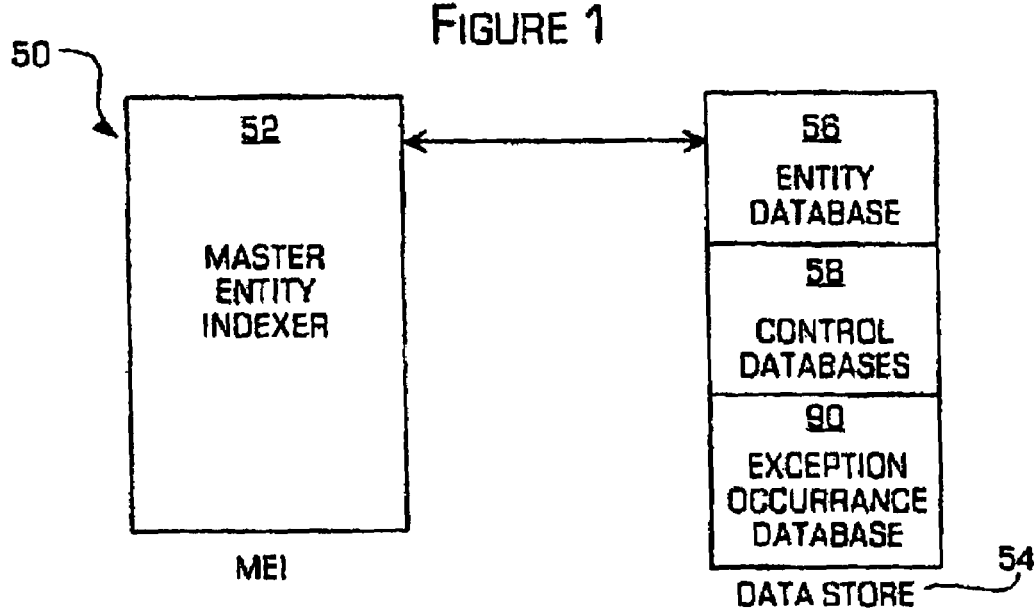
FIG. 2 is a block diagram illustrating an exemplary master entity index system and its associated databases in accordance with one embodiment of the invention.

FIG. 2 is a block diagram illustrating an example of a master entity index system 50 for a health care organization. In this example, the master entity index system may include a master entity index 52 and a data store 54. For clarity, the one or more information sources and the multiple users are not shown, but are connected to the master entity index 52 as previously described. The data store 54 may include an entity database 56, one or more control databases 58, and an exception occurrence database. The entity database may store the data from the data records as specified above from the one or more information sources and may separately store links between one or more data records when those data records contain information about the same entity. The entity database may also store an address of a large data record stored in one of the information sources to reduce the storage requirements of the entity database. In this example, the information about entities within the data records may be information about patients within a plurality of hospitals which are owned by a health care organization. The MEI 52 may process the data records from the one or more information sources located at each hospital, identify and associate records that contain information about the same entity, and generate the links between the separate data records when the data records contain information about the same patient.

As data records from the information sources are fed into the MEI, the MEI may attempt to match the incoming data record about an entity to a data record already located in the MEI database. The matching method will be described below with reference to FIG. 15. If the incoming data record matches an existing data record, a link between the incoming data record and the matching data record may be generated. If the incoming data record does not match any of the existing data records in the MEI, a new entity identifier, as described below, may be generated for the incoming data record. In both cases, the incoming data record may be stored in the MEI. Then as additional data records are received from the information sources, these data records are matched to existing data records and the MEI database of data records is increased.

The one or more control databases 58 may be used by the MEI to control the processing of the data records to increase accuracy. For example, one of the control databases may store rules which may be used to override certain anticipated erroneous conclusions that may normally be generated by the MEI. For example, the operator of the MEI may know, due to past experience, that the name of a particular patient is always misspelled in a certain way and provide a rule to force the MEI to associate data records with the known different spellings. The control databases permit the operator to customize the MEI for a particular application or a particular type of information. Thus, for a health care system containing information about a patient, the control databases may contain a rule that the nickname "Bill" is the same as the full name "William." Therefore, the MEI will determine that data records otherwise identical except for the first name of "Bill" and "William" contain information about the same entity and should be linked together. The MEI will now be described in more detail.

Figure 3:
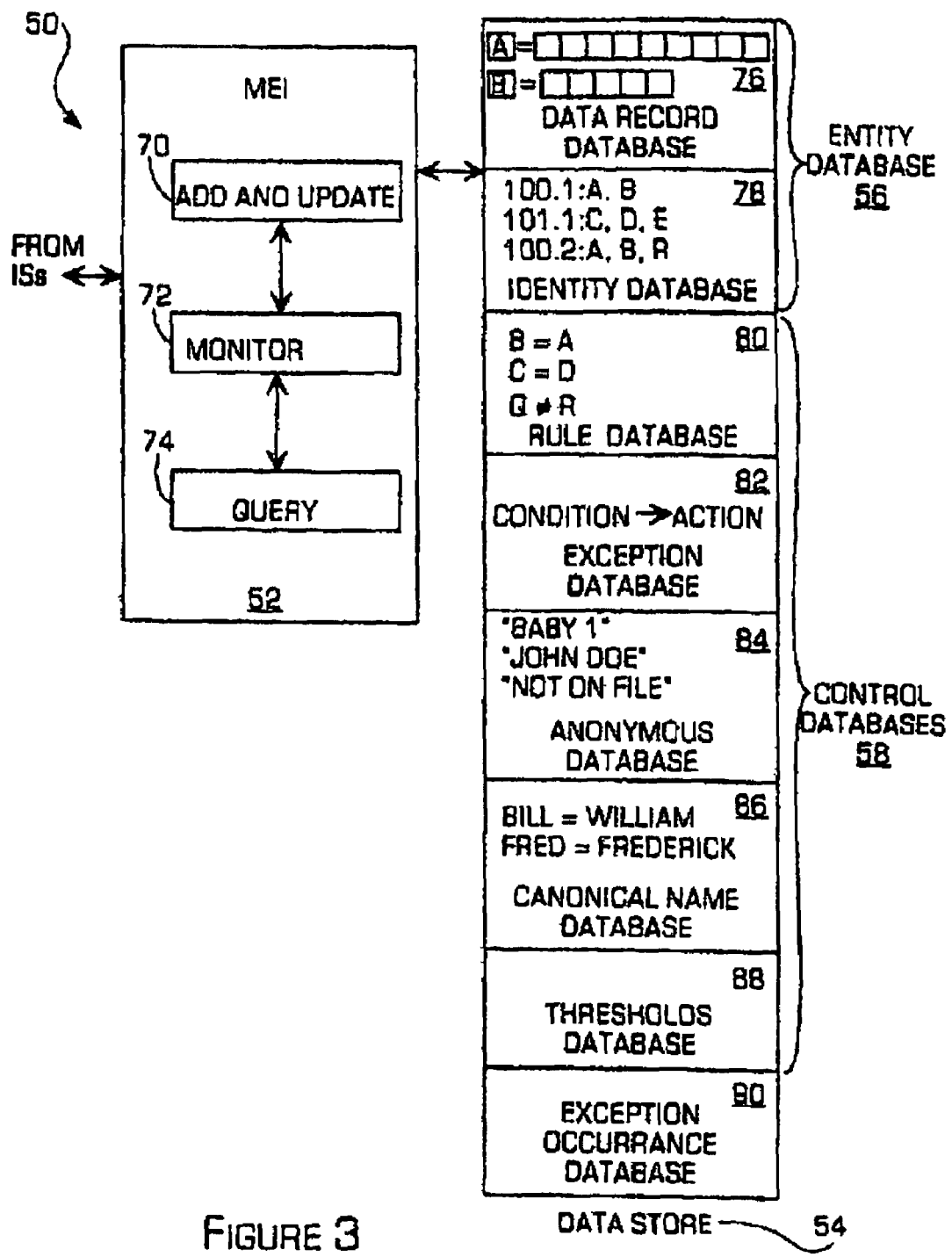
FIG. 3 is a block diagram illustrating more details of the database that are associated with the master entity index of FIG. 2.

FIG. 3 is a block diagram illustrating more details of the master entity index system 50, and in particular the MEI 52 and the data store 54. The MEI 52 may include an addition and updating unit 70, a monitor unit 72 and a query unit 74. The addition and updating unit may add data records about a new entity into the data store, update data records in the data store, or add new rules to the control databases. The monitor unit may permit a user of the master entity index system to view special conditions, known as exceptions, generated by the MEI. For example, a data record that requires a person to view the data record due to an error may be tagged and a message to the operator may be generated. The query unit permits a user of the master entity index system to query the MEI about information in the data records or information in the control databases of the MEI and the MEI will return a response to the query including any relevant data records or information. More details of these units and their associated functions will be described below.

For each of the operations of the MEI, including the synthesis, as described below, the querying and the monitoring, the results of those operations may depend on a trust value that may be associated with each data field in a data record. The trust computation for a data field may vary depending on the characteristics of the data field, such as the date on which that data record containing the field was received, or a quantitative characterization of a level of trust of the information source. For example, a data field containing data that was manually entered may have a lower trust value than a data field with data that was transferred directly from another information source. The trust value for a data field may also affect the probability of the matching of data records. Now, the data store 54 of the master entity index system will be described in more detail.

The MEI may provide other operations that can be constructed from combining the operations listed above. For example, an operation to process data records for which it is not known if a data record exists can be constructed by combining the query operation for data records with the add new data record or update existing data record operations. These "composite" operations may lead to better performance than if the operator executed a combination of the basic operations. They also relieve the operator for having to determine the correct sequencing of operations to achieve the desired result.

The data store 54 may include an entity database 56, one or more control databases 58, and an exception occurrence database 90 as described above. The entity database may include a data record database 76 and an identity database 78. The data record database may store the data records or the addresses of the data records in the MEI, as described above, while the associative identity database may store a group of data record identifiers that associate or "link" those data records which contain information about the same entity. The separation of the physical data records from the links between the data records permits more flexibility because a duplicate copy of the data contained in the data record is not required to be present in the identity database. The data record database and the associative database may also be combined if desired.

The identity database represents the combination of data records in the data record database that refer to the same entity. Each entity is assigned an entity identifier. Entity identifiers are based on the concept of "versioned" identification. An entity identifier consists of a base part and a version number. The base part represents a specific individual about whom information is being linked. The version number represents a specific combination of data records that provides information about the entity that is known at a specific time. In this example, the data records are shown as squares with the alphabetic identifier of the data record inside, and the entity identifier is shown as the base part followed by a period followed by a version number. For example, "100.1" indicates an entity identifier with 100 as the base part and 1 as the version number. In this example, entity identifier 100.1 links data records A and B, entity identifier 101.1 links data records C, D and E, and entity identifier 100.2 links data records A, B, and R. Now, the details of the control databases will be described.

The one or more control databases 58 may permit the operator of the master entity index system to customize the MEI's processing based on information known to the operator. The control databases shown are merely illustrative and the MEI may have additional control databases which further permit control of the MEI by the operator. The control databases may, for example, include a rules database 80, an exception handling database 82, an anonymous name database 84, a canonical name database 86, and a thresholds database 88.

The rules database may contain links that the operator of the system has determined are certain and should override the logic of the matching of the MEI. For example, the rules database may contain identity rules (i.e., rules which establish that a link exists between two data records) and/or non-identity rules (i.e., rules which establish that no link exists between two data records). In this example, the rules database contains identity rules which are A=B and C=D and a non-identity rule which is Q.notequal.R. These rules force the MEI to establish links between data records or prevent links from being established between data records. For example, the information sources may have four patients, with data records S, T, U, and V respectively, who are all named George Smith and the operator may enter the following nonidentity rules (i.e., S.notequal.T, T.notequal.U, U.notequal.V, V.notequal.S) to keep the data records of the four different entities separate and unlinked by the MEI. The rules in the rules database may be updated, added or deleted by the operator of the master entity index system as needed.

The exception handling database 82 contains one or more exception handling routines that permit the master entity index system to handle data record problems. The exception handling rules within the database may have the form of "condition.fwdarw.action" processing rules. The actions of these rules may be actions that the MEI should automatically take in response to a condition, for example, to request that an individual manually review a data record. An example of an exception handling rule may be, "if duplicate data record.fwdarrow.delete data record" which instructs the MEI to delete a duplicate data record. Another example is, "if different attributes (sex).forwardarrrow.request further review of data record" which instructs the MEI that if there are two data records that appear to relate to the same entity, but the sex of the entity is different for each data record, the MEI should request further review of the data records. In response to this request, an operator may determine that the data records are the same, with an incorrectly typed sex for one of the records and the operator may enter a rule into the rules database that the two data records are linked together despite the difference in the sex attribute. The exception database may have an associated database 80 (described below) which stores the actual exceptions that occur during processing of the input data records.

The anonymous name database 84 permits the MEI to automatically recognize names that should be ignored for purposes of attempting to match two data records. In this example, the anonymous name database may contain "not on file", "John Doe" and "baby.subtext.--1" which are names that may be typically assigned by a hospital to a patient when the hospital has not yet determined the name of the patient. As another example, a part not in a warehouse inventory may be referred to as "not on file" until the part may be entered into the database. These anonymous names may be used by the MEI to detect any of the anonymous names or other "filler" data that hold a space, but have no particular meaning in data records and ignore those names when any matching is conducted because a plurality of data records containing the name of "John Doe" should not be linked together simply because they have the same name.

The canonical name database 86 may permit the MEI to associate short-cut data, such as a nickname, with the full data represented by the short-cut data, such as a person's proper name. In this example for a health care organization, the nickname Bill may be associated with William and Fred may be associated with Frederick. This database permits the MEI to link together two data records that are identical except that one data record uses the first name Bill while the second data record uses the first name William. Without this canonical name database, the MEI may not link these two data records together and some of the information about that patient will be lost. The thresholds database 88 permits the thresholds used by the MEI for matching data records, as described below, to be adjustable. For example, an operator may set a high threshold so that only exact data records are matched to each other. A lower threshold may be set so that a data record with fewer matching data fields may be returned to the user in response to a query. The details of the matching method will be described below in more detail.

The exception occurrence database 80 allows the MEI to maintain a record of all of the exceptions that have occurred. The exception occurrence database may store the actual exception conditions that have arisen during processing. For example, the exception occurrence database may contain an entry that represents that entity 100.2 has two data records with different values for the "sex" attribute.

The operator of the MEI may clear the identity database 78 without clearing the data record database 80. Thus, an operator may have the MEI receive a plurality of input data records and generate a plurality of links with a particular matching threshold level, as described below, being used. The operator may then decide to perform a second run through the data using a lower matching threshold level to produce more links, but does not want to delete the data records themselves, and does not want to delete the identity and non-identity rules from the rules database created during the first run through the data. Thus, the operator may delete the identity database, but keep the control databases, and in particular the rules database, for the second run through the data. Now, a method of adding or updating data in the master entity index in accordance with the invention will be described.

Figure 4:
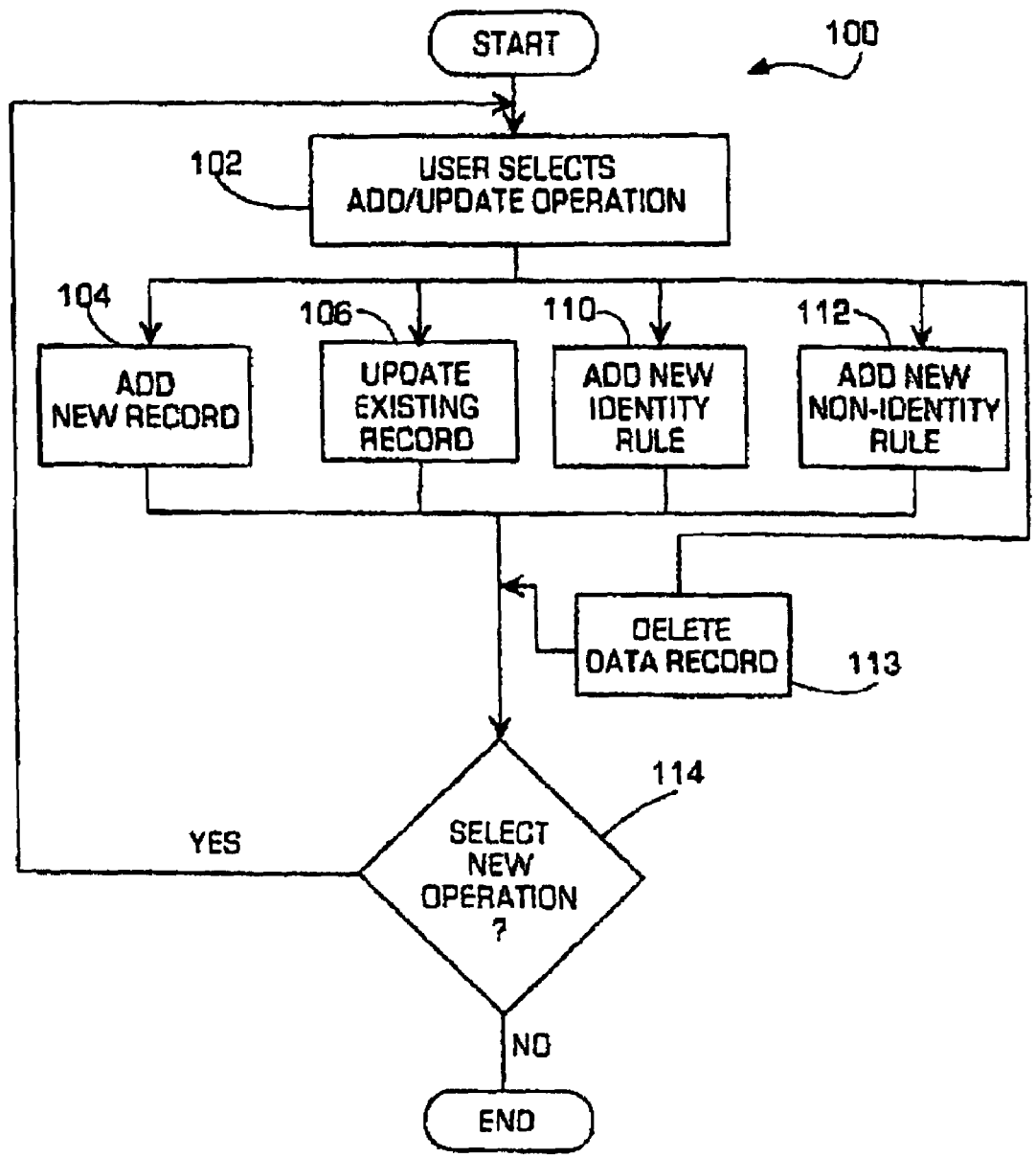
FIG. 4 is a flowchart illustrating a plurality of input operations that may be executed by the master entity index of FIG. 2.

FIG. 4 is a flowchart illustrating a method 100 for adding or updating data within the master entity index system. The user selects an add/update operation in step 102 which permits the user to select, for example, an add new data record operation 104, an update an existing data record operation 106, an add new identity rule 110, an add new non-identity rule 112, and a delete data record operation 113. The add new data record operation permits a user of the MEI to add a new data record containing information about an entity into the MEI while the update an existing data record operation permits a user of the system to update the data record or information about an entity that already exists within the MEI. The add identity and add non-identity rule operations permit the user to add identity or nonidentity rules into the rules database 80 shown in FIG. 3. The delete operation permits the user of the MEI to delete a data record from the data records database. Each of these operations will be described in more detail below with reference to FIGS. 7-12. The MEI may then determine whether there are additional addition or updating operations to perform in step 114 based on the user's response and either exit the method or return to step 102 so that the user may select another addition or updating operation. The add/update/delete operation may also be used for the control databases to add/update information in those databases, and additional processing may occur due to changes in the control databases which may change the identity database. In all of those cases, the additional processing is to identify the existing identity records that are impacted by the modification, and to use the match/link operation to re-compute the appropriate entries in the identity database. For example, removing a record for the anonymous name database would cause re-computation of identities of all records with that anonymous name, and all records linked to those records.

For all of the data records stored by the MEI, a record identifier may be used to uniquely identify the entity referred to by that record compared to other data records received from the data source. For example, in data records obtained from a hospital information system, an internally-generated patient identifier may be used as a record identifier, while in data records from a health plan membership database, a social security number can be used as a record identifier. A record identifier differs from an entity identifier because its scope is only the data records from a single data source. For example, if a person in a health plan is a patient in the hospital, their hospital record will have a different record identifier than their health plan record. Furthermore, if records from those two data sources happened to have the same record identifier, this would be no indication that the records referred to the same entity.

An additional aspect of the data record database is that one or more timestamps may be recorded along with the data record. The timestamps may indicate when the data record was last changed (e.g., when the data record is valid) and when the data record was received from the information source. The timestamps may be used to track changes in a data record which may indicate problems, such as fraud, to the operation of the MEI. The timestamps may be generated whenever a data record is added to the MEI or updated so that the historical changes in the data record may be documented. Additionally, individual attribute values may be associated with status descriptors that describe how the values should be used. For example, an attribute value with an "active" status would be used for identification, an attribute value with an "active/incorrect" status would be used for identification but not presented to the operator as being the correct value (for example, an old address that still occurs in some incoming data records), and a status of inactive/incorrect means that the value should no longer be used for matching but should be maintained to facilitate manual review. Now, a method for querying the MEI in accordance with the invention will be described.

Figure 5:
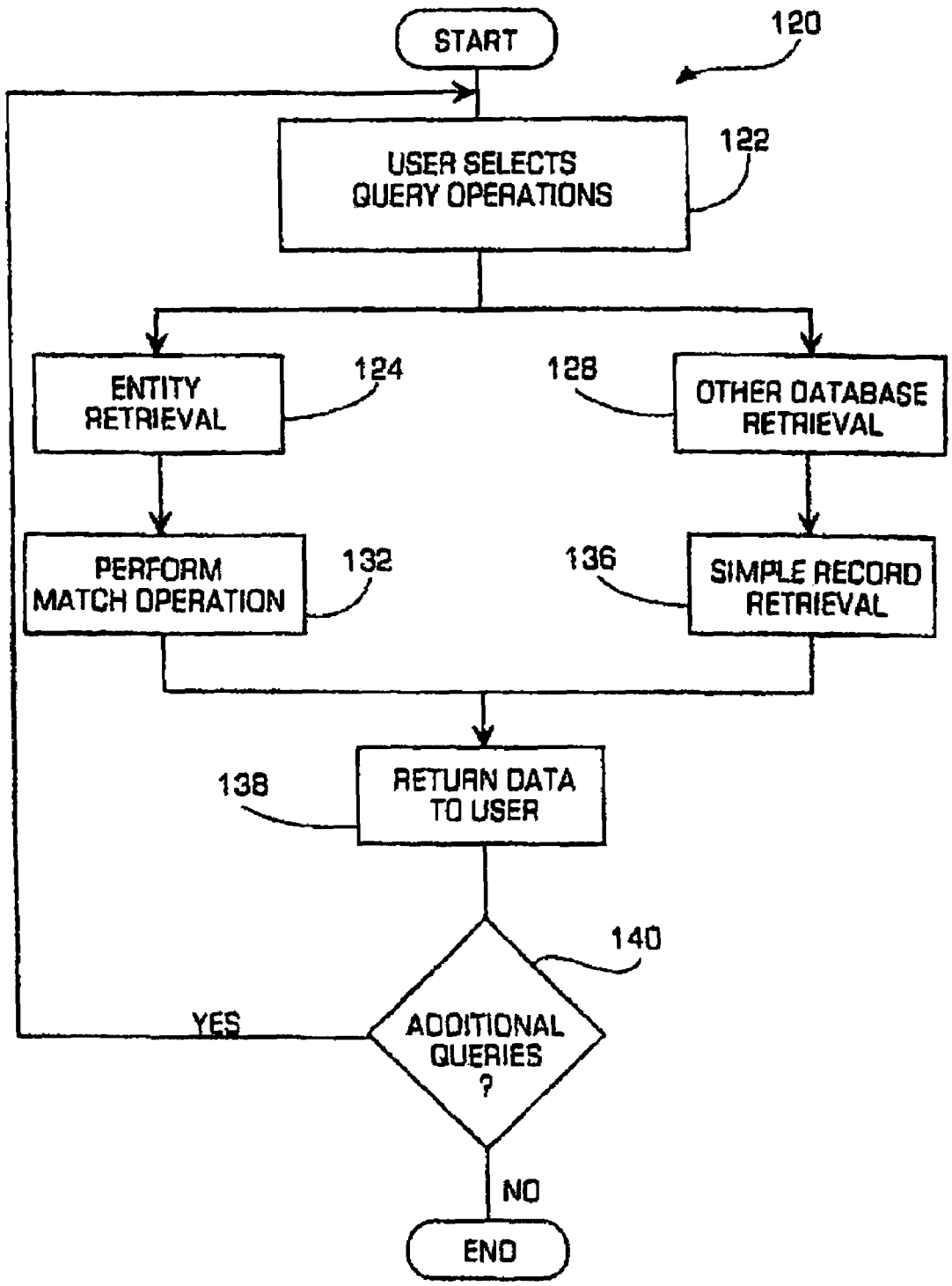
FIG. 5 is a flowchart illustrating a plurality of query operations that may be executed by the master entity index of FIG. 2.

FIG. 5 is a flowchart illustrating a method 120 for querying the master entity index in accordance with the invention. The querying operations permit the user to retrieve information from the MEI about a particular entity or data from one of the control databases. After a user selects the query operation in step 122, the user may select from a particular query operation that may include an entity retrieval operation 124, or a database query operation 128. For the entity retrieval operation, the MEI in step 132 may execute the match operation 300 described below. During the match operation, an input query may be matched against data records within the various information sources, as described in more detail below with reference to FIG. 15. For the database retrieval operation, the operator specifies a database and a set of attribute values that indicates the records of interest. The MEI in step 136 may locate those records in the specified database that has corresponding values for the specified attributes.

Additional queries may be performed by the MEI. The MEI may be queried about the number of entities in the MEI database and the MEI may respond with the number of entities in the MEI database. The MEI may also be queried about the volatility (e.g., the frequency that the data records change) of the data in the data records using a timestamp indicating the last time and number of times that the data has been changed that may be associated with each data record in the MEI. The volatility of the data may indicate fraud if the data about a particular entity is changing frequently. The MEI may also be queried about the past history of changes of the data in the data records so that, for example, the past addresses for a particular entity may be displayed. Once the queries or matches have been completed, the data is returned to the user in step 138. The MEI may then determine whether there are additional queries to be performed in step 140 and return to step 122 if additional queries are going to be conducted. If there are no additional queries, the method ends. Now, an exception processing method that may be executed by the MEI will be described.

Figure 6:
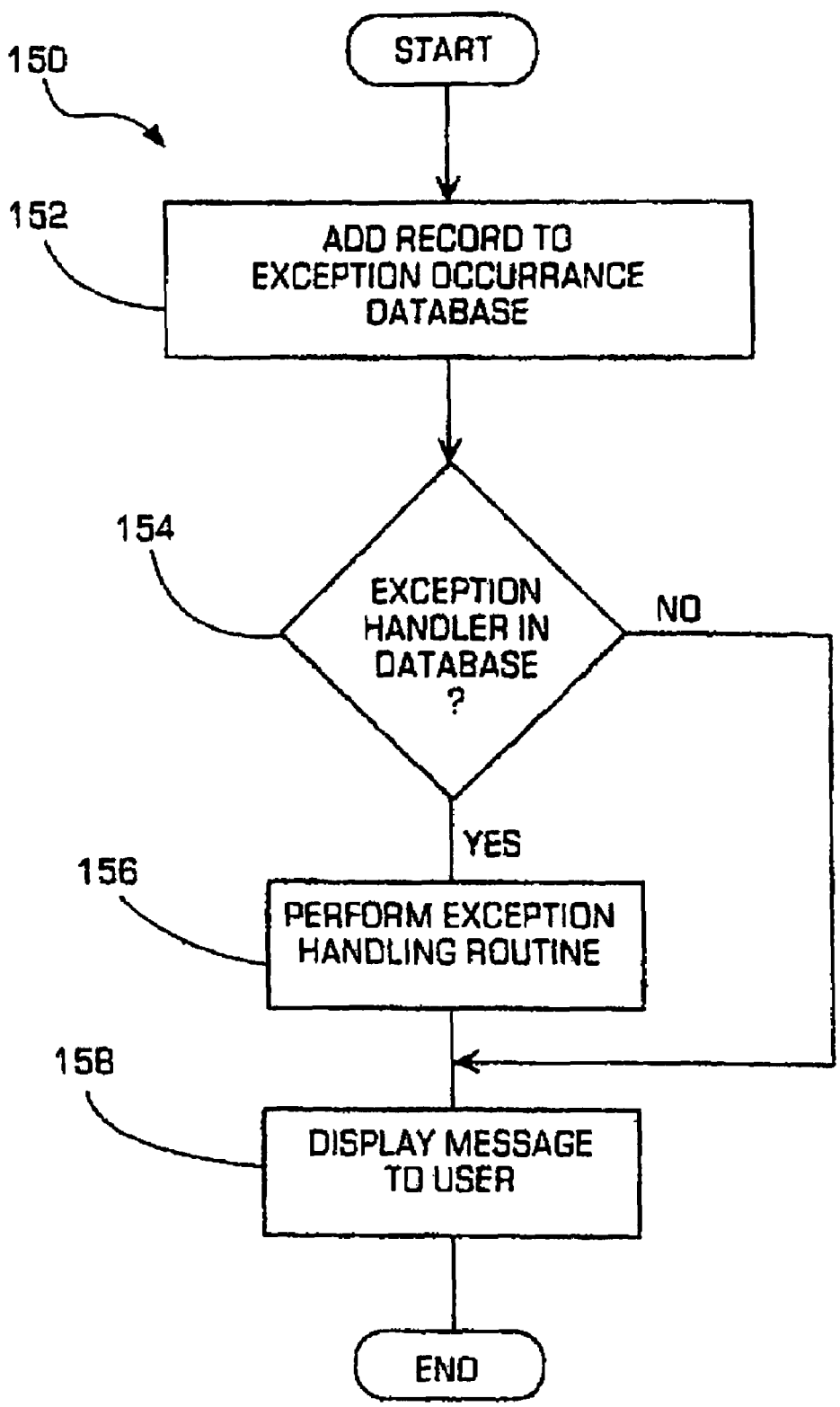
FIG. 6 is a flowchart illustrating a plurality of monitor operations that may be executed by the master entity index of FIG. 2.

FIG. 6 is a flowchart of a method for processing exceptions 150 that may be executed by the MEI. The input is data describing the occurrence of an exception, for example, an entity whose data records indicate two different values for the entity's sex. In step 152, the exception given as input to the operation is recorded in the exception occurrence database. In step 154, the MEI determines if there is an exception handling rule within the exception handling database 82 for handling the anomaly, as shown in FIG. 3 As described above, the exception handling database contains a plurality of rules for handling various types of exceptions. If an exception handling rule is in the exception handling database, in step 156, the MEI may perform the exception handling routine in the database. The routine may generate a message for the operator or may process the data using another software program. A message may be displayed to the user in step 158. If there was not an exception handling routine in the exception handling database, then a message is printed for the user in step 158. The message may require the user to perform some action or may just notify the operator of the action being taken by the MEI in response to an exception. After the message is displayed, the exception handling method has been completed. Now, the operations that may be performed by the MEI during the addition and updating data method will be described.

Figure 7:
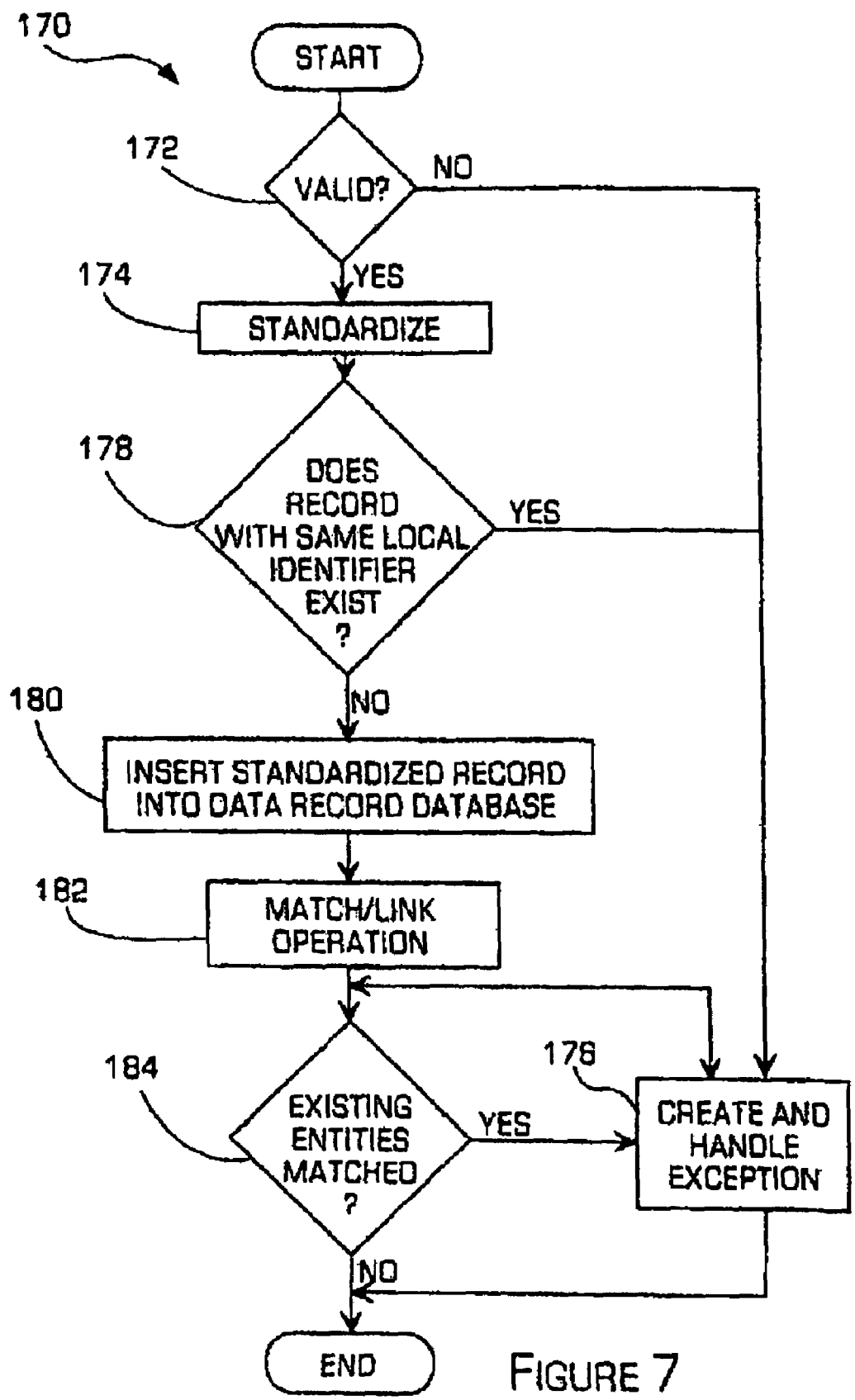
FIG. 7 is a flowchart illustrating a new data record addition operation that may be executed by the master entity index of FIG. 2.

FIG. 7 is a flowchart illustrating a method 170 for inserting a new data record into the MEI in accordance with the invention. The insertion of a new data record for a new entity usually occurs when a particular information source has determined that the new data record should not refer to the same entity as any other data record previously generated by the information source.

For inserting a new data record into the MEI, a record containing the new data is received by the MEI from the user. The MEI may then attempt to validate and standardize the fields in the new data record.

Validation in step 172 may include examining the lengths of the fields or the syntax or character format of the fields, for example, as numeric fields may be required to contain digits in specified formats. Validation may also involve validating codes in the new data record, for example, valid state abbreviations or diagnostic codes. Additional data sets may be involved in the validation process, for example, a data set containing valid customer account numbers. If the validation process fails, in step 176 an exception may be created that indicates that invalid data is received, the exception handling method described above may be performed, and processing of the insert new record operation is complete.

During standardization in step 174, the MEI may process the incoming data record to compute standard representations of certain data items. For example, the incoming data record may contain the first name of "Bill" and the MEI may add a matching field containing "William" into the incoming data record so that the MEI may match data records to William. This standardization prevents the MEI from missing data records due to, for example, nicknames of people. Other kinds of standardization may involve different coding systems for medical procedures or standard representation of street addresses and other geographic locations.

The MEI may then attempt in step 178 to determine if a data record with the same record identifier already exists in the data record database. If the standardized input data has the same record identifier as an existing data record, in step 176 an exception may be created that indicates that a two data records with the same record identifier have been received, the exception handling method described above may be performed, and processing of the insert new record operation is complete. If the standardized input data does not have the same record identifier as an existing data record, then the standardized input data may be added into the MEI and a timestamp may be added to the data record in step 180. Then in step 182, the match/link method 210 described below and summarized in FIG. 15 may be performed. The match/link operation is initiated using the standardized input data, and its execution makes the results of the match/link operation available to the insert new data record operation. Then in step 184, the MEI may determine if the match/link operation linked the standardized input data record with any other records from the same information source. If so, in step 176 an exception may be created that indicates that a duplicate data record has been received, the exception handling method described above may be performed, and processing of the insert new record operation is complete. If not, the results of the match/link operation are returned to the operator and the insert new data record operation has been completed. Now, a method for updating an existing data record already in the MEI will be described.

Figure 8:
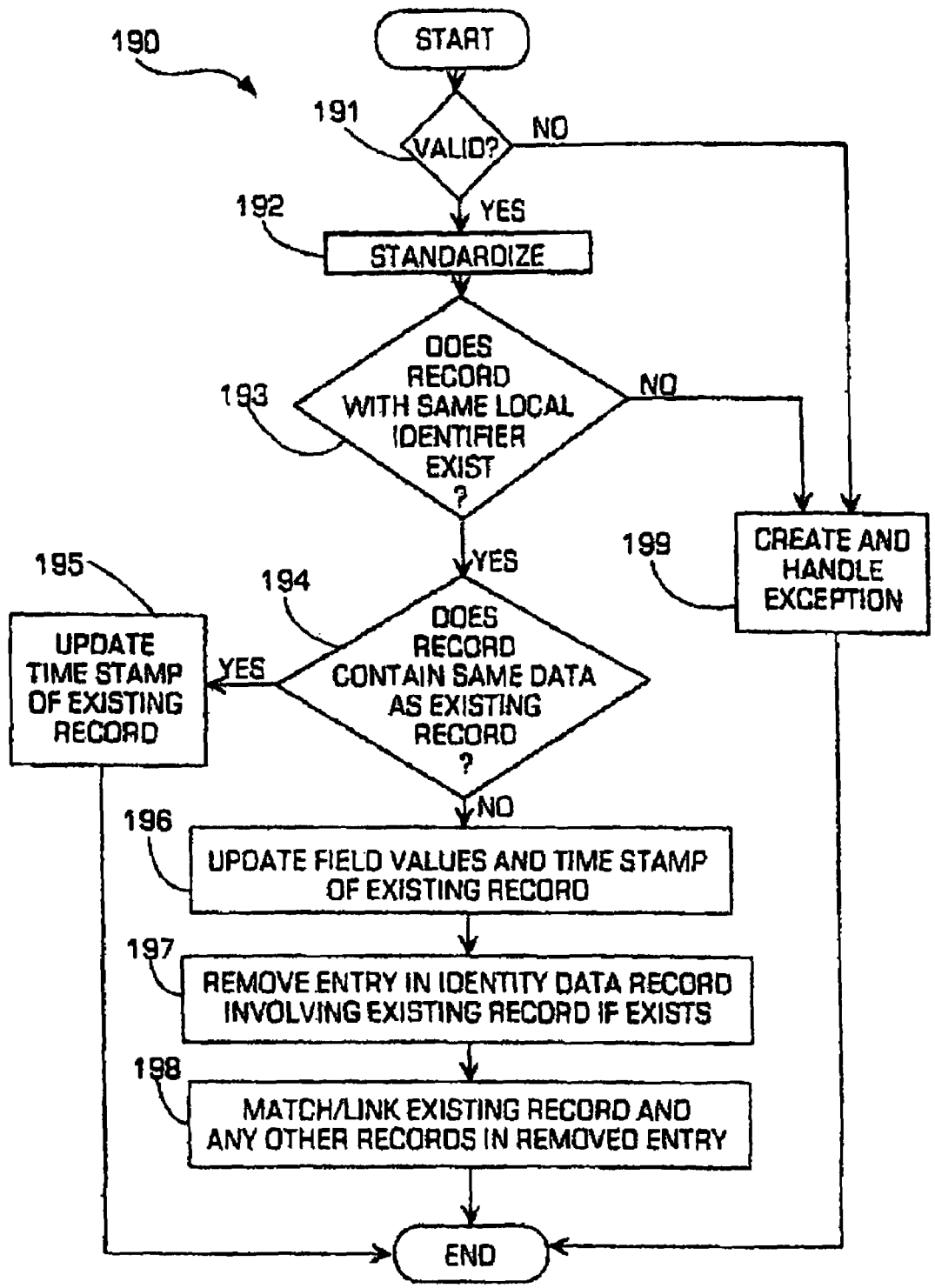
FIG. 8 is a flowchart illustrating an existing data record update operation that may be executed by the master entity index of FIG. 2.

FIG. 8 is a flowchart illustrating a method 190 for updating an existing data record containing information about a new or existing entity in accordance with the invention. Updates occur when an information source receives new information concerning an entity for which is already in its data store. The new information received by the information source will be communicated to the MEI through the update operation.

To perform the update method, the MEI may first test the input data for validity in step 191, using the same method as in step 172 of the add new record operation described in FIG. 7. If the validation process fails, in step 199 an exception may be created that indicates that invalid data is received, the exception handling method described above may be performed, and the processing of the update existing data record operation is complete. The MEI may then standardize the input data in step 192, using the same method as in step 174 of the add new record operation. The MEI may then attempt in step 193 to determine if a data record with the same record identifier as the standardized input data already exists in the data record database. If the standardized input data does not have the same record identifier as an existing data record, a new item may be added to the exception database in step 199 indicating that a duplicate data record was located, and no further processing is performed.

If the standardized input data does have the same record identifier as an existing data record, then the incoming data record is checked in step 193 to see if it contains exactly the same values for data fields as a data record already contained in the data record database. If the standardized input data does not have the same record identifier as an existing data record, in step 199 an exception may be created that indicates that a duplicate data record has been received, the exception handling method described above may be performed, and processing of the update existing data record operation is complete. If the standardized input data contains exactly the same values, then the execution of this operation cannot affect the identity database. As a result, the timestamp of the existing data record may be updated in step 195 to reflect the current time and processing of the operation is completed. If the standardized input data contains different field values than the existing record with the same record identifier, in step 196 the existing record's field values may be updated to be consistent with the values in the standardized input data, and its timestamp may be updated to reflect the current time. Since the data in the existing record has now changed, the impact on the identity database must be computed. To do this, the MEI in step 197 may first remove an entry in the identity database involving the existing record, if such an entry exists. The MEI may then perform a match/link operation in step 198 for the existing records and any other records referred to in the identity database record removed in step 197. These are the records that had been previously recorded in the identity database as referring to the same entity as the existing data record. The match/link operation performs as described in FIG. 9.

Once the match/link results have been returned in step 198 or the timestamp updated in step 195 or an exception has been generated in step 199, the add new data record operation has been completed. Now, a method for matching/linking a data record will be described.

Figure 9:
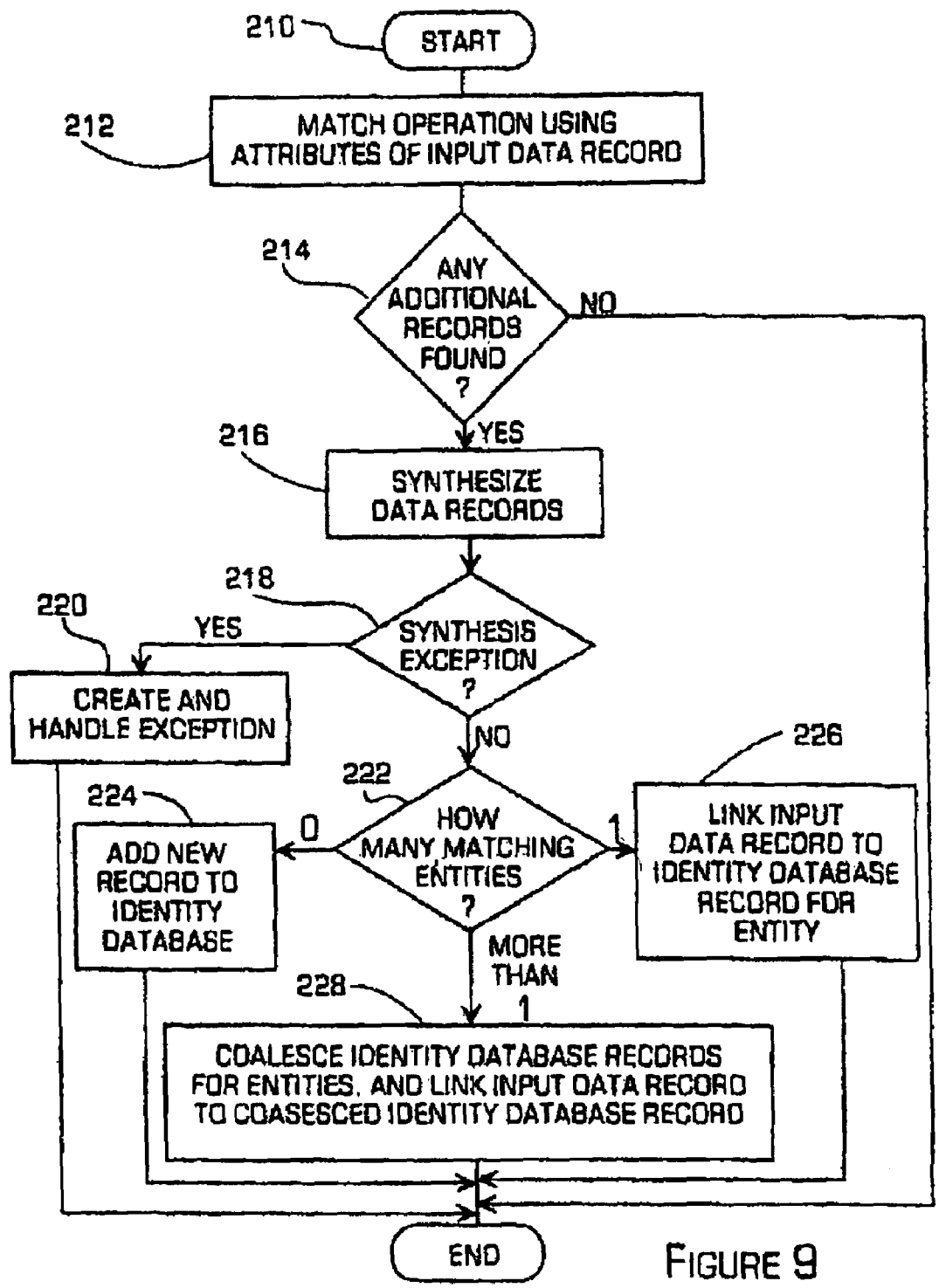
FIG. 9 is a flowchart illustrating the match/link operation that may be executed by the master entity index of FIG. 2.

FIG. 9 is a flowchart illustrating a method 210 for matching/linking a data record in accordance with the invention. This operation is used to determine the data records in the data record database that refer to the same entity as an input data record in the data record database.

To perform the match/link operation, in step 212, the MEI may perform the match operation 300 described below and diagrammed in FIG. 15. In this step, the data in the input data record is given to the match operation as its input, and the data records returned by the match operation are made available. The MEI may then in step 214 determine if any matching data records were made available. If no data records other than the input data record were returned, the match/link operation is completed. If at least one, other data record was returned, the incoming data record and matching data records may be synthesized in step 216. The synthesis process combines the data values in the new record and the existing records associated with the entities. The MEI may then in step 218 determine if a condition indicating a synthesis exception has occurred, as defined by the current contents of the exception database. For example, if the incoming data record lists the sex of the entity as male while one of the matching data records lists the sex of the entity as female, and the exception database states that coalescing records with different sexes is an exceptional condition, an exceptional condition will be identified. If an exception occurs, in step 220 the MEI may create and handle the appropriate synthesis exception and the processing of the match/link operation is complete. If there are no synthesis exceptions, then in step 222, the MEI may determine the number of identity records currently held in the identity database that link data records which match the input data record. If no identity records exist, in step 224, a record may be added to the identity database with a new unique base part and a version number of 0. If exactly one identity record exists, in step 226 the MEI may update this record to add a link to the input data record. If more than one identity record exists, the MEI in step 228 may "coalesce" these records—that is, remove the existing identity records and replaces them with a single identity record linking the input data records with all the data records returned in step 212. After one of steps 224, 226, and 228 are performed, the processing of the match/link operation has been completed. Now, a method for adding an identity rule in accordance with the invention will be described.

Figure 10:
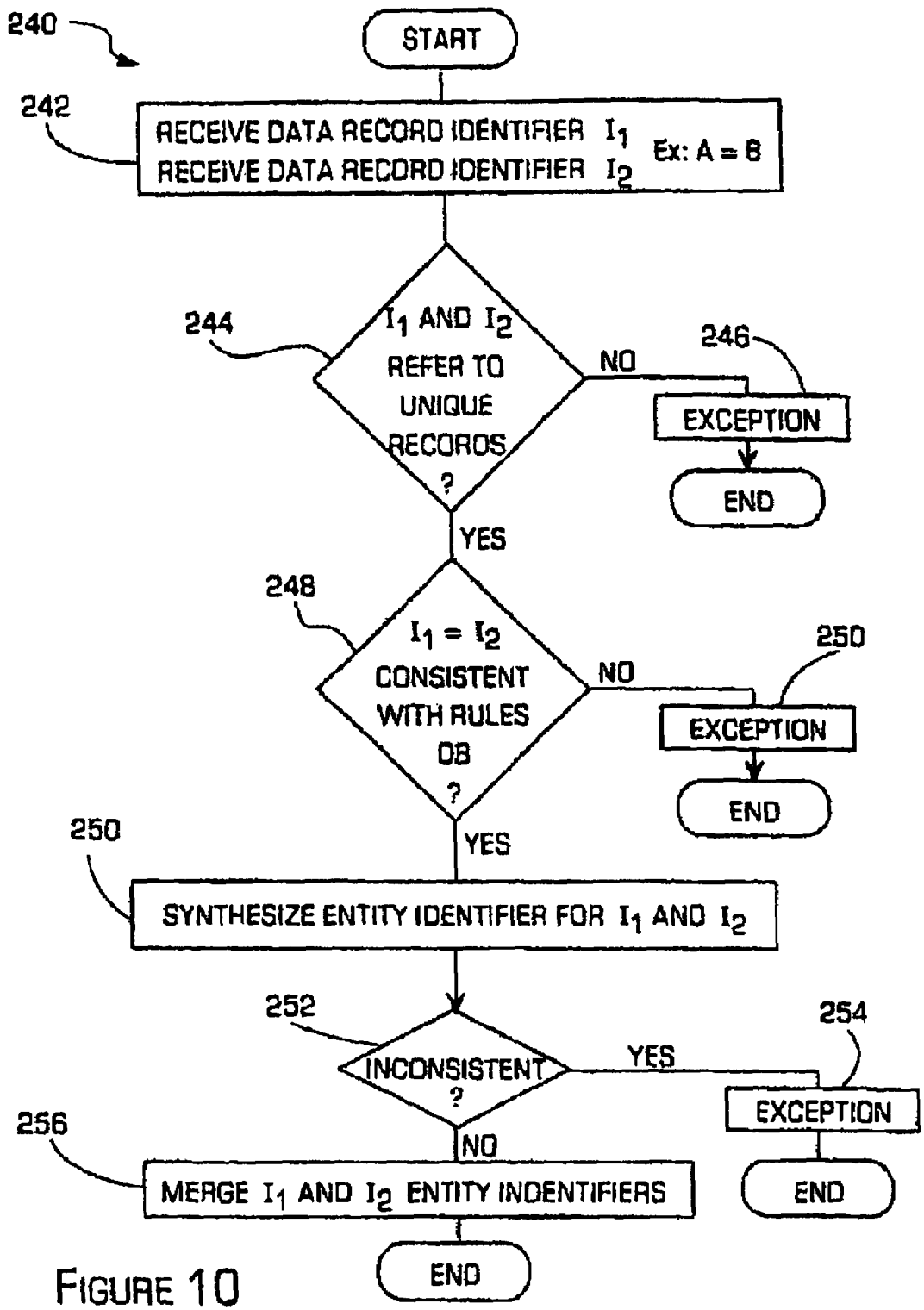
FIG. 10 is a flowchart illustrating an identity rule operation that may be executed by the master entity index of FIG. 2.

FIG. 10 is a flowchart illustrating a method 240 for adding an identity rule to the rules database of the MEI in accordance with the invention. In step 242, the MEI may receive two data record identifiers, $I.subtext.1$ and $I.subtext.2$. In this example, the identity rule is $I.subtext.1=I.subtext.2$ which means that these two data records contain information about the same entity. The MEI may then determine if the two identifiers refer to separate unique records in step 244 and an exception routine may be executed in step 246 if an exception occurs. If there is no exception, the MEI determines if the new identity rule is consistent with the rules already contained in the rules database in step 248. If there is an exception, such as the rules database has a non-identity rule that specifies that $I.subtext.1$ and $I.subtext.2$ are not associated with each other, an exception routine is executed in step 250. If the new identity rule is consistent with the other rules in the rules database, then the entity identifier containing the two data records are synthesized in step 250 to determine if there are any inconsistencies within the associations of the two entity identifier as shown in step 252. If there are any inconsistencies in the entity identifier, an exception handling routine is executed in step 254. Otherwise, the entity identifier containing the two data records are merged together in step 256 and the method is completed. Now, a method of adding a non-identity rule to the rules database in accordance with the invention will be described.

Figure 11:
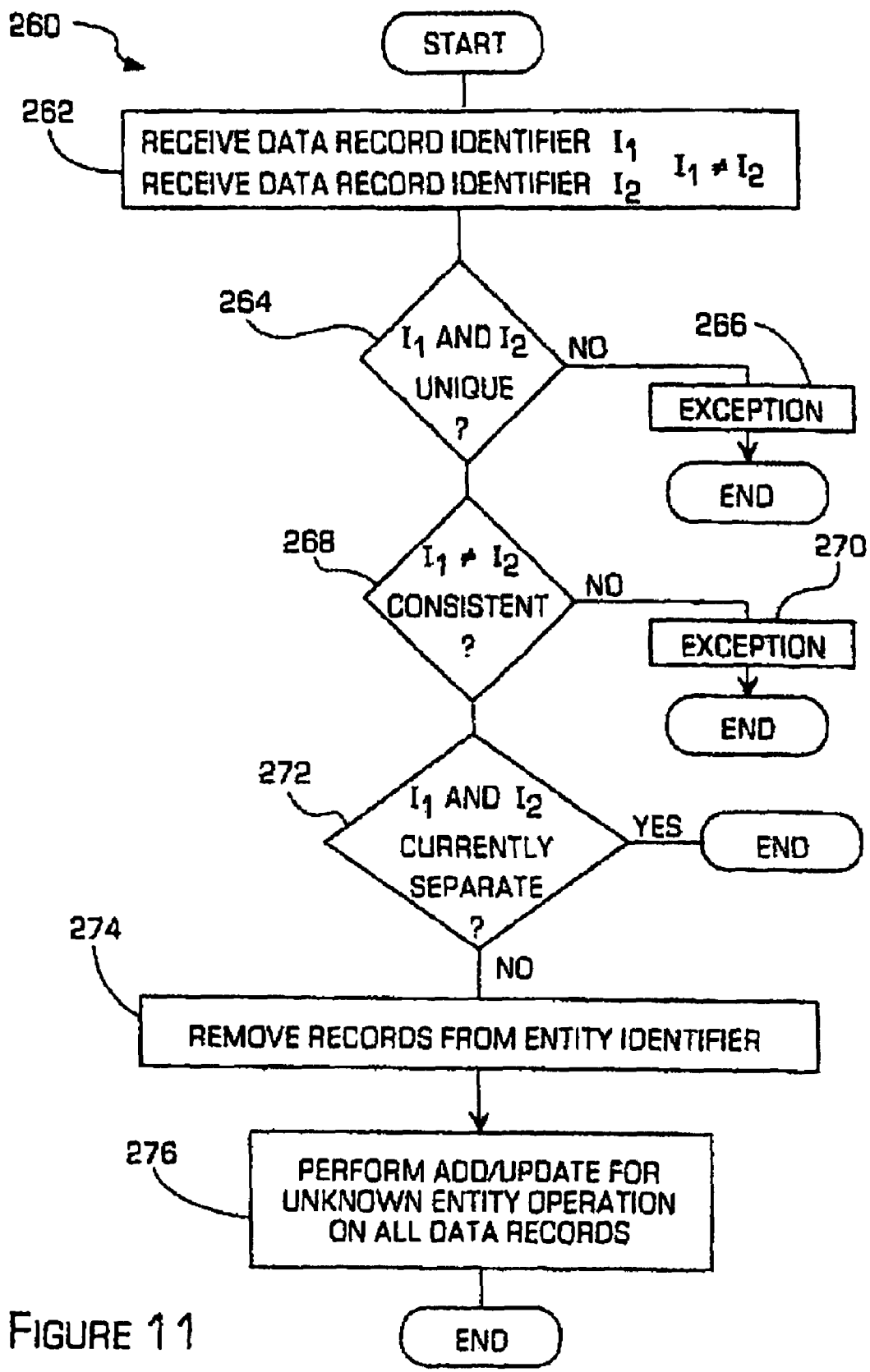
FIG. 11 is a flowchart illustrating a non-identity rule operation that may be executed by the master entity index of FIG. 2.

FIG. 11 is a flowchart illustrating a method 260 for adding a non-identity rule to the rules database of the MEI in accordance with the invention. In step 262, the MEI may receive two data record identifiers, $I.subtext.1$ and $I.subtext.2$. In this example, the non-identity rule is $I.subtext.1 \neq I.sub.2$ which means that these two data records contain information that is not about the same entity. The MEI may then determine if the two identifiers refer to separate unique records in step 264 and an exception routine may be executed in step 266 if an exception occurs. If there is no exception, the MEI determines if the new non-identity rule is consistent with the rules already contained in the rules database in step 268. If the new non-identity rule conflicts with one of the existing rules in the rules database, an exception occurs in step 270. If the new non-identify rule does not conflict, then the MEI determines whether the two data records corresponding to the identifiers are currently located in different entity identifier in step 272. If the data records are already separated, then the method ends. If the data records are not currently in different entity identifiers, then in step 274 the data records identified by $I.subtext.1$ and $I.subtext.2$ as well as the other data records are removed from the entity identifier containing the data records identified by $I.subtext.1$ and $I.subtext.2$ Then, in step 276, the match/link operation, as described above, is performed on each data record removed from the entity identifier. The match/link operation may re-associate those data records previously in the entity identifier with other data records or reestablish the entity identifier without either $I.subtext.1$ or I.subtext.2. Now, a method for deleting data records in accordance with the invention will be described.

Figure 12:
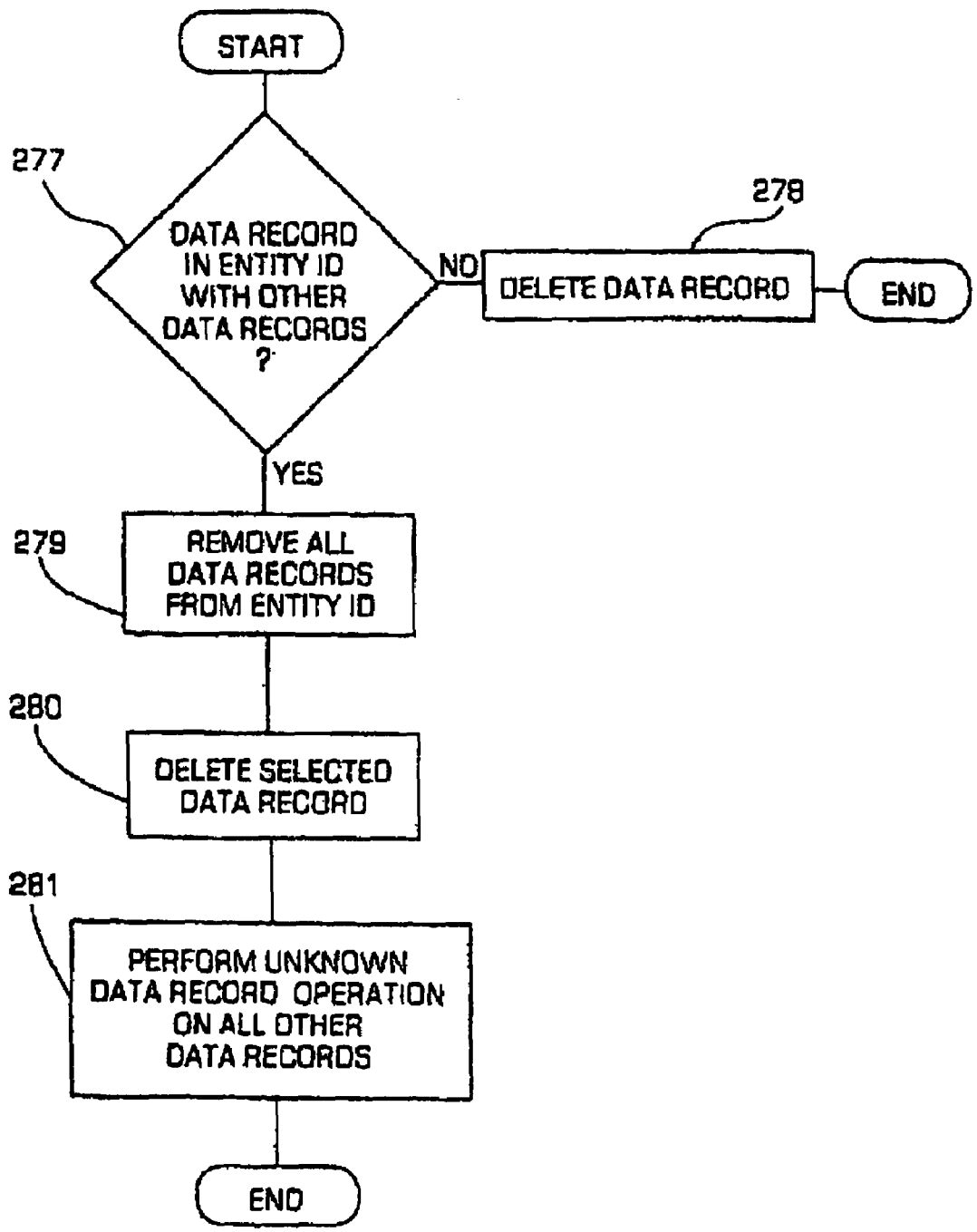
FIG. 12 is a flowchart illustrating a delete operation that may be executed by the master entity index of FIG. 2.

FIG. 12 is a flowchart illustrating a method for deleting a data record in accordance with the invention. In step 277, the MEI determines if the data record to be deleted is located within an entity identifier with other data records. If there are no other data records in the entity identifier, then in step 278, the data record may be deleted and the method is completed. If there are other data records associated with the data record to be deleted, then in step 279, all of the data records are removed from the entity identifier, and in step 280, the selected data record may be deleted. Then in step 281, a match/link operation, as described above, is executed for the other data records previously in the entity identifier. The match/link operation may re-associate those data records previously in the entity identifier with other data records or reestablish the entity identifier without the deleted data records. Now, a method for querying the MEI for data records and querying the MEI for information from the other control databases will be described.

Figure 13:
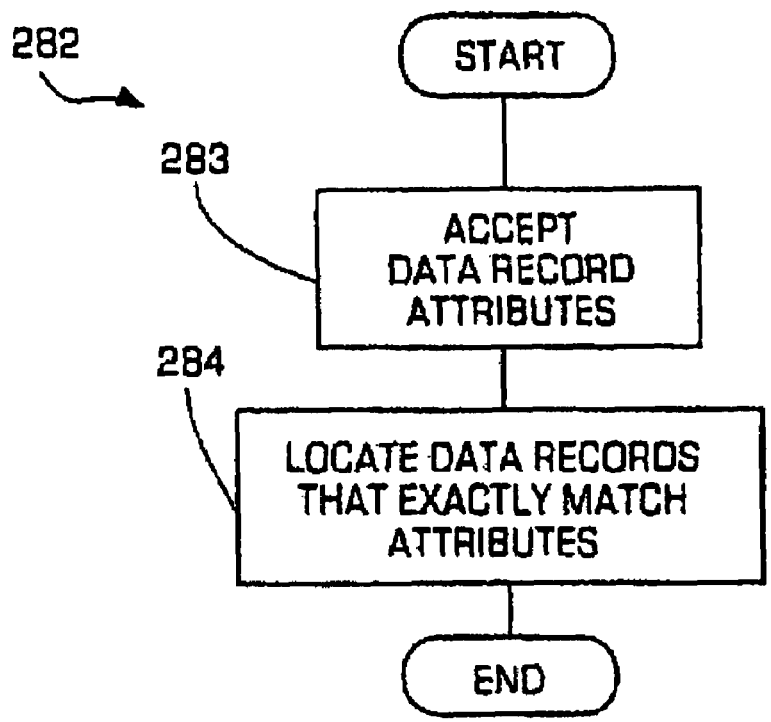
FIG. 13 is a flowchart illustrating a data record retrieval operation that may be executed by the master entity index of FIG. 2.

FIG. 13 is a flowchart illustrating a method 282 for querying the MEI system for data records about a particular entity. In step 283, the MEI accepts a query from the user that contains entity attributes. These attributes correspond to data fields within the data records stored by the MEI. In step 284, the MEI retrieves data records which have data fields that match the attributes provided in the query and displays those located data records for the user. The details of the matching method will be described below in method 300 and illustrated in FIG. 15.

Figure 14:
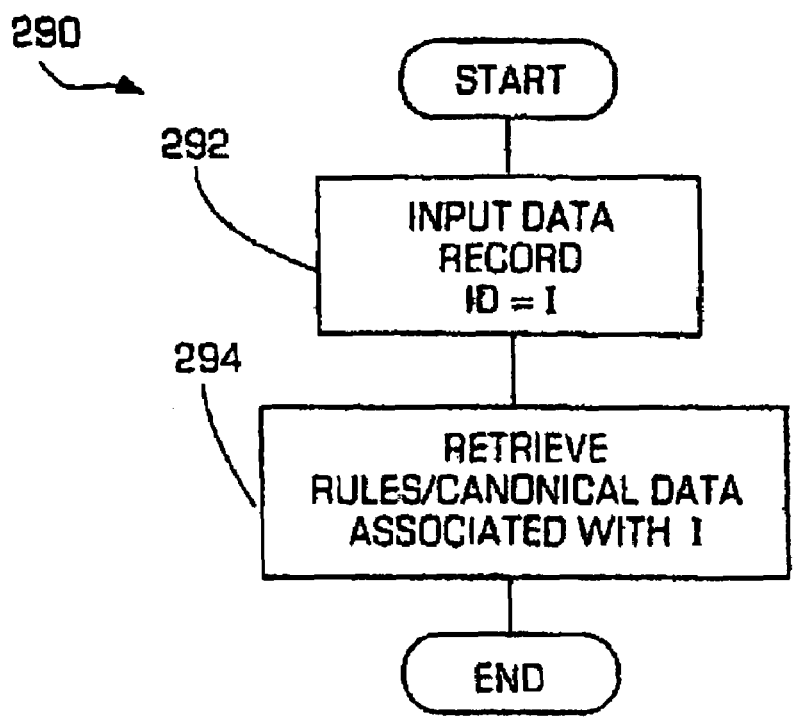
FIG. 14 is a flowchart illustrating a database retrieval operation that may be executed by the master entity index of FIG. 2.

FIG. 14 is a flowchart illustrating a method 290 for querying the MEI to locate information in the databases of the MEI. In step 292, the operator may input a database and values for fields maintained in records of the database. In step 294, the MEI may retrieve any information from the control databases relating to the data record identifier I. For example, if the user queries the MEI about rules in the rules database containing identifier I, the MEI may return the identity rule I=M and the non-identity rule I.notequal.N. Now, a method for computing the match operation data records in the MEI database based on a set of query attributes will now be described.

Figure 15:
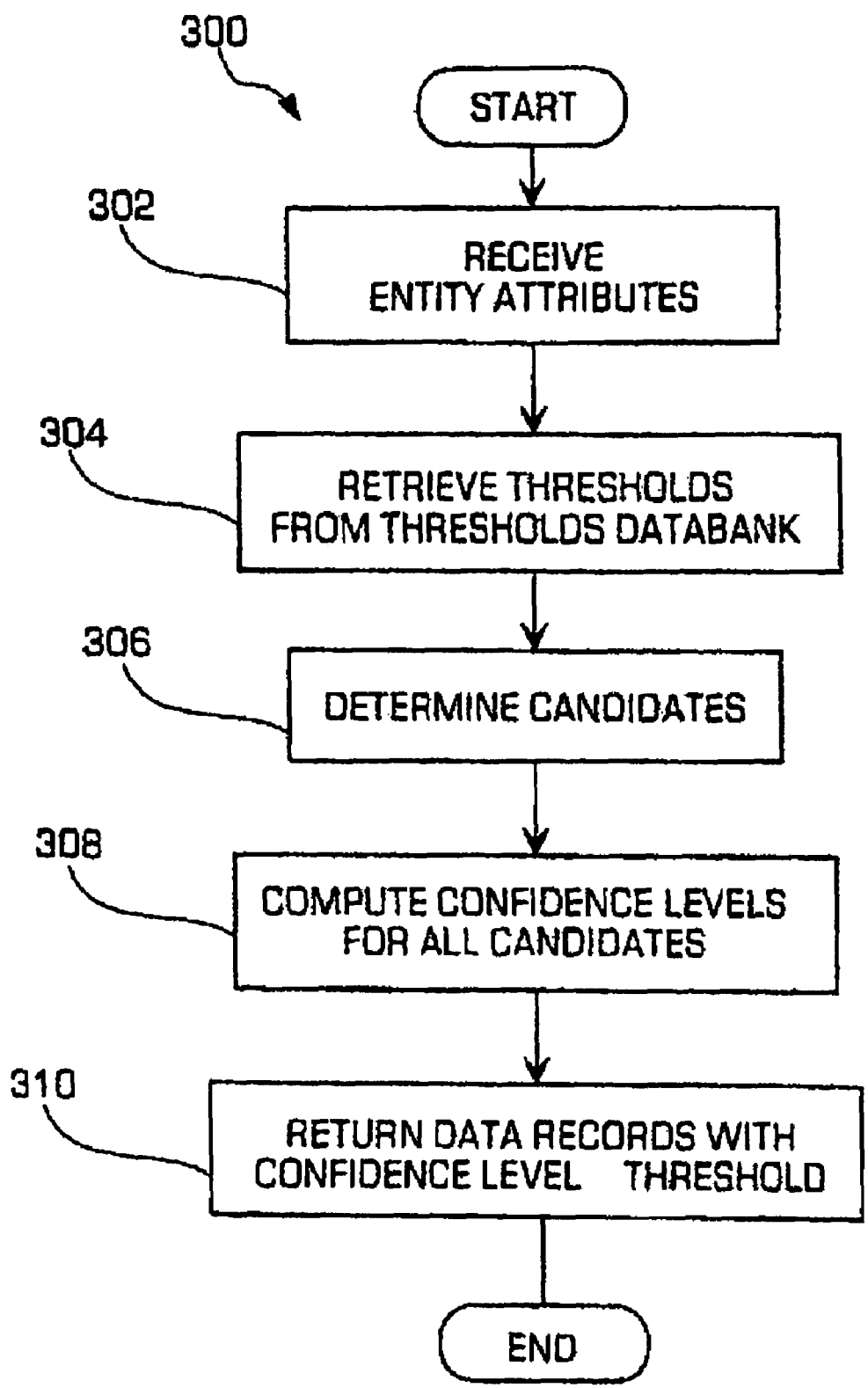
FIG. 15 is a flowchart illustrating a match operation that may be executed by the master entity index of FIG. 2.

FIG. 15 is a flowchart illustrating a method 300 for finding matching data records in the MEI database based on a set of query attributes in accordance with the invention. In step 302, the MEI accepts a query in the form of a list of entity attributes and associated values. Examples of entity attributes in a health care example could be patient number, first name, last name, or phone number, or if the database is a parts inventory, the part number, or the manufacturer for the part. In step 304, the threshold being used by the matching operation may be retrieved from the thresholds database shown in FIG. 3. As described above, the thresholds database permits different threshold levels to be used depending on how close a match is desired by the operator.

Once the threshold has been set, in step 306, a plurality of candidates may be retrieved. To select the candidates, the input attributes are divided into combinations of attributes, such as the last name and phone number of the patient, the first name and last name of a patient, and the first name and phone number of the patient. The data records in the MEI database are exactly matched against each combination of attributes to generate a plurality of candidate data records. Determining candidates from several combinations of attributes permits more fault tolerance because a data record may have a misspelled last name, but will still be a candidate because the combination of the first name and the phone number will locate the data record. Thus, a misspelling of one attribute will not prevent the data record from being a candidate. Once the group of candidates has been determined, the confidence level for each candidate data record may be calculated.

The confidence level may be calculated based on a scoring routine, which may use historical data about a particular attribute, such as a last address. Thus, if the current address and past addresses match a query, the confidence level is higher than that for a data record with the same current address but a different old address. The scoring routine may also give a higher confidence level to information more likely to indicate the same entity, such as a social security number. The scoring routine may add the confidence level for each attribute to generate a confidence level value for a candidate record (match score). Once the confidence levels have been calculated, any data records with confidence levels higher than the threshold level are displayed for the user in step 310. The method of matching attributes to data records within the MEI database has been completed.

In the past, confidence levels associated with attributes were not determined and assigned automatically. Typically, a highly trained and extremely skilled specialist is needed to set and validate various weights to individual attributes, perhaps with the help of some disparate utilities and programs. As the size, number, and complexity of data records continue to grow, there is a continuing need for better solutions in generating weights for measuring the likelihood of records belonging to the same entity.

Embodiments of the invention disclosed herein provide a new way of measuring the likelihood of records belonging to the same entity in a fast, scalable, objective, and reproducible manner. More specifically, embodiments of the invention provide a system and method for automatic weight generation, useful in measuring the closeness of a match across data records from various information sources. One embodiment of the invention combines utilities and programs with a search engine to perform complex weight generation across data record matching (e.g., from multiple data sources) with little or no user intervention. According to one embodiment of the invention, the search engine can be utilized in finding matching data records in the MEI database described above with reference to FIGS. 1-15.

Figure 16:
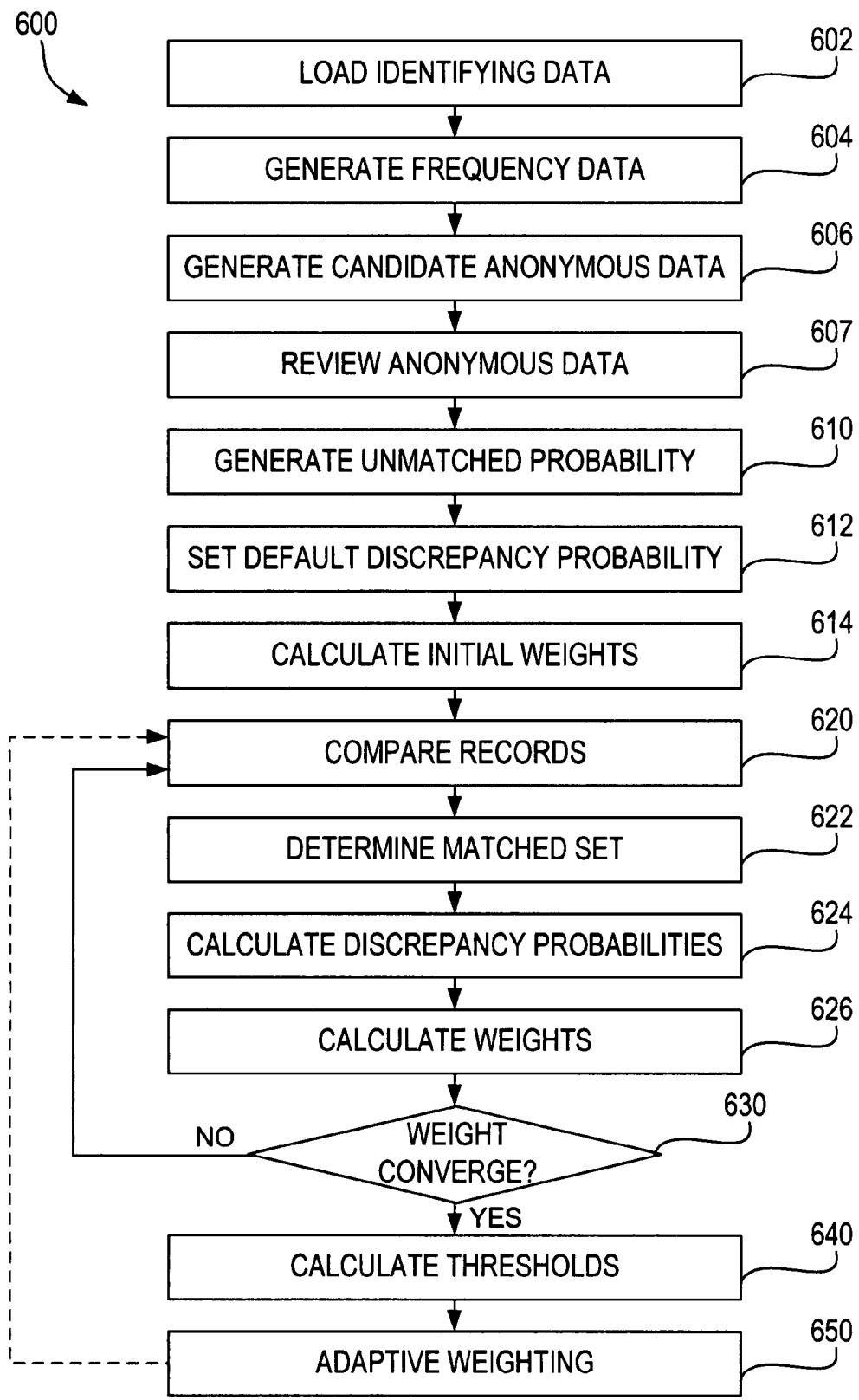
FIG. 16 is a flowchart illustrating an automatic weight generation process according to one embodiment of the invention.

FIG. 16 is a flowchart illustrating a weight generation process 600 according to one embodiment of the invention. One skilled in the art will appreciate that not all steps of process 600 need to be performed and that other implementations are also possible.

In the example shown in FIG. 16, step 602 includes loading identifying information from a plurality of data sources. In one embodiment, a subroutine implementing step 602 can load all or a portion of data from a database or a collection of data (e.g., a file containing a set of data records). Within this disclosure, the term "subroutine" generally refers to a module of computer-executable programming instructions that can be used repeatedly. Exemplary identifying information for an entity might include fields or attributes like first name, last name, address, phone number, social security number (SSN), date of birth, etc. for identifying a person. For the sake of illustration, attributes involved in process 600 are referred to herein as a selection of attributes. As one skilled in the art can appreciate, the selection of attributes to be used in an automatic weight generation process according to the invention disclosed herein is configurable and can vary from implementation to implementation.

Step 604 includes generating frequency data for certain attributes in the selection of attributes involved in process 600. In one embodiment, a subroutine implementing step 604 can identify the occurrence and frequency of certain types of attributes (e.g., more than one people could have the same last name and/or the same birthday). The generation of frequency data is not required for all attribute types (e.g., the frequency of SSN does not change in order of magnitude from person to person).

Step 606 includes generating candidate anonymous data. In one embodiment, a subroutine implementing step 606 can locate and eliminate erroneous data, including those which might have been entered by mistake or default (e.g., a default value for an unknown person's "Last Name" may be "Doe" and a default "Date of Birth" may have a value of 99/99/9999). The subroutine may look for continuity (e.g., "123 Home") and/or factoring out common values (e.g., "John Doe"). This is an optional step.

Step 607 includes reviewing candidate anonymous data generated in step 606. Like step 606, step 607 is optional. In one embodiment, a subroutine implementing step 607 can display an organized list of anonymous data to the user for optional inclusion/exclusion from being considered anonymous. One embodiment of the invention can be utilized by the MEI described above. As mentioned before, the anonymous name database 84 permits the MEI to automatically recognize names that should be ignored. The subroutine implementing step 607 can provide the user with the ability to add, modify, or otherwise edit the anonymous name database 84.

Step 610 includes creating or generating the unmatched probability data for the selection of attributes involved in process 600. In one embodiment, a subroutine implementing step 610 can generate, for each attribute, the unmatched probability which indicates, for each particular attribute, the likelihood that the attributes agree, partially agree, or disagree when the records pulled do not belong to the same person. As an example, suppose data records Record.001 and Record.002 have an agreement or a partial agreement on a particular attribute TelephoneNumber (i.e., they have the same or similar telephone numbers). According to one embodiment of the invention, a subroutine implementing step 610 can generate the unmatched probability which indicates the likelihood of obtaining similar phone numbers when the entity associated with Record.001 and the entity associated with Record.002 are not the same (i.e., the probability that phone numbers are similar at random).

As mentioned above, attributes can be in different types. To accommodate different types of attributes, various comparison techniques can be utilized to implement step 610. One embodiment of the invention includes comparison functions implementing attribute frequency counts and random re-sampling. Examples of both techniques will be described below in detail. In one embodiment, a comparison function may utilize a hybrid of these techniques. The determination as to what comparison technique to utilize may depend upon the types of attribute values. For example, a first comparison function may be applied to attributes with discrete values such as "gender", a second comparison function may be applied to attributes having a finite range of values such as "birthday", and so on. According to one embodiment of the invention, a comparison can be done by measuring a distance between two numbers for certain attributes such as phone numbers. In this example, the term "distance" refers to a degree of difference in digits (e.g., the difference between a first telephone number 5125551235 and a second telephone number 5125551238 may be a distance of one as the phone numbers are off by one digit). In this way, the closeness of two data records can be associatively reflected in terms of the closeness of their telephone numbers.

In one embodiment, a subroutine implementing random re-sampling operates to create sample pairs which are randomly unmatched. The chance of matching a randomly selected pair can be statistically insignificant. The unmatched random sample pairs can then be utilized to calculate the unmatched probability for each attribute in process 600. Unlike prior systems which simply interpolate the likely intermediate point between an exact match and a mismatch, embodiments of the invention calculate the actual mid points in an automatic process. In this way, very accurate weights can be developed for a plurality of comparison functions, including very complex comparison functions such as multi-dimensional comparisons.

The ability of embodiments of the invention to automatically generate weights can enhance the accuracy and performance of a matching operation. This can be particularly advantageous in determining the correct final match score under certain circumstances (e.g., multi-dimensional comparisons). To illustrate this point, as an example, suppose in comparing two records a weight of 3 is given because the name matches and a weight of 4 is given because the birthday matches, so the final result of this combined (i.e., name-birthday) comparison has a weight of 7. However, these two attributes are conditionally uncorrelated, which means that knowing one does not necessarily give weight to the other (i.e., the scores add to give the final score). As a more specific example, knowing that two different people are named "John Smith" does not indicate whether the birthdays should or should not match. On the other hand, suppose two different people have addresses that match. The chance or likelihood that they would also have phone numbers that match would be higher. Thus, the result from this second (i.e., address-phone) comparison is not additive (i.e. if the address alone weight is 4 and the phone alone weight is 3, then the address-plus-phone weight may be 5, which is less than the sum).

One embodiment of the invention may provide multi-dimension scores in the form of a multi-dimensional array of conditions, each has a weight to a condition associated with the attributes (e.g., "address exact, phone missing," "address off a little bit, phone missing," "address exact, phone exact," etc.). As an example, each attribute might have a weight which goes from −1: missing, 0: exact, 1: a little bit off, etc. In one embodiment, attributes that are conditionally correlated may be ignored.

Step 612 includes setting the default discrepancy weights for the selection of attributes involved process 600. This is an optional step. A subroutine implementing step 612 may operate to provide a set of default values which represent the data quality of a database from which data is loaded in step 602. Additionally, the subroutine may provide a user with the ability to set default values reflecting what the user believes to be representative of the data quality. That is, as an option, a person is allowed to specify how good the data is. As it will be described below with reference to step 624, the true discrepancy probabilities are calculated through an iteration process. The default discrepancy probabilities assigned in step 612 are used to start the iteration process, which, in this example, begins at step 620.

Another option to start the iteration process is to use existing rules. That is, instead of starting from scratch, one embodiment of the invention can start from a working hub (e.g., the MEI described above) that has been in operation for some time. People make decisions as they use the hub. The hub is configured to record those decisions and may already have a set of matched information (e.g., data records) that has been accumulated over time. Thus, such an existing hub may have information which reflects actual human experience in scoring its data records. One embodiment of the invention can use all or part of those decisions in process 600 (e.g., to seed the iteration process which begins at step 620). Even if additional data source(s) is/are to be added, it might be useful to start process 600 with an existing hub and utilize a set of records in the hub already reviewed in the past as they would have some relation to the data set subject to scoring.

Step 614 includes calculating the initial weights for the selection of attributes in process 600 based upon probabilities determined in steps 610 and 612. In one embodiment, a subroutine implementing step 614 can calculate the initial weight ($W_i$) of an attribute using a first probability ($P(\sim|U)$) determined in step 610 and a second probability ($P(\sim|M)$) determined in step 612 such that $W_i = \log_n(P(\sim|M)/P(\sim|U))$. This is done for each attribute prior to starting the iteration process described below.

Step 620 includes comparing and matching records using weights automatically generated thus far. In one embodiment, a subroutine implementing step 620 can include a software engine configured to perform the record comparison. Initially, the software engine utilizes the weights generated in step 614 to compare records within the file and calculate scores on each pair of records. As an example, a high score may mean that a matched set of records look alike and a low score may mean that they do not look alike.

Step 622 includes determining a new matched set. In one embodiment, a subroutine implementing step 622 is translatable to evaluate each attribute in process 600 and determine whether to update any probabilities associated therewith. To do so, an attribute under evaluation is removed from consideration in the determination of matched pairs. For example, suppose the probability of SSN is under evaluation, SSN is taken or left out of the mix (e.g., by setting the weight of SSN to zero) when determining a matched set. This takes the bias out when computing the probability of SSN and is done separately for each attribute. In one embodiment, results are stored separately for each attribute. Thus, if desired, final scores can be calculated based on a specific attribute or attributes.

For records to be in a matched set, they have to at least meet a certain threshold value. In one embodiment, a very low threshold value (e.g., 6) is used to link the records. This allows a large number of candidates for comparison. According to embodiments of the invention, the thresholds can be completely configurable. For example, if data loaded in step 602 have many different attributes, the threshold could be set a littler higher.

In one embodiment, for records to be in a matched set, they have to meet at least two thresholds. The first one pertains to the overall match score and the second one pertains to a percentage of a possible match. For example, suppose scoring record one ("R1") against itself results a 10. Thus, the most any record can score against R1 is 10. In order to be in the matched set, records would have to score above a certain threshold value (e.g., 6) and has to be a certain percentage (e.g., 95%) of a possible score (e.g., 10). Setting the latter one high (e.g., 95% or more) can result almost identical pairs per attribute type.

As another example, suppose scoring record two ("R2") against itself results a 12. Thus, the most any record can score against R1 is 10 and the most any record can score against R2 is 12. Assume further that SSN of R1 has a score of 4 and SSN of R2 has a score of 3. In this example, SSN is representative of an attribute whose weight is reset to zero or otherwise removed from consideration:

|  | R1 | R2 |
|---|---|---|
| Maximum possible score per record | 10.0 | 12.0 |
| SSN | 4.0 | 3.0 |
| Maximum possible score with SSN removed | 6.0 | 9.0 |

In the above example, the score associated with SSN is subtracted from the score of the record. Thus, with SSN removed from consideration, the best a record can score against R1 is 6 and the best a record can score against R2 is 9. When comparing without SSN, a record would need to have 95% of 6 in order to be in the matched set. Next, an attribute "Name" having a weight of 5 is subtracted out. Similarly, an attribute "address" having a weight of 6 is subtracted out. This generates a match score with each attribute removed and results a matched set which is unique to each attribute (e.g., a matched set which is unique to SSN is a set of records that have good agreement on everything except for SSN). That is, a new matched set for a particular attribute is calculated by eliminating that particular attribute from the consideration, calculating a new matched set for that attribute, and finding and removing errors. The other evidence (e.g., attributes) besides SSN would indicate whether these records are the same. The new matched set is then used for recalculating the discrepancy weights in step 624.

Step 624 includes determining the discrepancy probabilities for the new matched set. In one embodiment, a subroutine implementing step 624 is translatable to take the pairs in the matched set and calculate the probabilities of matching with respect to each attribute (e.g., how many are exact matches, how many are one off, how many are two off, etc.). This is done for all attributes.

Step 626 includes calculating and creating a new set of weights based upon updates generated in step 622 and step 624. In one embodiment, a subroutine implementing step 626 is translatable to calculate the new weights based upon the unmatched probability tables and the newly updated discrepancy tables.

Step 630 includes testing for convergence with respect to a threshold. The above-described portion of process 600 automatically repeats from step 620 to step 630 until the weights converge to their final value (i.e., until the difference between new weights generated in step 626 and old weights used in step 620 are less than a predetermined amount). The method of automatic weight generation for probabilistic matching has been completed. Unlike the old rule-based approach, the score-based approach described above is a very robust way of generating weights and calculating a matched set.

In one embodiment, process 600 further includes step 640 for determining candidate thresholds for a real-time system based upon the newly generated sets of weights. In one embodiment, candidate thresholds include nominal auto-link threshold and clerical-review threshold. The former is related to false positives and the latter is related to false negatives. The newly generated sets of weights can be applied to find two candidate error rates, which specify the acceptable limits of false-positives and false-negatives (e.g., 1 in 100,000). As an example, in one embodiment, a software module can operate to establish the maximum number that each record can score for itself. Thus, if a second record somehow scores higher than the maximum number of a first record, it is a false-positive. In one embodiment, a person is allowed to review the candidate pairs and adjust if desired.

In one embodiment, process 600 further includes step 650 for creating tables for adaptive weighting. As an example, suppose data records in a database have been compared, matched up, and linked via process 600. The results of people actually reviewing the linking would be useful information to feed into process 600 and perhaps influence the determination on the matched and unmatched sets. Thus, in one embodiment, a software module implementing step 650 is translatable to record manual review results and then re-do the iterative estimation process using the same set of data, incorporating the results from the manual review. This can further refine the accuracy and performance of the real-time system.

A data processing system implementing one embodiment of the method of automatic weight generation for probabilistic matching will now be described in detail. As one skilled in the art can appreciate, the system described below is meant to be exemplary and can be modified, altered, augmented, or otherwise implemented in various ways without departing from the spirit and scope of the invention.

In one embodiment, the data processing system may allow a user to select anonymous values from a list generated by profiling the data. For example, for attributes like SSN, Phone Number, Zip code, and alternate ID, the anonymous values are determined by frequency. Values are marked as anonymous if their frequency is greater than a configurable multiplier of the average frequency. As a more specific example, if the average phone number occurs 1.2 times, then a value is flagged as anonymous if it has occurred more than f_phone*1.2 times.

In this example, a frequency is computed for each birth date and anonymous values are identified by comparing the frequency of the birth date to the average frequency of adjacent dates. In one embodiment, a software module may operate to, for each birth date, compute an average frequency for the 3 dates preceding the birth date, and the 3 dates that follow the birth date (i.e., if this date is either the first or the last, take the average of the 6 dates that follow or precede respectively). The software module may flag the birth data as anonymous if its frequency is greater than f_bdate*the average frequency. For names, the software module may compute the frequency of each name token and filter out the common first and last names using a list of names from, for example, the census department or other external list. After removing the common names, the software module may compute the average name frequency and flag any name as anonymous if its frequency is greater than f_name*average name frequency. In addition to the anonymous values that are identified by the frequency calculations, each attribute has a default list of anonymous values that can be modified by the user. For example, for Name the default list would contain "UNKNOWN", and for Phone Number the default list would contains "99999999". The final anonymous list can be reviewed and optionally modified by the user.

One embodiment of the data processing system comprises one or more computer readable media carrying computer-executable instructions translatable to:
1. Create the unmatched probability tables for all attributes involved in a comparison algorithm.
2. Set the default discrepancy weights for these attributes.
3. Calculate the weights based upon these tables.
4. Run the bulk cross-match.
5. Determine the matched set for recalculating the discrepancy weights.
6. Calculate the discrepancy probabilities.
7. Calculate the weights based upon the unmatched probability tables and the new discrepancy tables.
8. Tabulate the differences between the new weight table computed in step 7 and the prior table used in the bulk cross-match of step 4.
9. If this difference is larger then repeat beginning at step 4 with the new weight table.
10. Calculate nominal auto-link and clerical-review thresholds.
11. Create tables for adaptive weighting.

These steps can be implemented in a real-time system (e.g., an operational hub) in many ways. One example is described below with specific details for the purpose of illustration.

Creating Tables for Unmatched-Set Probabilities

Two methods can be used to calculate unmatched probabilities. Here, attribute frequency counts is used for name, gender, and e-mail address, and bootstrap sampling is used for SSN, address, phone, and alt-ID. The birth date comparison is a hybrid which uses both frequency (only for the year) and bootstrap sampling.

Before the unmatched tables can be created by bootstrap sampling, a large table of randomly selected member pairs would need to be created. This table may contain several million pairs (the number of bootstrap pairs may be a parameter, for example, "numboot", whose default value is 3 million). The only requirement is that the pairs point to different members (e.g., memrecno_k_1< >memrecno_k_2 for all pairs k=1, 2, . . . , numboot). An example of the table containing randomly selected member pairs is illustrated in Table 1.

TABLE 1

| Bootstrap pairs | |
| --- | --- |
| memrecno_1_1 | memrecno_1_2 |
| memrecno_2_1 | memrecno_2_2 |
| . . . | . . . |
| memrecno_numboot_1 | memrecno_numboot_2 |

The bootstrap pairs may be saved for testing the weight generation process several times with the same random set. Otherwise, it is not necessary to save them. Various known storage schemes (e.g., floating point, integer, etc.) can be utilized to store tables disclosed herein. For clarity, some are listed as separate tables. However, they can be combined where appropriate.

Default Discrepancy Probabilities

The true discrepancy probabilities are calculated by iteration through the bulk cross-match. However, to start the process, a weight table is needed to perform the cross match. This table is created using the true unmatched probabilities along with a default set of discrepancy probabilities. If there is a prior weight table which is applicable to the particular data set, it may be used to start the process.

The default discrepancy tables are calculated analytically based upon an input "data quality" parameter. This parameter is called q_d and is equal to 0.05 for normal data, 0.20 for bad data, and 0.01 for good data. The default should be 0.05 for normal data.

Determining the Matched Set

Based upon a bulk-cross match, all unique pairs are selected that score greater than a threshold T_mat (e.g., 5 may be the default value). This is the candidate matched set. No link sets are formed. For each attribute used in comparison, a subset of this set is selected for calculating the discrepancy probabilities for that attribute. The selection of this subset is based upon the component scores from the comparison. Table 2 exemplifies information required for each pair in the candidate matched set:

TABLE 2

| Detailed scoring information for each pair | | | | |
| --- | --- | --- | --- | --- |
| Comparison Attribute | Component Score | Member 1 Information | Member 2 Information | Auxiliary Information |
| Name | s_n | i1_n | i2_n | Num exact match |
| | | | | Num phonetic match |
| | | | | Num initial match |
| | | | | Tokens compared |
| SSN | s_s | i1_s | i2_s | Edit distance |
| Birth date | s_b | i1_b | i2_b | Edit distance |
| Address/phone | s_a | i1_a | i2_a | Addr edit dist Phone edit dist |
| Gender | s_g | i1_g | i2_g | |
| e-mail | s_e | i1_e | i2_e | |
| Total | s | i1 | i2 | |

Here, s is the total score comparing member 1 to member 2 and is the sum of the component scores:

$$s = s\_n + s\_s + s\_b + s\_a + s\_g + s\_e$$

The amount of "information" for the members is obtained by scoring the member against itself. For member 1, i1 is the total score comparing it to itself, and i2 is the score obtained by comparing member 2 to itself. The components for these information scores are also needed. This auxiliary information provides details on the comparison between the two members. These details are also needed for calculating the discrepancy probabilities.

For each of the sections below, a subset of the matched set is selected for attributes discrepancy calculations. The selection of the subset is made in a manner to ensure that the attribute in question does not impact the selection. That is, these are attribute-specific subsets. As an example, to get the name subset, only pairs whose normalized score without name is large are selected, thus generating an unbiased set. The normalization used is the smallest information for the two members. For example, $$snorm\_n=(s-s\_n)/\min((i1-i1\_n),(i2-i2\_n))$$

is greater than a threshold T_norm (with an exemplary default of 0.95) and s−s_n is greater than T_absolute (with an exemplary default value of 4) as the name subset of the matched set which is used in the discrepancy probability calculations for name.

Similarly, $$snorm\_s=(s-s\_s)/\min((i1-i1\_s),(i2-i2\_s))$$

is the normalized score for SSN computations, and the SSN subset of the matched set is all pairs where snorm_s is greater than T_norm and s−s_s is greater than T_absolute.

The weight computation may use the name matched set for attribute suffix.

Weight Calculation

Information from the unmatched set probabilities and the matched set probabilities are combined to form the actual weights. Examples of weight calculation will be described in more details below with respect to various exemplary data types.

Convergence

In estimating weights, the process iterates though successive bulk cross-matches until the weights converge to their final value. With this exemplary system, the weights convergence takes at most three iterations. After each iteration, the difference between the weight table just computed (the new one) and the one used to begin the iteration (the old one) is computed. It is not necessary to look at all the weights as they may not all be affected by change(s) in calculation. Table 3 exemplifies the information collected by the system for each attribute. As an example, for convergence, the difference in the second column ("Value") of Table 3 should be less than a predetermined amount (e.g., parameter conv_tol with a default=0.2) for all rows.

TABLE 3

Weight comparison detail

| Attribute | Value |
| --- | --- |
| Name | Between the two weight tables (old and new), calculate the absolute value of the difference on the 1) the disagreement weights, 2) the default name weight, and 3) the default phonetic weight. Calculate the maximum of these three differences. |
| SSN | Calculate the absolute value of the difference between the two weight tables (10 values). Take the maximum of these differences |
| Birth date | Calculate the absolute value of the difference between the mismatch weights for each weight table. Take the maximum of these differences. |
| Address by phone | Calculate the absolute value of the difference between the two weight tables. Take the maximum of these differences. |
| Gender | Calculate the absolute value of the difference between the mismatch weights from the two weight tables. |
| e-mail | Calculate the absolute value of the difference between the mismatch weights from the two weight tables. |
| Suffix | Ignore |

TABLE 3-continued

Weight comparison detail

Threshold Calculation

After the weights are established by an embodiment of the automatic weight generation process described above, candidate thresholds can then be calculated for the real-time system (e.g., an operational hub). A user of the real-time system can start with these candidate thresholds, review tasks and linkages of data records using these candidate thresholds, and determine the final thresholds for the system.

As mentioned above, at least two types of candidate thresholds can be generated according to one embodiment of the invention: auto-link threshold and clerical-review threshold. The candidate auto-link threshold defines file size and allowable false-positive rate. For example, let fpr be the allowable false-positive rate (e.g., default value $10^{\wedge}(-5)$), and num be the number of records in the dataset. Then the candidate auto-link threshold is $$thresh\_al=-\ln[-\ln(1-fpr)/num]/\ln \quad (10)$$

where ln is the natural (base e) logarithm.

The candidate clerical-review threshold is set based upon the desired false-negative rate. Let fnr be the desired value (e.g., if it is desired to have 95% of the duplicates to score above the clerical-review threshold, set the default to be 0.05). This value depends upon the weights calculated for matching, the fraction of the time each attribute has a valid value, and the distribution of those values. A simple bootstrap procedure can be used to determine the empirical distribution of matched-set scores and calculate the clerical-review threshold from this distribution.

For this bootstrap, the system generates a list of random members, calculates the information for each member, and forms an empirical distribution from this sample.

The bootstrap procedure comprises selecting numebt random members, with potential redundancy, in the database. A portion of the bootstrap pairs created earlier can be reused (see Table 1: Bootstrap pairs, first column, memrecno_1, memrecno_2, . . . , memrecno_numebt). Each member is scored against itself (i.e., compute the information for the member—see the Determining the Matched Set section above). Let s_1, s_2, . . . , s_numebt be the scores thus generated, s_min be the minimum of these scores, and s_max be the maximum of these scores. A table can then be created from s_min to s_max, incrementing by 0.1, to bin the scores. Table 4 below exemplifies this score distribution table, which can have $$n=(s\_max-s\_min)/0.1 \text{ rows:}$$

TABLE 4

Random set score distribution

| Value | Count | Frequency |
| --- | --- | --- |
| s_min | c_1 = number of s_i equal to s_min | f_1 = c_1/numebt |
| s_min + 0.1 | c_2 = number of s_i equal to s_min + 0.1 | f_2 = c_2/numebt |

TABLE 4-continued

Random set score distribution

| Value | Count | Frequency |
|---|---|---|
| $s\_min + 0.2$ | $c\_3$ = number of $s\_i$ equal to $s\_min + 0.2$ | $f\_3 = c\_3/$ numebt |
| ... | ... | ... |
| $s\_max$ | $c\_n$ = number of $s\_i$ equal to $s\_max$ | $f\_n = c\_n/$ numebt |

Now, let j be the first index such that $$f\_1+f\_2+\ldots+f\_j > fnr$$

then the candidate clerical-review threshold is $$thresh\_cl = s\_min+(j-1)*0.1.$$

Adaptive Update Tables

The adaptive update tables are populated during run time of the real-time system (e.g., an operational hub). They contain information on matched pairs and unmatched pairs which have been manually flagged by a user during previous review session(s). As described above, the results of people actually reviewing the linking would be useful information to feed into the automatic weight generation process and perhaps influence the determination on the matched and unmatched sets. In this example, the real-time system may record manual review results and run the iterative estimation process from step 4 to step 9 using the same set of data and incorporating the results from the manual review. This can further refine the accuracy and performance of the real-time system.

Embodiments of the invention disclosed herein can be implemented to adapt to a variety of data types. Some examples are provided below for the purpose of illustration.

1. PXNM Name Data Type 1.1 Unmatched-Set Probabilities

There are three unmatched tables for name which correspond to the three weight tables: exact match, phonetic match, and initial match. These are all based upon the name tokens without regard to position (first, last, middle). Select all name tokens (including those of length 1 character) from compd. Say there are nt total unique tokens. Create a temporary frequency table which looks like:

TABLE 5

Name token frequency table

| tok_1 | $p\_1$ = count_1/tottok |
| tok_2 | $p\_2$ = count_2/tottok |
| ... | ... |
| tok_nt | $p\_nt$ = count_nt/tottok |

Where tok_j are the unique name tokens and count_j is the number of times the particular token appears. Note the system counts tokens, not members. Thus, if a member has the name JOE JOE SMITH, it counts two JOE tokens and one SMITH token. The system also determines the number of tokens, tottok=count_1+count_2+...+count_nt. This table may be ordered by decreasing frequency so that $$p\_1 \geq p\_2 \geq p\_3 \geq \ldots \geq p\_nt.$$

The unmatched table used to create the exact-match weights is generated from the exact table, which is exemplified in Table 6 below. Not all tokens are put into the exact table. Only the most common ones are used and the rest is assigned a default value. The table cutoff length can be specified in a couple of ways, one of which is by cumulative frequency. For example, suppose it is desired that the table covers a certain percentage (e.g., 80%) of the name tokens, the system may set a "cut percent" parameter with a default value of 0.8. To find the table length, first find the first index k such that $$p\_1+p\_2+p\_3+\ldots+p\_k > cutpercent.$$

Then the weight table will contain name tokens tok_1, tok_2, tok_3, ..., tok_k only and the exact table for the unmatched probabilities finally looks like Table 6. At this point, after truncation, the order of the tokens is immaterial.

TABLE 6

Unmatched probabilities for exact name match

| Token | Probability | Unmatched Probability |
|---|---|---|
| tok_1 | $p\_1$ | $(p\_1)\hat{}2$ |
| tok_2 | $p\_2$ | $(p\_2)\hat{}2$ |
| ... | ... | ... |
| tok_k | $p\_k$ | $(p\_k)\hat{}2$ |
| Default | $p\_k+1 + p\_k+2 + p\_k+3 + \ldots + p\_nt$ | $(p\_k+1)\hat{}2 + (p\_k+2)\hat{}2 + (p\_k+3)\hat{}2 + \ldots + (p\_nt)\hat{}2$ |

The phonetic weight table is derived from the name token frequency table (see Table 5: Name token frequency table). Calculate the phonetic code for all name tokens tok_1, tok_2, ..., tok_nt with length greater than 1 character (i.e., non-initials). Say the result of this are phtok_1, phtok_2, ..., phtok_pnt. The frequencies and unmatched probabilities for these tokens are calculated from the frequencies of the name tokens which generate the same phonetic code.

Say that phtok_k is the code for name tokens tok_k_1, tok_k_2, ... tok_k_nk (that is there are nk name tokens which have this phonetic code). Then the probability of this phonetic token is the sum of the probabilities for the individual name tokens, so $$php\_k = p\_k\_1 + p\_k\_2 + p\_k\_3 + \ldots + p\_k\_nk$$

and the unmatched probability is $$uphp\_k = (php\_k)\hat{}2 - ((p\_k\_1)\hat{}2 + (p\_k\_2)\hat{}2 + \ldots + (p\_k\_nk)\hat{}2)$$

The phonetic probabilities cannot be used directly in the weighting because they do not take into account the spread of names which form the phonetic group. To account for this, a spread function is used:

$$phs\_k = -(\ln(p\_k\_1/php\_k)*p\_k\_1 + \ln(p\_k\_2/php\_k)*p\_k\_2 + \ldots + \ln(p\_k\_nk/php\_k)*p\_k\_nk)/ph\_k.$$

Here ln is the natural (base e) logarithm. As an example, if the phonetic group only contains one name token, the spread function is 0. In the other direction, if the phonetic group contains 10 distinct name tokens which are equally likely (i.e., $p\_n\_k = 1/10$) then the spread function returns 2.302 (which is ln(10)).

Now, sum the product of the spread and the probabilities overall phonetic codes, $$phnorm = php\_1*phs\_1 + php\_2*phs\_2 + \ldots + php\_npt*phs\_npt$$

and create the normalized frequencies for the phonetic groups as $$phnp\_k = php\_k*phs\_k/phnorm.$$

Table 7 below exemplifies the table of phonetic codes and probabilities sorted by frequency in descending order:

TABLE 7

Phonetic token frequency

| Token | Probability | Unmatched Probability |
|---|---|---|
| phtok_1 | phnp_1 | uphp_1 |
| phtok_2 | phnp_2 | uphp_2 |
| ... | ... | ... |
| phtok_npt | phnp_npt | uphp_npt |

Where $phnp\_1 \geq phnp\_2 \geq \ldots \geq phnp\_pt$.

The cut percentage technique described above can be applied to the phonetic name table as well. First, find the first index j so that:

$$phnp\_1 + phnp\_2 + phnp\_3 + \ldots + phnp\_j > \text{cutpercent}$$

Table 8 exemplifies the final phonetic table. Again, after truncation, the order of the tokens is immaterial.

TABLE 8

Unmatched probabilities for phonetic name match

| Token | Probability | Unmatched Probability |
|---|---|---|
| phtok_1 | phnp_1 | uphp_1 |
| phtok_2 | phnp_2 | uphp_2 |
| ... | ... | ... |
| phtok_j | phnp_j | uphp_j |
| Default | phnp_j + 1 + phnp_j + 2 + ... + phnp_npt | uphp_j + 1 + uphp_j + 2 + ... + uphp_npt |

The initial table is used to match single character tokens to multi-character tokens only. Exact match of a single character token to another single character token is handled in the exact table. The initial table uses frequencies from the single character tokens along with the distribution of the first character of the name tokens. From the name frequency table (see Table 5: Name token frequency table), get the frequencies of the single character tokens in compd and generates a table like the following:

TABLE 9

Initial token frequency

| l_1 | ip_1 = dflr(count_l_1)/totinit |
|---|---|
| l_2 | ip_2 = dflr(count_l_2)/totinit |
| ... | ... |
| l_n | ip_n = dflr(count_l_n)/totinit |

Where count_l_k is the number of times the single character l_k appears, etc. Here totinit=dflr(count_l_1)+dflr(count_l_2)+dflr(count_l_3)+ . . . +dflr(count_l_n) is the total number of single character tokens.

Now calculate the distribution of the first characters of all the name tokens whose length is greater than 1. Say that tokens tok_l_1_1, tok_l_1_2, tok_l_1_3, . . . tok_l_1_m are all the tokens with length greater than 1 that begin with the character l_1, then set $$fcp\_l\_1 = p\_l\_1\_1 + p\_l\_1\_2 + p\_l\_1\_3 + \ldots + p\_l\_1\_m$$

Similarly, calculate fcp_l_2, fcp_l_3, . . . , fcp_l_n for the remaining initials. If for any j, fcp_l_j is zero, replace it with ip_l_j (which is not zero since the floor function was applied to the initial counts). Most of the edit distance estimates require a floor on the distribution to keep the numbers away from zero. An exemplary floor function dflr(x) may take the form of dflr(x)=max(x, 10).

As with the names, sort the tokens by decreasing frequency and find the first j such that $$ip\_l\_1 + ip\_l\_2 + ip\_l\_3 + \ldots + ip\_l\_j > \text{cutpercent}.$$

Then, the initial table looks like Table 10 below:

TABLE 10

Unmatched probabilities for initial matches

| Token | Probability | Unmatched Probability |
|---|---|---|
| ip_l_1 | ip_l_1 | ip_l_1 * fcp_l_1 |
| ip_l_2 | ip_l_2 | ip_l_2 * fcp_l_2 |
| ... | ... | ... |
| ip_l_j | ip_l_j | ip_l_j * fcp_l_j |
| Default | ip_l_j + 1 + ip_l_j + 2 + ... + ip_l_n | (ip_l_j + 1 * fcp_l_j + 1) + (ip_l_j + 2 * fcp_l_j + 2) + ... (ip_l_n * fcp_l_n) |

Note that while Table 10 has a cutoff, in most English applications there will not be a default weight and the table will have length 26. Applications implemented in other languages such as Japanese, Chinese, and so on may have a default weight and/or different cutoffs.

1.2 Default Discrepancy Probabilities

The three default discrepancy name probabilities are given in the following table:

TABLE 11

Default name discrepancy probabilities

| Comparison | Matched Probability (Default) |
|---|---|
| Name - exact | dnp1 = 1 − (2 * q_d) |
| Name - phonetic | dnp2 = 0.9 * q_d |
| Name - initial | dnp3 = 0.8 * q_d | q_d is the data quality parameter as described above.

1.3 Discrepancy Probabilities

These counts are obtained from the name subset of the matched set. For each pair, collect the number of tokens that match exactly (ct1_k), the number that match on phonetic (ct2_k), the number that match on initials-to-name (ct3_k), and the number of tokens compared for this pair (nt_k). Then, accumulate these counts across all pairs in the name subset such that $$ct\_\text{exact} = ct1\_1 + ct1\_2 + ct1\_3 + \ldots + ct1\_numnm$$

$$ct\_\text{phonetic} = ct2\_1 + ct2\_2 + ct2\_3 + \ldots + ct2\_numnm$$

$$ct\_\text{initial} = ct3\_1 + ct3\_2 + ct3\_3 + \ldots + ct3\_numnm$$

$$num\text{comp} = nt\_1 + nt\_2 + nt\_3 + \ldots + nt\_numnm$$

where numnm is the number of pairs in the name subset. The discrepancy table then looks like this:

TABLE 12

Name discrepancy table

| Comparison | Matched Probability | Counts |
|---|---|---|
| Name - exact | dnp1 = (ct_exact)/numcomp | numcomp |
| Name - phonetic | dnp2 = (ct_phonetic)/ (numcomp − ct_exact) | (numcomp − ct_exact) |
| Name - initial | dnp3 = (ct_initial)/(numcomp − ct_exact) | (numcomp − ct_exact) |

Note that the count field does need to be retained for the initial weight computation iteration. However, when the initial weight run finishes, these counts can be retained for the adaptive weighting updates described above.

1.4 Weight Calculation

1.4.1 Exact Match Weights

In Table 6, a weight for each token is created (see Table 6: Unmatched probabilities for exact name match), including the default weight. Each row from that table has the token in the first column, a probability value (p1) for that token in the second column and an unmatched probability value (p2) for that token in the third column. Table 8: Unmatched probabilities for phonetic name match (for the first cross-match, use the discrepancy values from Table 11: Default name discrepancy probabilities) contains the name-exact probability (dnp1). Thus, the weight for this token is $$wt = \text{Log}(dnp1 * p1/p2).$$

Do this for each row of Table 6: Unmatched probabilities for exact name match.

1.4.2 Phonetic Match Weights

Phonetic match weights are calculated in the same manner. For each row in Table 7: Phonetic token frequency, including the default phonetic weight, there are a probability value (pp1) and an unmatched probability value (pp2). Table 8: Unmatched probabilities for phonetic name match (for the first cross-match, use the discrepancy values from Table 11: Default name discrepancy probabilities) has the name-phonetic matched probability (dnp2) and the weight is given by $$wt = \text{Log}(dnp2 * pp1/pp2).$$

Do this for each row of Table 7: Phonetic token frequency.

1.4.3 Initial Match Weights

Initial matched weights are calculated using the values in Table 9: Initial token frequency. Table 9 has a probability in the second column of the table (ip1) and an unmatched probability in the third column (ip2) for each initial. The name-initial matched probability is dnp3 from Table 8: Unmatched probabilities for phonetic name match (for the first cross-match, use the discrepancy values from Table 8: Unmatched probabilities for phonetic name match). The initial match weight is $$wt = \text{Log}(dnp3 * ip1/ip2).$$

1.4.4 Disagreement Weight

The name disagreement weight has two components. The first component is derived from the matched set probabilities in Table 8: Unmatched probabilities for phonetic name match (for the first cross-match, use the discrepancy values from Table 11: Default name discrepancy probabilities). Set $$p\_m = 1 - (dnp1 + dnp2 * (1 - dnp1) + dnp3 * (1 - dnp1)).$$

The second component is obtained by summing the entries in the third columns of Table 6: Unmatched probabilities for exact name match, Table 7: Phonetic token frequency, and Table 8: Unmatched probabilities for phonetic name match. Let p_u_1 be the sum of the third column (the unmatched probability column) from Table 6: Unmatched probabilities for exact name match p_u_2 be the sum of the third column from Table Table 1: Bootstrap pairs, and p_u_3 be the sum of the third column from Table 9: Initial token frequency. Then the second component of the disagreement weight is $$p\_u = 1 - (p\_u\_1 + (1 - p\_u\_1) * (p\_u\_2 + p\_u\_3)).$$

The name disagreement weight is $$wt = \text{Log}(p\_m / p\_u).$$

2. QXNM Name Data Type

2.1 Token Table

Select all name tokens (including those of length 1 character) from compd. Say there are nt total unique tokens. Create a temporary frequency table which looks like:

TABLE 13

| Name token frequency table | |
|---|---|
| tok_1 | p_1 = count_1/tottok |
| tok_2 | p_2 = count_2/tottok |
| ... | ... |
| tok_nt | p_nt = count_nt/tottok |

Where tok_j are the unique name tokens, and count_j is the number of times the particular token appears. Note the system is counting tokens, not members. Thus, if a member has the name JOE JOE SMITH, the system would count this as two JOE tokens and one SMITH token. The system also counts the number of tokens, tottok=count_1+count_2+ . . . + count_nt. This table can be ordered by decreasing frequency so that $p\_1 \geq p\_2 \geq p\_3 \geq \ldots \geq p\_nt$.

The unmatched table used to create the exact-match weights is generated from Table 14: Unmatched probabilities for exact name match. Not all tokens are put into the weight table, but rather only the most common ones are used in the table. The rest is assigned a default value. The table cutoff can be specified in many ways, including by cumulative frequency. For example, suppose it is desired for the table to cover a certain percentage (e.g., 35%) of the name tokens, call this value cut percent. It should be a parameter (e.g., "cutpercent") with a default value (e.g., 0.35). To find the table length, find the first index k such that $$p\_1 + p\_2 + p\_3 + \ldots + p\_k > \text{cutpercent}.$$

Then the weight table will contain name tokens tok_1, tok_2, tok_3, . . . , tok_k only and the exact table for the unmatched probabilities finally looks like Table 14 below. At this point, after truncation, the order of the tokens is immaterial.

TABLE 14

| Unmatched probabilities for exact name match | | |
|---|---|---|
| Token | Probability | Unmatched Probability |
| tok_1 | p_1 | $(p\_1)^2$ |
| tok_2 | p_2 | $(p\_2)^2$ |
| ... | ... | ... |
| tok_k | p_k | $(p\_k)^2$ |
| Default | p_k+1 + p_k+2 + p_k+3 + . . . + p_nt | $(p\_k+1)^2 + (p\_k+2)^2 + (p\_k+3)^2 + \ldots + (p\_nt)^2$ |

2.2 Unmatched Disagreement Probabilities

To calculate unmatched disagreement probabilities, generate a set of random pairs, compare the names, and accumulate counts for each comparison result. Examples:

J:BARRY:ADAMS compared to JOHN:ADAMS would yield one initial match, one exact match and two possible matches.

FRED:MICHAEL:SMITH compared to JOHN:M:JONES would yield one initial match, and three possible matches.

As shown in Table 15: Name discrepancy, different comparison functions are used to calculate unmatched probabilities for different type of names.

TABLE 15

| Name discrepancy | |
|---|---|
| Comparison | Unmatched Probability |
| Name - exact | up_exact = unm_e/unm_total |
| Name - phonetic | up_phonetic = unm_p/unm_total |
| Name - nickname | up_nickname = unm_n/unm_total |
| Name - NickPhone | up_nickphone = unm_np/unm_total |
| Name - EditDist | up_editDist = unm_ed/unm_total |
| Name - initial | up_initial = unm_i/unm_total |
| Disagreement | up_disagreement = (unm_total − (unm_e + unm_p + unm_np + unm_ed + unm_i))/unm_total |

The following variables are used in Table 15: Name discrepancy:
the number of tokens that match exactly (unm_e),
the number whose original names match phonetically and don't match exactly (unm_p),
the number that match via the nickname table with no phonetic mapping and don't match by any of the above criteria (unm_n),
the number that match via the nickname table with phonetic matching and don't match by any of the above criteria (unm_np),
the number that are within 20% via edit distance and that don't match by any of the above criteria (unm_ed),
the number the number that match on initials-to-name and don't match by any of the above criteria (unm_i), and
the number possible matches (or the least number tokens in the two strings) unm_total.

2.3 Matched Probabilities

These counts are obtained from the name subset of the matched set. For each pair, collect:
the number of tokens that match exactly (mat_e_k),
the number whose original names match phonetically and don't match exactly (mat_p_k),
the number that match via the nickname table with no phonetic mapping and don't match by any of the above criteria (mat_n_k),
the number that match via the nickname table with phonetic matching and don't match by any of the above criteria (mat_np_k),
the number that are within 20% via edit distance and that don't match by any of the above criteria (mat_ed_k),
the number that match on initials-to-name (mat_i_k), and
the number of possible matches for this pair (mat_nt_k).

Then, accumulate these counts across all pairs in the name subset. This is shown in Table 16 below.

TABLE 16

| Name discrepancy | | |
|---|---|---|
| Comparison | Matched Probability | Counts |
| Name - exact | mp_exact = mat_e/mat_total | matched_numcomp |
| Name - phonetic | mp_phonetic = mat_p/mat_total | matched_phonetci |
| Name - nickname | mp_nickname = mat_n/mat_total | Matched_nickname |
| Name - NickPhone | mp_nickphone = mat_np/mat_total | Matched_nickphone |
| Name - EditDist | Mp_editDist = mat_ed/mat_total | Matched_editDist |
| Name - initial | Mp_initial = mat_i/mat_total | matched_init |
| Disagreement | mp_disagreement = (mat_total − (mat_e + mat_p + mat_np + mat_ed + mat_i))/mat_total | |

The count field does need to be retained for the initial weight computation iteration. When the initial weight run finishes, these counts can be retained for the adaptive weighting updates.

2.4 Weight Calculation
2.4.1 Exact Match Weights

A weight is created for each token in Table 14: Unmatched probabilities for exact name match, including the default weight. Each row from Table 14 has the token in the first column, a probability value (p1) for that token in the second column and an unmatched probability value (p2) for that token in the third column. Table 16: Name discrepancy contains the name-exact probability (dnp1). Thus, the weight for this token is $$wt = \text{Log}(mp\_exact \cdot p1/p2).$$

Do this for each row of Table 14: Unmatched probabilities for exact name match.

2.4.2 Penalties

The penalties are computed using the probabilities computed in sections 2.2 Unmatched Disagreement Probabilities and 2.3 Matched Probabilities. Table 17 below shows how to compute the penalties. In these formulas, the marginal exact match weight is used:

$$\text{Marginal\_Exact} = \log 10(mp\_exact/up\_exact).$$

TABLE 17

| Penalties | |
|---|---|
| Penalty | Formula |
| Phonetic Match Penalty | Marginal_Exact − log10(mp_phonetic/up_phonetic) |
| Nickname Match Penalty | Marginal_Exact − log10(mp_nickname/up_nickname) |
| Nickname-Phonetic Match Penalty | Marginal_Exact − log10(mp_nickphone/up_nickphone) |
| Edit Distance Penalty | Marginal_Exact − log10(mp_editDist/up_editDist) |
| Initial to Non-Initial Match Penalty | Marginal_Exact − log10(mp_init/up_init) |

2.4.3 Disagreement Weight

The token disagreement weight is computed using the formula:

$$\text{Token Disagreement} = \log 10(mp\_disagreement/up\_disagreement).$$

3. SSN Data Type
3.1 Unmatched-Set Probabilities

The SSN comparison uses edit distance, and the unmatched probability tables are generate using the random pair samples stored in Table. For this discussion, assume the un-normalized Levenshtein edit distance. This distance function returns an integer value between 0 (exact match) and 9. For each of the member pairs in the table, extract the two SSNs from the appropriate compd records and compare them using the edit distance. If either member does not have an SSN, then the pair is ignored. If the members have multiple values, create all possible comparisons. These edit distance outcomes are tabulated for all pairs in the table. The result is a table like the following

TABLE 18

SSN unmatched counts

| Edit Distance | Count |
|---|---|
| 0 | dflr( count_0) |
| 1 | dflr( count_1) |
| ... | ... |
| 9 | dflr( count_9) |

Where count_j is the number of pairs whose SSN edit distance is j. The function dflr(x) is the floor on the counts described above. The values are normalized by $tot\text{count}=dflr(\text{count}\_0)+dflr(\text{count}\_1)+\ldots+dflr(\text{count}\_9).$ This creates a table like the following:

TABLE 19

Unmatched probabilities for SSN edit distance

| Edit Distance | Unmatched probability |
|---|---|
| 0 | dflr( count_0)/totcount |
| 1 | dflr( count_1)/totcount |
| ... | ... |
| 9 | dflr( count_9)/totcount |

The table is then saved. This same process is used for alt_id (i.e. any single attribute which is compared using edit distance) as well.

3.2 Default Discrepancy Probabilities 3.2.1 1-Dimensional Edit Distance

The default discrepancy probabilities for 1-dimensional edit distance tables (e.g., SSN, birth date), are calculated analytically based upon data quality (q_d) and the length of the table (n). Suppose the table has entries for edit distances 0, 1, 2, ..., n−1. The default discrepancy probability for edit distance k is $wtn\_k=(1-q\_d)*(0.2^k)*0.8/(1-0.2^n)+q\_d/n.$ An example of an SSN table where q_d=0.05 and n=10 is shown below.

TABLE 20

Default 1-dimensional discrepancy table example

| Edit Distance | Matched Probability (Default) |
|---|---|
| 0 | 0.756 |
| 1 | 0.157 |
| 2 | 0.035 |
| 3 | 0.011 |
| ... | |
| 9 | 0.005 |

3.3 Discrepancy Probabilities

The SSN comparison uses edit distance, and the matched probability tables are generated from calculating this edit distance on the SSN subset of the matched set. The un-normalized Levenshtein edit distance returns an integer value between 0 (exact match) and 9. For each of the member pairs in the subset, extract the two SSNs and compare them using the edit distance. If either member does not have an SSN, then the pair is ignored. If the members have multiple values, create all possible comparisons but only take the best (i.e., the one with the lowest score). These edit distance outcomes are tabulated for all pairs in a table as shown below:

TABLE 21

SSN discrepancy table

| Edit Distance | Matched Probability |
|---|---|
| 0 | dflr( count_0)/totcount |
| 1 | dflr( count_1)/totcount |
| ... | ... |
| 9 | dflr( count_9)/totcount |
| Count | totcount |

Here, count_j is the number of pairs from the SSN subset of the matched set whose edit distance score is j, dflr(x) is the floor function, and $tot\text{count}=dflr(\text{count}\_0)+dflr(\text{count}\_1)+dflr(\text{count}\_2)+\ldots+dflr(\text{count}\_9).$ 3.4 Weight Calculation Pure edit-distance weights include weights include weights for SSN, Alt-ID, and address/phone. Here, the weight is the log (base 10) of the ratio of the matched set probability divided by the unmatched set probability. As an example, to calculate the weight associated with an SSN edit distance of 0, take the matched probability (p_m) from Table 21: SSN discrepancy table (for the first cross match, use Table 20: Default 1-dimensional discrepancy table example) for the row corresponding to 0 and the unmatched probability from Table 19: Unmatched probabilities for SSN edit distance for the row corresponding to 0 (call it p_u) then the weight for 0 is log(p_m/p_u).

4. Birth Date Data Type 4.1 Unmatched-Set Probabilities

Birth date matching is a hybrid comparison using both frequency and edit distance described above. Thus, two tables are required.

First, a frequency table is created for birth year only. For example:

TABLE 22

Birth year frequency table

| year_1 | yp_1 = count_1/totyrs |
| year_2 | yp_2 = count_2/totyrs |
| ... | ... |
| year_ny | yp_ny = count_ny/totyrs |

Where count_j is the number of times year_j appears in a birth date. The table is ordered by decreasing frequency so $yp\_1 \geq yp\_2 \geq \ldots \geq yp\_ny$. To truncate this table, find the first index k such that $yp\_1+yp\_2+yp\_3+\ldots+yp\_k > \text{cutoff}.$ Then the year frequency table is given by (store this table sorted by year with the default value at the top of the list):

TABLE 23

Unmatched probabilities for birth year match

| Token | Probability | Unmatched Probability |
|---|---|---|
| year_1 | yp_1 | $(yp\_1)^2$ |
| year_2 | yp_2 | $(yp\_2)^2$ |
| ... | ... | ... |
| year_k | yp_k | $(yp\_k)^2$ |
| Default | yp_k + 1 + yp_k + 2 + yp_k + 3 + ... + yp_ny | $(yp\_k + 1)^2 + (yp\_k + 2)^2 + (yp\_k + 3)^2 + ... + (yp\_ny)^2$ |

Then, an edit table is created for birth date. This works exactly like the SSN example above. For each of the member pairs in the table, extract the two birth dates from the appropriate compds and compare them using the edit distance. If either member does not have a birth date, then the pair is ignored. These edit distance (un-normalized Levenshtein distance) outcomes are tabulated for all pairs in the table. The result is a table like the following

TABLE 24

Birth year unmatched counts

| Edit Distance | Count |
|---|---|
| 0 | dflr( count_0) |
| 1 | dflr( count_1) |
| ... | ... |
| 8 | dflr( count_8) |

Where count_j is the number of pairs whose birth date edit distance is j. The values are normalized by $$totcount = dflr(\text{count}\_0) + dflr(\text{count}\_1) + ... + dflr(\text{count}\_8).$$

This results a table, which is saved, that looks like the following:

TABLE 25

Unmatched probabilities for birth date edit distance

| Edit Distance | Unmatched probability |
|---|---|
| 0 | dflr( count_0)/totcount |
| 1 | dflr( count_1)/totcount |
| ... | ... |
| 8 | dflr( count_8)/totcount |

4.2 Default Discrepancy Probabilities 4.2.1 1-Dimensional Edit Distance

The default discrepancy probabilities for 1-dimensional edit distance tables (e.g. SSN, birth date), are calculated analytically based upon q (as above) and the length of the table has entries for edit distances 0, 1, 2, ..., n−1. The default discrepancy probability for edit distance k is $$wtn\_k = (1-q)*0.8/(1-0.2^n) + q/n.$$

An example of a birth date table where q_d=0.05 and n=9 is shown below.

TABLE 26

Default 1-dimensional discrepancy table example

| Edit Distance | Matched Probability (Default) |
|---|---|
| 0 | 0.766 |
| 1 | 0.158 |
| 2 | 0.036 |
| 3 | 0.012 |
| ... | |
| 8 | 0.006 |

4.3 Discrepancy Probabilities

The birth date comparison uses edit distance, and the matched probability tables are generated from calculating this edit distance on the birth date subset of the matched set. This is the same process used for SSN. The un-normalized Levenshtein edit distance returns an integer value between 0 (exact match) and 8. For each of the member pairs in the subset, extract the two birth dates and compare them using the edit distance. If either member does not have a birth date, then the pair is ignored. If the members have multiple values, create all possible comparisons but only take the best (i.e., the one with the lowest score). These edit distance outcomes are tabulated for all pairs in the table. The discrepancy table for birth date looks like the following:

TABLE 27

Birth date discrepancy table

| Edit Distance | Matched Probability |
|---|---|
| 0 | dflr( count_0)/totcount |
| 1 | dflr( count_1)/totcount |
| ... | ... |
| 8 | dflr( count_8)/totcount |
| Count | totcount |

Here, count_j is the number of pairs from the birth date subset of the matched set whose edit distance score is j, dflr(x) is the floor function, and $$totcount = dflr(\text{count}\_0) + dflr(\text{count}\_1) + dflr(\text{count}\_2) + ... + dflr(\text{count}\_8).$$

4.4 Weight Calculation

The birth date weight table has two parts. The first component of the birth date weights is an edit-distance table for edit distances of 1, 2, or 3. The edit-distance table has an entry for 0 edit distance, but it is set to zero—when the birth dates match exactly, the weight is obtained from the birth year table. These weights are generated from the unmatched probability table, Table 25: Unmatched probabilities for birth date edit distance, and the matched probability table, Table 27: Birth date discrepancy table (or Table 25: Unmatched probabilities for birth date edit distance for the first cross match). Each of these has an entry for edit distances 0 through 8. Let p_u_0, p_u_1, ..., p_u_8 denote these values from Table 25: Unmatched probabilities for birth date edit distance, and p_m_0, p_m_1, ..., p_m_8 denote those from Table 27: Birth date discrepancy table. Then the weights for edit distances 1, 2, and 3 are given by:

$$wt\_1 = \text{Log}(p\_m\_1/p\_u\_1);$$

$$wt\_2 = \text{Log}(p\_m\_2/p\_u\_2); \text{ and}$$

$$wt\_3 = \text{Log}((p\_m\_3 + p\_m\_4 + ... + p\_m\_8)/(p\_u\_3 + p\_u\_4 + ... + p\_u\_8)).$$

The second component of the birth date weights is the year weight table which is derived from the data in Table 23: Unmatched probabilities for birth year match. A weight is created for each year in this table, including the default year, using the probability value (p_1) from column 2 and the unmatched probability value (p_2) from column 3. Then the weight associated with this year token is $$wt = \text{Log}((p\_m\_0) * p\_1 * 365 / p\_2).$$

Do this for each row in Table 23: Unmatched probabilities for birth year match.

5. Address by Phone Data Type

5.1 Unmatched-Set Probabilities

The address and phone unmatched probability table is created using sampling similar to the SSN table. One difference is that a two-dimensional table is generated here, which adds some complications. Any pair can have both an address distance and a phone distance, just an address distance, or just a phone distance. In this case, the normalized Levenshtein distance is used so the return is an integer between 0 and 10 for both attributes. Collect counts of the results similar to the following table. For this discussion, the floor function is included in the description of the counts:

TABLE 28

Unmatched edit distance counts for address by phone

|  | Null | 0 | 1 | 2 | ... | 10 |
|---|---|---|---|---|---|---|
| Null |  | pct_0 | pct_1 | pct_2 | ... | pct_10 |
| 0 | act_0 | ct_0_0 | ct_0_1 | ct_0_2 | ... | ct_0_10 |
| 1 | act_1 | ct_1_0 | ct_1_1 | ct_1_2 | ... | ct_1_10 |
| 2 | act_2 | ct_2_0 | ct_2_1 | ct_2_2 | ... | ct_2_10 |
| ... |  |  |  |  |  |  |
| 10 | act_10 | ct_10_0 | ct_10_1 | ct_10_2 | ... | ct_10_10 |

Here, ct_j_k is the number of sample pairs where the address edit distance is j and the phone edit distance is k limited by the floor function (i.e., ct_j_k=dflr(number of sample pairs where address edit distance is j and the phone edit distance is k)), pct_k is the number of pairs with phone alone and the phone edit distance is k, limited by the floor function, and act_j is the number of pairs with address alone and the edit distance is j, limited by the floor function. Calculate the number of pairs where both address and phone are compared:

$$totap = ct\_0\_0 + ct\_0\_1 + \ldots + ct\_0\_10 + ct\_1\_0 + \ldots + ct\_10\_0 + \ldots + ct\_10\_10.$$

For the marginal distributions (those just involving one or the other), combine the edit distance results from the single comparisons with those from the true two-dimensional comparisons. So, for phone the sum along the columns:

$$tpct\_0 = pct\_0 + ct\_0\_0 + ct\_1\_0 + ct\_2\_0 + \ldots + ct\_10\_0$$

$$tpct\_1 = pct\_1 + ct\_0\_1 + ct\_1\_1 + ct\_2\_1 + \ldots + ct\_10\_1$$

$$tpct\_2 = pct\_2 + ct\_0\_2 + ct\_1\_2 + ct\_2\_2 + \ldots + ct\_10\_2$$

...

$$tpct\_10 = pct\_10 + ct\_0\_10 + ct\_1\_10 + ct\_2\_10 + \ldots + ct\_10\_10$$

For address, the sum along the rows:

$$tact\_0 = act\_0 + ct\_0\_0 + ct\_0\_1 + ct\_0\_2 + \ldots + ct\_0\_10$$

$$tact\_1 = act\_1 + ct\_1\_0 + ct\_1\_1 + ct\_1\_2 + \ldots + ct\_1\_10$$

$$tact\_2 = act\_2 + ct\_2\_0 + ct\_2\_1 + ct\_2\_2 + \ldots + ct\_2\_10$$

...

$$tpct\_10 = pct\_10 + ct\_10\_0 + ct\_10\_1 + ct\_10\_2 + \ldots + ct\_10\_10$$

And the sums:

$$totp = tpct\_0 + tpct\_1 + \ldots + tpct\_10$$

$$tota = tact\_0 + tact\_1 + \ldots + tact\_10$$

Then the final unmatched probability table looks like:

TABLE 29

Unmatched probabilities for address by phone edit distance

|  | Null | 0 | 1 | 2 | ... | 10 |
|---|---|---|---|---|---|---|
| Null |  | tpct_0/totp | tpct_1/totp | tpct_2/totp | ... | tpct_10/totp |
| 0 | tact_0/tota | ct_0_0/totap | ct_0_1/totap | ct_0_2/totap | ... | ct_0_10/totap |
| 1 | tact_1/tota | ct_1_0/totap | ct_1_1/totap | ct_1_2/totap | ... | ct_1_10/totap |
| 2 | tact_2/tota | ct_2_0/totap | ct_2_1/totap | ct_2_2/totap | ... | ct_2_10/totap |
| ... |  |  |  |  |  |  |
| 10 | tact_10/tota | ct_10_0/totap | ct_10_1/totap | ct_10_2/totap | ... | ct_10_10/totap |

5.2 Default Discrepancy Probabilities

5.2.1 2-Dimensional Edit Distance

The default discrepancy weights for 2-dimensional tables are calculated by taking the outer product of two 1-dimensional tables. This extends to higher dimension as well.

As an example, to get the default discrepancy table for address-by-phone, first calculate a 1-dimensional table with 11 entries (call these wk11_0, wk11_1, ..., wk11_10 corresponding to 0, 1, ..., 10, see formula in section 3.2.1 1-dimensional Edit Distance). These entries form the marginal row and column. The interior is the product, as illustrated in Table 30 below.

TABLE 30

Default address-by-phone discrepancy table

|  | Null | 0 | 1 | 2 | ... | 10 |
|---|---|---|---|---|---|---|
| Null |  | wk11_0 | wk11_1 | wk11_2 | ... | wk11_10 |
| 0 | wk11_0 | wk11_0* wk11_0 | wk11_0* wk11_1 | wk11_0* wk11_2 | ... | wk11_0* wk11_10 |
| 1 | wk11_1 | wk11_1* wk11_0 | wk11_1* wk11_1 | wk11_1* wk11_2 | ... | wk11_1* wk11_10 |
| 2 | wk11_2 | wk11_2* wk11_0 | wk11_2* wk11_1 | wk11_2* wk11_2 | ... | wk11_2* wk11_10 |
| ... |  |  |  |  |  |  |
| 10 | wk11_10 | wk11_10* wk11_0 | wk11_10* wk11_1 | wk11_10* wk11_2 | ... | wk11_10* wk11_10 |

5.3 Discrepancy Probabilities

The address-by-phone discrepancy tables are calculated by calculating edit distance on the address/phone subset of the matched set. As with the unmatched probability tables, two attributes are considered simultaneously. When compare two members from the address/phone subset of the matched set, several distances can be obtained, for instance, both a phone and an address distance (if both members have at least one valid value for both address and phone), only a phone distance (if one member has no valid address but both have a valid phone values), only an address distance (if one member has no valid phone but both have a valid address), or null. Member pairs where no comparison is possible are ignored.

TABLE 31

Matched edit distance counts for address by phone

|  | Null | 0 | 1 | 2 | ... | 10 |
|---|---|---|---|---|---|---|
| Null |  | pct_0 | pct_1 | pct_2 | ... | pct_10 |
| 0 | act_0 | ct_0_0 | ct_0_1 | ct_0_2 | ... | ct_0_10 |
| 1 | act_1 | ct_1_0 | ct_1_1 | ct_1_2 | ... | ct_1_10 |
| 2 | act_2 | ct_2_0 | ct_2_1 | ct_2_2 | ... | ct_2_10 |
| ... |  |  |  |  |  |  |
| 10 | act_10 | ct_10_0 | ct_10_1 | ct_10_2 | ... | ct_10_10 |

More specifically, $ct\_i\_j = dflr$(number of pairs with address edit distance is $i$ and the phone edit distance is $j$);

$pct\_j = dflr$(number of pairs with phone distance $j$ where there is no valid address comparison);

$act\_i = dflr$(number of pairs with address distance $i$ where there is no valid phone comparison); and $totap = ct\_0\_0 + ct\_0\_1 + \ldots + ct\_0\_10 + ct\_1\_0 + \ldots + ct\_1\_10 + \ldots + ct\_10\_0 + \ldots + ct\_10\_10.$ For the marginal distributions (those involving phone alone or address alone), combine the edit distance results from the single comparisons with those from the true two-dimensional comparisons. So, for phone, the sum along the columns:

$tpct\_0 = pct\_0 + ct\_0\_0 + ct\_1\_0 + ct\_2\_0 + \ldots + ct\_10\_0;$ $tpct\_1 = pct\_1 + ct\_0\_1 + ct\_1\_1 + ct\_2\_1 + \ldots + ct\_10\_1;$ $tpct\_2 = pct\_2 + ct\_0\_2 + ct\_1\_2 + ct\_2\_2 + \ldots + ct\_10\_2;$

...

$tpct\_10 = pct\_10 + ct\_0\_10 + ct\_1\_10 + ct\_2\_10 + \ldots + ct\_10\_10.$

For address, the sum along the rows:

$tact\_0 = act\_0 + ct\_0\_0 + ct\_0\_1 + ct\_0\_2 + \ldots + ct\_0\_10;$ $tact\_1 = act\_1 + ct\_1\_0 + ct\_1\_1 + ct\_1\_2 + \ldots + ct\_1\_10;$ $tact\_2 = act\_2 + ct\_2\_0 + ct\_2\_1 + ct\_2\_2 + \ldots + ct\_2\_10;$

...

$tpct\_10 = pct\_10 + ct\_10\_0 + ct\_10\_1 + ct\_10\_2 + \ldots + ct\_10\_10.$

And the sums:

$totp = tpct\_0 + tpct\_1 + \ldots + tpct\_10;$ $tota = tact\_0 + tact\_1 + \ldots + tact\_10.$ This results a final matched probability table that looks like the following:

TABLE 32

Address-by-phone discrepancy table

|  | Null | 0 | 1 | 2 | ... | 10 |
|---|---|---|---|---|---|---|
| Null |  | tpct_0/totp | tpct_1/totp | tpct_2/totp | ... | tpct_10/totp |
| 0 | tact_0/tota | ct_0_0/totap | ct_0_1/totap | ct_0_2/totap | ... | ct_0_10/totap |
| 1 | tact_1/tota | ct_1_0/totap | ct_1_1/totap | ct_1_2/totap | ... | ct_1_10/totap |
| 2 | tact_2/tota | ct_2_0/totap | ct_2_1/totap | ct_2_2/totap | ... | ct_2_10/totap |
| ... |  |  |  |  |  |  |
| 10 | tact_10/tota | ct_10_0/totap | ct_10_1/totap | ct_10_2/totap | ... | ct_10_10/totap |

To support the adaptive update, the three counts are saved:

| | |
|---|---|
| Total address/phone | totap |
| Total address | tota |
| Total phone | totp |

5.4 Weight Calculation

The pure edit-distance weights include SSN, Alt-ID, and address/phone. Here, the weight is the log (base 10) of the ratio of the matched set probability divided by the unmatched set probability. As an example, to calculate the weight associated with an SSN edit distance of 0, take the matched probability from Table 31: Matched edit distance counts for address by phone (or Table 30: Default address-by-phone discrepancy table for the first cross match) for the row corresponding to 0 (call it p_m) and the unmatched probability from Table 29: Unmatched probabilities for address by phone edit distance for the row corresponding to 0 (call it p_u) then the weight for 0 is log(p_m/p_u).

6. Gender Data Type

6.1 Unmatched-Set Probabilities

The gender unmatched table is a simple table based upon the frequency of gender in compval. The table looks like:

TABLE 33

| Unmatched probabilities for gender match | | |
|---|---|---|
| Gender | Probability | Unmatched probability |
| M | ct_m/totgc | (ct_m/totgc)$\hat{}$2 |
| F | ct_f/totgc | (ct_f/totgc)$\hat{}$2 |

Where ct_m is the number of compd records where the gender is male, ct_f is the number that are female, and totgc=ct_m+ct_f.

6.2 Default Discrepancy Probabilities
6.2.1 Exact Match Discrepancy

Other comparisons (e.g. gender, e-mail, and suffix), have a single discrepancy value. The default is 1−q_d.

6.3 Discrepancy Probabilities

The gender discrepancy probability is a single value since the comparison result is either "agree" or "disagree". For all pairs in the gender subset of the matched set, let:

ct_mat=the number of pairs where the genders agree, and ct_miss=the number of pairs where the genders disagree.

Again, pairs without valid genders on one or both members are ignored. Then the discrepancy table for gender may look like the following:

TABLE 34

| Gender discrepancy table | | |
|---|---|---|
| Comparison | Matched Probability | Count |
| Gender - exact | ct_mat/(ct_mat + ct_miss) | (ct_mat + ct_miss) |

6.4 Weight Calculation

The gender weights use the unmatched probabilities in Table 33: Unmatched probabilities for gender match and the matched probability in Table 34: Gender discrepancy table. There are two rows in Table 33: Unmatched probabilities for gender match, M and F each with a probability value and an unmatched probability value (call these p_m_1 and p_m_2 for male and p_f_1 and p_f_2 for female. Let p_e be the exact match probability from Table 34: Gender discrepancy table. Then the match weight for male is $$wt\_m = \text{Log}(p\_e * p\_m\_1/p\_m\_2).$$

The weight for a match on female is $$wt\_f = \text{Log}(p\_e * p\_f\_1/p\_f\_2).$$

And the disagreement weight for gender is $$wt = \text{Log}((1-p\_e)/(1-p\_m\_2-p\_f\_2)).$$

7. E-Mail Address Data Type

7.1 Unmatched-Set Probabilities

For email, an exact-match comparison is used. That is, there is one weight regardless of the value of the attribute. From an abstract sense, this is a comparison similar to the exact match component of the name except with a default value for match.

Begin by calculating the frequency of e-mail address from compd. An exemplary e-mail frequency counts table is shown below:

TABLE 35

| e-mail frequency counts | |
|---|---|
| em_1 | emct_1 |
| em_2 | emct_2 |
| ... | ... |
| em_net | emct_net |

Where emct_k is the count of the number of times e-mail address em_k is in compd. Then the e-mail unmatched probability table looks like the following:

TABLE 36

| Unmatched probabilities for e-mail match | | |
|---|---|---|
| | Probability | Unmatched probability |
| Default | 1 | (emct_1/totem)$\hat{}$2 + (emct_2/totem)$\hat{}$2 + . . . + (emct_net/totem)$\hat{}$2 |

7.2 Default Discrepancy Probabilities
7.2.1 Exact Match Discrepancy

Other comparisons (e.g., gender, e-mail, and suffix) have a single discrepancy value. The default is 1−q_d.

7.3 Discrepancy Probabilities

The e-mail discrepancy probability is also a single value. For all pairs in the e-mail subset of the matched set, let:

ct_emat=the number of pairs where the e-mail addresses agree, and ct_emiss=the number of pairs where the email addresses disagree.

Pairs without valid e-mail addresses on one or both members are ignored. Thus, the discrepancy table for e-mail may look like the following:

TABLE 37 e-mail discrepancy table

| Comparison | Matched Probability | Count |
|---|---|---|
| e-mail - exact | ct_emat/(ct_emat + ct_emiss) | (ct_emat + ct_emiss) |

7.4 Weight Calculation

The weight for e-mail address is similar to that of gender. One difference is that at this time there is only one value to the table (i.e., there is only a match weight and a mismatch weight). This calculation uses the unmatched probabilities ($p\_1$ and $p\_2$) from Table 36: Unmatched probabilities for e-mail match ($p\_1$ is the element in the second column $p\_1$ and $p\_2$ is the value in the third column—note that for a single row table, $p\_1=1$) and the matched probabilities from Table 37: e-mail discrepancy table (call this value $p\_e$). Then the weight for a match on e-mail is:

$$wt = \text{Log}((1-p\_e)*p\_1/p\_2).$$

And the weight for disagreement is:

$$wt = \text{Log}(p\_e/p\_2).$$

8. Suffix Data Type
8.1 Unmatched-Set Probabilities

The suffix unmatched probability table is a simple table based upon the frequency of the suffix values. Suppose suffix values are $s\_1, s\_2, s\_3, \ldots s\_n$. Other values are also possible as systems implementing other cultures are anticipated. Let $$sct\_j = \text{count of number of suffix tokens } s\_j$$

and the total number of tokens, $$totsf = sct\_1 + sct\_2 + \ldots + sct\_n,$$

Then the suffix probabilities are $$sfp\_k = sct\_k/totsf.$$

Order the tokens by decreasing probability so that $sfp\_1 \geq sfp\_2 \geq \ldots \geq sfp\_n$ and truncate this list by finding the first $nk$ so that $$sfp\_1 + sfp\_2 + \ldots + sfp\_nk > cutsuf.$$

Then the suffix table looks like the following:

TABLE 38

Unmatched probabilities for suffix matches

| Suffix | Probability | Unmatched probability |
|---|---|---|
| s_1 | sfp_1 | (sfp_1)^2 |
| s_2 | sfp_2 | (sfp_2)^2 |
| ... | | |
| s_nk | sfp_nk | (sfp_nk)^2 |
| Default | sfp_nk + 1 + sfp_nk + 2 + ... + sfp_n | (sfp_nk + 1 + sfp_nk + 2 + ... + sfp_n)^2 |

Where $ct\_jr$ is the count of the suffix values that equal JR, $ct\_sr$ is the count that are SR, $ct\_iii$ is the number of IIIs, and $totsf$ is the total number of valid suffix values.

8.2 Default Discrepancy Probabilities
8.2.1 Exact Match Discrepancy

Other comparisons (e.g., gender, e-mail, and suffix) have a single discrepancy value. The default is $1-q\_d$.

8.3 Discrepancy Probabilities

The suffix discrepancy probability is also a single value. However, this calculation uses the name subset of the matched set (i.e., it does not have its own subset). Consider pairs where both records have a valid suffix only. Let $ct\_smat$ = the number of pairs where the suffix attributes agree; and $ct\_smiss$ = the number of pairs where the suffix attributes disagree.

Then, the discrepancy table looks like the following:

TABLE 39

Suffix discrepancy table

| Comparison | Matched Probability | Count |
|---|---|---|
| suffix - exact | ct_smat/(ct_smat + ct_smiss) | (ct_smat + ct_smiss) |

8.4 Suffix Weights

The suffix match weights are computed for each suffix in Table 38: Unmatched probabilities for suffix matches. Each row of that table has a token value (call it $s\_j$) in column 1, a probability value (call it $ps1\_j$) in column 2, and an unmatched probability value (call it $ps2\_j$) in column 3. The discrepancy weight is from Table 39: Suffix discrepancy table (call it $psd$). Then the match weight for $s\_j$ is $$wt\_j = \text{Log}((1-psd)*ps1\_j/ps2\_j)$$

and the discrepancy weight is $$wt\_d = \text{Log}(psd/(1-ps2\_1-ps2\_2-ps2\_3-\ldots-ps2\_nk)).$$

Table 40 below contains a list of exemplary parameters and possible default values.

| Parameter | Description | Default Value |
|---|---|---|
| numboot | Number of bootstrap pairs for unmatched set sample | 3,000,000 |
| q_d | Data quality for default weights | 0.05 normal 0.20 bad 0.01 good |
| T_mat | Threshold for determining matched set | 5 |
| T_norm | Normalized threshold for attribute-specific matched set | 0.95 |
| T_absolute | Un-normalized threshold for attribute-specific matched set | 4 |
| conv_tol | Tolerance for convergence of weights | 0.2 |
| fpr | Statistical false-positive rate for auto-link threshold calculation | $10^{-5}$ |
| fnr | False-negative rate for clerical-review threshold | 0.05 |
| numebt | Number of bootstrap samples for information distribution | 100,000 |
| cutpercent | Coverage percentage for name tables | 0.8 |
| cutoff | Coverage percentage for year tables | 0.8 |
| cutsuf | Coverage percentage for suffix table | 0.9 |

9. Multidimensional Simple String Data

Embodiments of the invention can be implemented to generate weights for non-numeric attributes. As an example, this section describes how to compute weights for Hair×Eye Colors, but the same technique could be used to generate weights for any pair of non-numeric attributes.

For the purpose of this discussion, the set of possible hair colors is $H_1, \ldots H_n$ and the set of possible eye colors is $E_1, \ldots E_m$.

9.1 Unmatched Probabilities

The frequency for each possible pair $H_i \times E_j$ is computed using the formula ratio:

$$UP\text{-}H_i \times E_j = (\text{\# of members with Hair} = H_i \text{ and Eye} = E_j)/(\text{\# of members that have both Hair and Eye}).$$

Separate hair and eye probabilities are also computed as follows:

$$UP\text{-}H_i = (\text{\# of members with Hair} = H_i)/(\text{\# of members that have Hair}),$$

$$UP\text{-}E_j = (\text{\# of members with Eye} = E_j)/(\text{\# of members that have Eye}).$$

For each of these probabilities, when the count in the numerator falls below a minimum value (e.g., a floor), use the floor. The unmatched disagreement is computed using the formula:

$$UP\_Disagreement = (1 - \text{sum}_{i,j}(UP\text{-}H_i \times E_j)^2).$$

9.2 Matched Probabilities

To compute matched probabilities, generate a set of sample pairs and compute the following frequencies:

$$\text{Match}\_E_{match} \times H_{match} = (\text{number of pairs where eye and hair match})/(\text{number of pairs where both members have eye and hair data})$$

$$\text{Match}\_E_{mismatch} \times H_{match} = (\text{number of pairs where eye does not match and hair matches})/(\text{number of pairs where both members have eye and hair data})$$

$$\text{Match}\_E_{match} \times H_{mismatch} = (\text{number of pairs where eye and hair does not match})/(\text{number of pairs where both members have eye and hair data})$$

$$\text{Match}\_E_{mismatch} \times H_{mismatch} = (\text{number of pairs where neither eye nor hair match})/(\text{number of pairs where both members have eye and hair data})$$

$$\text{Match}\_E_{match} = (\text{number of pairs where eye match})/(\text{number of pairs where both members have eye data})$$

$$\text{Match}\_H_{match} = (\text{number of pairs where hair matches})/(\text{number of pairs where both members hair data})$$

9.3 Computing the Weights

The agreement weights are computed using the following formula:

$$\text{Weight}\_E_i \times H_j = \log 10(\text{Match}\_E_{match} \times H_{match}/UP\text{-}H_i \times E_j).$$

The partial agreement weights are compute using the following formulas:

$$\text{Weight}\_E_{mismatch} \times H_j = \log 10(\text{Match}\_E_{mismatch} \times H_{match}/UP\text{-}H_j),$$

$$\text{Weight}\_E_i \times H_{mismatch} = \log 10(\text{Match}\_E_{match} \times H_{mismatch}/UP\text{-}E_i).$$

Finally, the disagreement weight is computed using the formula:

$$\text{Weight}\_E_{mismatch} \times H_{mismatch} = \log 10(\text{Match}\_E_{mismatch} \times H_{mismatch}/UP\_Disagreement).$$

10. Multidimensional Numeric String Data

Embodiments of the invention can be implemented to generate weights for multidimensional numeric attributes. As an example, this section describes how to compute weights for height×weight, but the same technique could be used to generate weights for any pair of numeric attributes.

Consider two sets of weights: a set of agreement weights and a 2 dimensional distance table. The standardization functions assign each height and weight value to an interval.

Assume the height intervals are $H_i, \ldots H_n$ and the weight intervals are $W_1, \ldots W_m$. For each pair $H_i \times W_j$ there is an agreement weight $\text{Weight}\_H_i \times W_j$ and for all singletons $H_i$ and $W_i$ there are partial agreement weights $\text{Weight}\_H_i \times W_{missing}$ and $\text{Weight}\_H_{missing} \times W_j$.

When two weights are compared the result is a difference which is expressed as a percentage difference and mapped to an interval. Let $WD_0 \ldots WD_R$ be these intervals. When two heights are compared the result is a difference which is expressed as an absolute difference and mapped to an interval. Let $HD_0 \ldots HD_S$ be these intervals.

Two weights or heights are considered to match exactly if there differences are in $HD_0$ or $WD_0$.

The distance table has the following format as shown in Table 41:

TABLE 41

| | Missing | $WD_0$ | $WD_1$ | ... | ... | ... | $WD_R$ |
|---|---|---|---|---|---|---|---|
| Missing | No Value | Exact | $H_{missing}\_D_1$ | ... | | | $H_{missing}\_D_n$ |
| $HD_0$ | Exact | Exact | $H_0\_D_1$ | $H_0\_D_2$ | ... | | $H_0\_D_n$ |
| $HD_1$ | $H_1\_D_{missing}$ | $H_1\_D_0$ | | | | | |
| ... | ... | ... | | | | | |
| ... | | | | ... | | | |
| ... | | | | | | | |
| $HD_S$ | $H_s\_D_{missing}$ | ... | | | | | $H_s\_D_s$ |

There is no weight for the Missing×Missing cell. There are no weights for the cell labeled Exact. The weight for these cases can be found in the exact match table. All other cells have weights.

10.1 Unmatched Probabilities

Compute the frequency for each possible pair $H_i \times W_j$, using the formula ratio:

$$UP\text{-}H_i \times W_j = (\text{\# of members with Height in interval } H_i \text{ and Eye in interval } E_j)/(\text{\# of members that have both Hair and Eye}).$$

Compute separate hair and eye probabilities:

$$UP\text{-}H_i = (\text{\# of members with Hair in interval } H_i)/(\text{\# of members that have Hair}),$$

$$UP\text{-}E_j = (\text{\# of members with Eye in interval } E_j)/(\text{\# of members that have Eye}).$$

Generate a set of random pairs and compare those pairs to product a count table that looks like the following:

TABLE 42

|  | Missing | $WD_0$ | $WD_1$ | ... ... ... | $WD_R$ |
|---|---|---|---|---|---|
| Missing | Don't Care | $RC\_H_{missing}\_W_0$ | $RC\_H_{missing}\_W_1$ |  | $RC\_H_{missing}\_W_r$ |
| $HD_0$ | $RC\_H_0\_W_{missing}$ | $RC\_H_0\_W_0$ | $RC\_H_0\_W_1$ |  | ... |
| $HD_1$ | $RC\_H_1\_W_{missing}$ | $RC\_H_1\_W_0$ | ... |  |  |
| ... |  | ... |  |  |  |
| ... |  |  |  |  |  |
| ... |  |  |  |  |  |
| $HD_S$ | $RC\_H_s\_W_{missing}$ | ... |  |  | ... $RC\_H_s\_W_r$ |

From Table 42 above, generate a random probability table that looks like the following:

TABLE 43

|  | Missing | $WD_0$ | $WD_1$ | ... ... ... | $WD_R$ |
|---|---|---|---|---|---|
| Missing |  | $RP\_H_{missing}\_W_0$ | $RP\_H_{missing}\_W_1$ |  | $RP\_H_{missing}\_W_r$ |
| $HD_0$ | $RP\_H_0\_W_{missing}$ | $RP\_H_0\_W_0$ | $RP\_H_0\_W_1$ |  | ... |
| $HD_1$ | $RP\_H_1\_W_{missing}$ | $RP\_H_1\_W_0$ | ... |  |  |
| ... |  | ... |  |  |  |
| ... |  |  |  |  |  |
| ... |  |  |  |  |  |
| $HD_S$ | $RP\_H_s\_W_{missing}$ | ... |  |  | ... $RP\_H_s\_W_r$ |

Using the following formulas:

$$RP\_H_i\_W_j = RC\_H_i\_W_j / \text{sum}_{m,n}(RC\_H_m\_W_n),$$

$$RP\_H_i\_W_{missing} = (RC\_H_i\_W_{missing} + \text{sum}_n(RC\_H_i\_W_n)) / [\text{sum}_m(RC\_H_m\_W_{missing}) + \text{sum}_{m,n}(RC\_H_m\_W_n)],$$

$$RP\_H_{missing}\_W_j = (RC\_H_{missing}\_W_j + \text{sum}_m(RC\_H_m\_W_j)) / [\text{sum}_n(RC\_H_{missing}\_W_n) + \text{sum}_{m,n}(RC\_H_m\_W_n)].$$

10.2 Matched Probabilities

Compare all matched pairs to produce a matched count table that looks like the following:

TABLE 44

|  | Missing | $WD_0$ | $WD_1$ | ... ... ... | $WD_R$ |
|---|---|---|---|---|---|
| Missing | Don't Care | $MC\_H_{missing}\_W_0$ | $MC\_H_{missing}\_W_1$ |  | $MC\_H_{missing}\_W_r$ |
| $HD_0$ | $MC\_H_0\_W_{missing}$ | $MC\_H_0\_W_0$ | $MC\_H_0\_W_1$ |  | ... |
| $HD_1$ | $MC\_H_1\_W_{missing}$ | $MC\_H_1\_W_0$ | ... |  |  |
| ... |  | ... |  |  |  |
| ... |  |  |  |  |  |
| ... |  |  |  |  |  |
| $HD_S$ | $MC\_H_s\_W_{missing}$ | ... |  |  | ... $MC\_H_s\_W_r$ |

From Table 44 above, generate a matched probability table that looks like the following:

TABLE 45

|  | Missing | $WD_0$ | $WD_1$ | ... ... ... | $WD_R$ |
|---|---|---|---|---|---|
| Missing |  | $MP\_H_{missing}\_W_0$ | $MP\_H_{missing}\_W_1$ |  | $MP\_H_{missing}\_W_r$ |
| $HD_0$ | $MP\_H_0\_W_{missing}$ | $MP\_H_0\_W_0$ | $MP\_H_0\_W_1$ |  | ... |
| $HD_1$ | $MP\_H_1\_W_{missing}$ | $MP\_H_1\_W_0$ | ... |  |  |
| ... |  | ... |  |  |  |
| ... |  |  |  |  |  |
| ... |  |  |  |  |  |
| $HD_S$ | $MP\_H_s\_W_{missing}$ | ... |  |  | ... $MP\_H_s\_W_r$ |

Using the following formulas:

$$MP\_H_i\_W_j = MC\_H_i\_W_j / \text{sum}_{m,n}(MC\_H_m\_W_n)$$

$$MP\_H_i\_W_{missing} = (MC\_H_i\_W_{missing} + \text{sum}_m(MC\_H_m\_W_n)) / [\text{sum}_m(MC\_H_m\_W_{missing}) + \text{sum}_{m,n}(MC\_H_m\_W_n)]$$

$$MP\_H_{missing}\_W_j = (MC\_H_{missing}\_W_j + \text{sum}_m(MC\_H_m\_W_j)) / [\text{sum}_n(MC\_H_{missing}\_W_n) + \text{sum}_{m,n}(MC\_H_m\_W_n)]$$

10.3 Computing the Weights:

The distance table weights are computed using the formulas:

$$H_i\_D_j = \log 10(MP\_H_i\_W_j / RP\_H_i\_W_j)$$

where i=0, ... R,missing and j=0, ... S,missing with the pairs, (0,0) (0, missing) and (missing, 0) excluded).

The exact match weights are computed using the formulas:

$$\text{Weight}\_H_i \times W_j = \log 10(MP\_H_0\_W_0 / UP\_H_i \times W_j)$$

$$\text{Weight}\_H_{missing} \times W_j = \log 10(MP\_H_{missing}\_W_0 / UP\_W_j)$$

$$\text{Weight}\_H_i \times W_{missing} = \log 10(MP\_H_0\_W_{missing} / UP\_W_j)$$

11. Business Name Weights
11.1 Computing Token Information

Before computing weights, compute the token information tables. The exact token information table is computed from the token frequency. The result of the business name standardization is a list of business name tokens. For each token t, compute the token frequency:

$$\text{ExactFreq}_t = \text{Count}_t / \text{Count}_{bn}$$

Where $\text{Count}_t$ is the number of occurrences of t in the standardized output and $\text{Count}_{bn}$ is the number of business names with non-empty standardized form.

For all tokens whose frequency is less than the cut off frequency (ExactCutFreq) 0.00001, the exact information is computed using the formula:

$$\text{ExactInfo}_t = -\ln(\text{ExactFreq}_t) \text{ (ln is the natural logarithm)}$$

The default exact info used for all other tokens is:

$$\text{DefaultExactInfo} = -\ln(\text{ExactCutFreq}).$$

11.2 Information Penalties

To compute the penalties for the partial matches, compute frequencies for matched pairs and for random pairs.

11.2.1 Matched Partial Match Frequencies

Apply the comparison logic to the matched pairs and derive the following counts:

TABLE 46

| Count | Description |
| --- | --- |
| Match_ExactMatch | The number of tokens that match exactly. |
| Match_PhoneticMatch | The number of tokens that match phonetically, but not exactly. |
| Match_NicknameMatch | The number of tokens that match via the nickname table, but don't match by any of the above criteria. |
| Match_NickPhoneMatch | The number of tokens that have a phonetic nickname match, but don't match by any of the above criteria. |
| Match_EditDistMatch | The number of tokens whose edit distance is within 20% of the longest string, but don't match by any of the above criteria. |
| Total_Compares | The total number of token compares. |

Compute the following frequencies from these counts:

Matched_Freq_ExactMatch=Match_ExactMatch/TotalCompares

Matched_Freq_PhoneticMatch=Match_PhoenticMatch/Total Compares

Matched_Freq_NicknameMatch=Match_NickNameMatch/Total Compares

Matched_Freq_NickPhoneMatch=Match_NickPhoneMatch/Total Compares

Matched_Freq_EditDistMatch=Match_EditDistMatch/Total Compares

11.2.2 Matched Offset Position Matches

When applying the business match algorithm, when a pair of tokens matches exactly or partially, compute token distance to the previous matched token. If there are any non-matching tokens between these matches a penalty is applied. Examples:

BOBS TACOS—BOBS GOOD TOCAS

In this pair a position penalty of 2 is applied to the TACOS match because the maximum distance from TACOS to BOBS is 2.

BOBS TACOS—FRIENDLY BOBS TOCOS

No position penalties are applied to either the BOBS or TACOS match. The penalties apply not to position, but to distance to the previous match.

BOBS GOOD TOCOS—BOBS MUCHO BUENO TOCO.

A position penalty of 3 would be applied to the partial match TOCOS-TOCO, because the maximum distance is 3. Note there is no relative distance for the first match in a string. So, no penalty can be applied to that string.

TABLE 47

| Count | Description |
| --- | --- |
| Count_Dist1 | The number of token pairs compared whose distance to the previous match is 1. (No extra tokens) |
| Match_Dist1 | The number of tokens that match exactly or partially and whose distance to the previous match is 1. |
| Count_Dist2 | The number of tokens compared that have a max distance of 2 to the previous match. |
| Match Dist2 | The number of tokens that match exactly or partially and whose distance to the previous match is 2. |
| Count_Dist3 | The number of tokens compared that have a max distance of 3 to the previous match. |
| Match_Dist3 | The number of tokens that match exactly or partially and whose distance to the previous match is 3. |
| Count_Dist4 | The number of tokens compared that have a max distance of 4 or more to the previous match. |
| Match_Dist4 | The number of tokens that match exactly or partially and whose distance to the previous match is 4 or more. |

Matched_Freq_MatchDist0(1,2,3,4)=Match_Dist0(1,2,3,4)/Count_Dist(1,2,3,4).

11.2.3 Unmatched Frequencies

Apply the algorithm to the unmatched frequencies and compute:

Unmatched_Freq_ExactMatch

Unmatched_Freq_PhoneticMatch

Unmatched_Freq_NicknameMatch

Unmatched_Freq_NickPhoneMatch

Unmatched_Freq_EditDistMatch

Unmatched_Freq_MatchDist0(1,2,3,4)

11.2.4 Computing the Penalties

Before computing the penalties, first compute:

ExactMatchInfo=log(Matched_Freq_ExactMatch/Unmatched_Freq_Exact_Match)

Then compute the penalties as:

Phonetic Match Penalty=ExactMatchInfo−log(Matched_Freq_PhoneticMatch/Unmatched_Freq_PhoneticMatch)

Nickname Match Penalty=Exact MatchInfo−log(Matched_Freq_NickNameMatch/Unmatched_Freq_NicknameMatch)

Phonetic Nickname Match Penalty=Exact MatchInfo−log(Matched_Freq_NickPhoneMatch/Unmatched_Freq_NickPhoneMatch)

Edit Dist Nickname Match Penalty=Exact MatchInfo−log(Matched_Freq_EditDistMatch/Unmatched_Freq_EditDistMatch)

Dist(2,3,4)Penalty=log(Matched_Freq_MatchDist1/Unmatched_Freq_MatchDist1)−log(Matched_Freq_MatchDist(2,3,4)/Unmatched_Freq_MatchDist(2,3,4))

11.3 Computing the Similarity Weights

The similarity weights reside in a 1-dimensional weight table indexed from 0, to 16. 0 is the weight for missing data and this weight is always 0. A value of 1 is interpreted as exact (or near exact match) and the similarity of the match decreases as the index increases.

11.3.1 Computing the Matched Similarity Data

For each matched pair, compare all business name pairs keeping the following Counts:

TABLE 48

| Count | Description |
|---|---|
| Matched_NamePair_Count | The number of name pairs compared. |
| Matched_Similarity_Count(1, 2, . . . 16) | The number of name pairs with similarity equal to 1, 2, . . . 16. |

Then compute:

Match_Similarity_Freq(1, 2, . . . 16)=Matched_Similarity_Count(1, 2, . . . 16)/Matched_NamePair-Count

11.3.2 Computing the Random Similarity Data

Using the same technique, but with the random pairs, compute:

Random_Similarity_Freq(1, 2, . . . 16)=Random_Similarity_Count(1, 2, . . . 16)/Random_NamePairCount

11.3.3 Computing the Weights

Finally, compute the weights, using the formula:

Similarity_Weight_(1, . . . 16)=log(Matched_Similarity_Freq/Random_Similarity_Freq)

12. International Address×Phone Weights

The Address and Phone weights are contained in a 2 dimensional table: the first dimension is the address similarity and the second dimension is the phone edit distance.

Before computing the address similarity scores, compute the address information scores and the match penalties.

12.1 Token Information

The exact token information table for non-numeric tokens is computed from the token frequency. The result of the address name standardization is a list of address tokens each is identified as either numeric or non-numeric For each non-numeric token t compute the token frequency:

ExactFreq$_t$=Count$_t$/Count$_a$

Where Count$_t$ is the number of occurrences of t in the standardized output and Count$_a$ is the number of addresses with non-empty standardized form.

For all tokens whose frequency is less than the cut off frequency (ExactCutFreq) 0.00001, the exact information is computed using the formula:

ExactInfo$_t$=−log(ExactFreq$_t$)

(ln is the natural logarithm)

The default exact info used for all other tokens is:

DefaultExactInfo=−log(ExactCutFreq)

The numeric token exact match information is determined by token length and stored in a 1-dim table. For i=1 to 10, NumericInfo$_i$=i+1.0

12.2 Penalties

This section describes how to compute the penalties required for the similarity computation.

12.2.1 Matched Data

Apply the address comparison to all matched pairs and collect counts such as those listed in Table 49 below. Note: A non-numeric compare is a comparison of two non-numeric tokens or a numeric and a non-numeric token. A numeric compare is a comparison of two numeric tokens.

TABLE 49

| Count | Description |
|---|---|
| NonNumeric_CompareCount_Matched | The total number of non-numeric comparisons. |
| NonNumeric_Exact_Matched | The total number of non-numeric comparisons resulting in an exact match. |
| NonNumeric_Phonetic_Matched | The Total number of non-numeric comparisons resulting in a phonetic match that didn't match exactly. |
| NonNumeric_Nickname_Matched | The total number of non-numeric comparisons resulting in a nickname match that didn't match by any of the above criteria. |
| NonNumeric_NickPhonetic_Matched | The total number on non-numeric comparisons resulting in a nickname-phonetic match that didn't match by any of the above criteria. |
| NonNumeric_EditDistance_Matched | The total number of non-numeric comparisons resulting in an edit distance match that didn't match by any of the above criteria. |
| Numeric_CompareCount_Matched | The total number of numeric comparisons. |
| Numeric_Exact_Matched | The total number on numeric comparisons resulting in an exact match. |
| Numeric_EditDistance_Matched | The total number of numeric comparisons resulting in an edit distance match, not in an exact match. |

Next, compute the following frequencies:

Matched_Freq_NonNumeric_Exact=NonNumeric_Exact_Matched/NonNumeric_CompareCount_Matched Matched_Freq_NonNumeric_Phonetic=NonNumeric_Phonetic_Matched/NonNumeric_CompareCount_Matched Matched_Freq_NonNumeric_Nickname=NonNumeric_Nickname_Matched/NonNumeric_CompareCount_Matched Matched_Freq_NonNumeric_NickPhonetic=NonNumeric_NickPhonetc_Matched/NonNumeric_CompareCount_Matched Matched_Freq_NonNumeric_EditDist=NonNumeric_EditDistance_Matched/NonNumeric_CompareCount_Matched Matched_Freq_Numeric_Exact=Numeric_Exact_Matched/Numeric_EditDistance_Matched Matched_Freq_Numeric_EditDist=Numeric_EditDist_Matched/Numeric_EditDistance_Matched

12.2.2 Matched Offset Position Matches

When applying the address match algorithm, when a pair of tokens matches exactly or partially, compute token distance to the previous matched token. If there are any non-matching tokens between these matches a penalty is applied. Note there is no relative distance for the first match in a string. So, no penalty can be applied to that string.

When applying the algorithm to the matched set, compute the following counts:

TABLE 50

| Count | Description |
|---|---|
| Count_Dist1 | The number of token pairs compared whose distance to the previous match is 1. (No extra tokens) |
| Match_Dist1 | The number of tokens that match exactly or partially and whose distance to the previous match is 1. |
| Count_Dist2 | The number of tokens compared that have a max distance of 2 to the previous match. |
| Match Dist2 | The number of tokens that match exactly or partially and whose distance to the previous match is 2. |
| Count_Dist3 | The number of tokens compared that have a max distance of 3 to the previous match. |
| Match_Dist3 | The number of tokens that match exactly or partially and whose distance to the previous match is 3. |
| Count_Dist4 | The number of tokens compared that have a max distance of 4 or more to the previous match. |
| Match_Dist4 | The number of tokens that match exactly or partially and whose distance to the previous match is 4 or more. |

Matched_Freq_MatchDist0(1,2,3,4)=Match_Dist0(1,2,3,4)/Count_Dist(1,2,3,4).

12.2.3 Unmatched Frequencies

Apply the algorithm to the unmatched frequencies and compute:

Unmatched_Freq_NonNumeric_Exact

Unmatched_Freq_NonNumeric_Phonetic

Unmatched_Freq_NonNumeric_Nickname

Unmatched_Freq_NonNumeric_NickPhonetic

Unmatched_Freq_NonNumeric_EditDist

Unmatched_Freq_Numeric_Exact

Unmatched_Freq_Numeric_EditDist

Unmatched_Freq MatchDist0(1,2,3,4)

12.2.4 Computing the Penalties

Before computing the penalties, first compute:

ExactMatchInfo_NonNumeric=log(Matched_Freq_NonNumeric_Exact/Unmatched_Freq_NonNumeric_Exact)

ExactMatchInfo_Numeric=log(Matched_Freq_Numeric_Exact/Unmatched_Freq_Numeric_Exact)

Then, compute the penalties as:

Phonetic Match Penalty=ExactMatchInfo_NonNumeric−log(Matched_Freq_NonNumeric_Phonetic/Unmatched_Freq_NonNumeric_Phonetic)

Nickname Match Penalty=Exact MatchInfo_NonNumeric−log(Matched_Freq_NonNumeric_NickName/Unmatched_Freq_NonNumeric_Nickname)

Phonetic Nickname Match Penalty=Exact MatchInfo_NonNumeric−log(Matched_Freq_NonNumeric_NickPhone/Unmatched_Freq_NonNumeric_NickPhone)

Edit Dist Nickname Match Penalty NonNumeric=Exact MatchInfo NonNumeric−log(Matched_Freq_NonNumeric_EditDist/Unmatched_Freq_NonNumeric_EditDist)

Edit Dist Nickname Match Penalty Numeric=Exact MatchInfo Numeric−log(Matched_Freq_Numeric_EditDist/Unmatched_Freq_Numeric_EditDist)

Dist(2,3,4)Penalty=log(Matched_Freq_MatchDist1/Unmatched_Freq_MatchDist1)−log(Matched_Freq_MatchDist(2,3,4)/Unmatched_Freq_MatchDist(2,3,4))

12.3 Computing the Final Weight Table

The final weight table for the address×phone comparison is a 2 dimensional weight table. The first (row) dimension is the address similarity. Index value 0 is missing data, 1 is exact or near exact match, and the similarity decreases as the index increases. The second (column) dimension is the phone edit distance. Index value 0 is missing data, value 1 is edit distance 0, and the edit distance increases as the index value increases.

12.3.1 Computing the Matched Data

For all matched pairs, run the address×phone compare. Each compare yields an indexed pair. The counts for each pair are maintained in a table that looks like the following:

TABLE 51

| $mc_{0,0}$ | $mc_{0,1}$ | ... | | $mc_{0,7}$ |
|---|---|---|---|---|
| $mc_{1,0}$ | ... | | | |
| ... | | | | |
| ... | | | | |
| | | | $mc_{r,c}$ | |
| ... | | | | |
| ... | | | | |
| $mc_{16,0}$ | ... | | | $mc_{16,7}$ |

To convert to frequencies, first compute to total number of comparisons where both address and phone were present:

$Count_{p\&a}=sum_{r>0,c>0}mc_{r,c}$

Now the frequencies for all pairs where both are present.

For $r>0$, and $c>0$, $mf_{r,c}=mc_{r,c}/Count_{p\&a}$

Next compute the total number of comparisons where address is present and phone may or may not be present:

$Count_p=sum_{c>0}mc_{r,c}$

Now compute marginal counts for column indexes 1, 7:

$marginalPhone_c=sum_{r>0}mc_{r,c}$

The frequencies for row index 0 are then:

$mf_{0,c}=marginalPhone_c/Count_p$

The total number of comparisons where phone and address may or may not be present is:

$Count_a=sum_{r>0}m_{r,c}$

The marginal counts for row indexes 1, 16 is:

$$marginalAddress_r = sum_{c>0} mc_{r,c}$$

The frequencies for column index 0 are then:

$$mf_{r,0} = marginalAddress_r / Count_a$$

12.3.2 Computing the Unmatched Data

Repeat the above process with unmatched pairs to compute the unmatched frequencies:

$$uf_{r,c}$$

12.3.3 Computing Edit Distance Weight Table

Use the following formula to compute the values for the final weight table:

$$Weight_{r,c} = \log 10(mf_{r,c}/uf_{r,c})$$

13. Filters Compare Functions

The table mpi_cmpspec may include some compare functions for which weights are not generated by the weight generation utility. Weights for these functions are supplied by the user. These compare functions and the associated weights can be used throughout the weight generation process described above, for example, in Determining the Matched Set. Still more specifically, these functions can be included in the computation of each pair's score which is used to determine if the pair falls above or below the threshold T_mat.

The filter functions can be included when a member is compared against itself to compute the member's information. In most cases, the result a filter function during a self compare should be zero. Including them in the self compares gives greater flexibility in the future.

The filter compare functions can also be included in the attribute-specific, normalized information scores snorm_n.

In the foregoing specification, the invention has been described with reference to specific embodiments. As one of ordinary skill in the art can appreciate, various modifications and changes can be made to the embodiments and drawings disclosed herein without departing from the scope of the present invention. In addition, many alternatives to the examples disclosed herein are possible. All such modifications and alternatives are intended to be included within the scope of present invention. Accordingly, the scope of the invention should be determined by the following claims and their legal equivalents.

What is claimed is:

1. A computer-implemented method of automatically generating weights for associating a plurality of data records from one or more data sources at one or more physical locations, comprising:
    at one or more computer systems or devices coupled to the one or more databases at the one or more physical locations;
    generating unmatched probabilities for a set of candidate data records, wherein the unmatched probabilities are computed per attribute for each pair of data records in the set of candidate data records;
    determining default discrepancy probabilities per attribute for each pair of data records in the set of candidate data records based upon a data quality parameter;
    calculating initial weights per attribute based upon the unmatched probabilities and the default discrepancy probabilities; and
    iterating a process comprising the steps of:
        comparing each pair of data records in the set of candidate data records using the initial weights per attribute;
        determining a candidate matched set with results from the comparing step;
        generating true discrepancy probabilities with scoring information from the candidate matched set;
        calculating new weights per attribute based upon the unmatched probabilities and the true discrepancy probabilities to adjust performance of the association of data records; and
        testing for weight convergence and using the new weights if a difference between the current weights and the new weights is larger than a predetermined amount.

2. The method of claim 1, further comprising loading all or a portion of the data records from a plurality of data sources.

3. The method of claim 1, further comprising generating frequency data for one or more attributes contained in the set of candidate data records.

4. The method of claim 1, further comprising generating candidate anonymous data.

5. The method of claim 4, further comprising enabling a user to review and modify a list identifying the candidate anonymous data.

6. The method of claim 1, wherein the step of determining a candidate matched set further comprises determining, for each data record, whether it scores at or above a first threshold and a second threshold, wherein the first threshold pertains to an overall match score and wherein the second threshold pertains to a percentage of a possible match per attribute type.

7. The method of claim 1, wherein the step of generating true discrepancy probabilities further comprises taking each pair of data records in the candidate matched set and calculating probabilities of matching with respect to each attribute.

8. The method of claim 1, wherein the step of testing for weight convergence further comprises:
    determining the difference between the initial weights and the new weights; and
    repeating the process using the new weights if the difference is larger than the predetermined amount.

9. The method of claim 1, further comprising calculating candidate thresholds, wherein the candidate thresholds include auto-link and clerical-review thresholds.

10. The method of claim 1, further comprising:
    recording review results, wherein the review results include information on matched pairs and unmatched pairs in the plurality of data records; and
    iterating the process using the recorded review results.

11. The method of claim 1, wherein the unmatched probabilities are generated by frequency counts, bootstrap sampling, or a combination thereof.

12. The method of claim 1, wherein the default discrepancy probabilities are determined using stored weights.

13. A system, comprising:
    at least one processor; and
    one or more computer readable storage media storing program instructions translatable by the at least one processor to implement a method of automatically generating weights for associating a plurality of data records from one or more data sources at one or more physical locations, comprising:
        generating unmatched probabilities for a set of candidate data records, wherein the unmatched probabilities are computed per attribute for each pair of data records in the set of candidate data records;
        determining default discrepancy probabilities per attribute for each pair of data records in the set of candidate data records based upon a data quality parameter;

calculating initial weights per attribute based upon the unmatched probabilities and the default discrepancy probabilities; and iterating a process comprising the steps of:
- comparing each pair of data records in the set of candidate data records using the initial weights per attribute;
- determining a candidate matched set with results from the comparing step;
- generating true discrepancy probabilities with scoring information from the candidate matched set;
- calculating new weights per attribute based upon the unmatched probabilities and the true discrepancy probabilities to adjust performance of the association of data records; and
- testing for weight convergence and using the new weights if a difference between the current weights and the new weights is larger than a predetermined amount.

14. A computer readable memory device carrying computer-executable program instructions translatable by one or more processors to implement a method of automatically generating weights for associating a plurality of data records from one or more data sources at one or more physical locations, comprising:

generating unmatched probabilities for a set of candidate data records, wherein the unmatched probabilities are computed per attribute for each pair of data records in the set of candidate data records;

determining default discrepancy probabilities per attribute for each pair of data records in the set of candidate data records based upon a data quality parameter;

calculating initial weights per attribute based upon the unmatched probabilities and the default discrepancy probabilities; and iterating a process comprising the steps of:
- comparing each pair of data records in the set of candidate data records using the initial weights per attribute;
- determining a candidate matched set with results from the comparing step;
- generating true discrepancy probabilities with scoring information from the candidate matched set;
- calculating new weights per attribute based upon the unmatched probabilities and the true discrepancy probabilities to adjust performance of the association of data records; and
- testing for weight convergence and using the new weights if a difference between the current weights and the new weights is larger than a predetermined amount.

15. A system, comprising:
at least one processor; and
one or more computer readable storage media storing program instructions executable by the at least one processor to automatically generate weights for associating data records from a plurality of data sources at one or more physical locations, wherein the program instructions when executed cause the at least one processor to perform an iteration process comprising the steps of:
- comparing each pair of data records in a set of candidate data records using current weights per attribute;
- determining a candidate matched set with results from the comparing step;
- generating true discrepancy probabilities with scoring information from the candidate matched set;
- calculating new weights per attribute based upon the unmatched probabilities and the true discrepancy probabilities to adjust performance of the association of data records; and
- repeating the iteration process using the new weights if a difference between the current weights and the new weights is larger than a predetermined amount.

16. The system of claim 15, wherein the set of candidate data records is a subset of the data records from the plurality of data sources.

17. The system of claim 15, wherein the program instructions when executed further cause the at least one processor to perform:

generating unmatched probabilities for the set of candidate data records, wherein the unmatched probabilities are computed per attribute for each pair of data records in the set of candidate data records;

determining default discrepancy probabilities per attribute for each pair of data records in the set of candidate data records based upon a data quality parameter; and calculating the current weights per attribute based upon the unmatched probabilities and the default discrepancy probabilities.

18. The system of claim 15, further comprising a user interface configured to enable a user to review and modify a list identifying candidate anonymous data derived from the data records from the plurality of data sources or a subset thereof.

19. The system of claim 15, further comprising a non-volatile memory for storing review results, wherein the review results include information on matched pairs and unmatched pairs in the data records from the plurality of data sources or a subset thereof, wherein the program instructions when executed further cause the at least one processor to perform the iteration process using the stored review results.

20. A computer readable memory device storing program instructions executable by a processor to automatically generate weights for associating data records from a plurality of data sources at one or more physical locations, wherein the program instructions when executed cause the processor to perform an iteration process comprising the steps of:
- comparing each pair of data records in a set of candidate data records using current weights per attribute;
- determining a candidate matched set with results from the comparing step;
- generating true discrepancy probabilities with scoring information from the candidate matched set;
- calculating new weights per attribute based upon the unmatched probabilities and the true discrepancy probabilities to adjust performance of the association of data records; and
- repeating the iteration process using the new weights if a difference between the current weights and the new weights is larger than a predetermined amount.

21. The computer readable memory device of claim 20, wherein the program instructions when executed further cause the processor to perform:

generating unmatched probabilities for the set of candidate data records, wherein the unmatched probabilities are computed per attribute for each pair of data records in the set of candidate data records;

determining default discrepancy probabilities per attribute for each pair of data records in the set of candidate data records based upon a data quality parameter; and calculating the current weights per attribute based upon the unmatched probabilities and the default discrepancy probabilities.

22. The computer readable memory device of claim 20, wherein the program instructions when executed further cause the processor to load the set of candidate data records.

23. The computer readable memory device of claim 22, wherein the set of candidate data records includes all or a subset of the data records from the plurality of data sources.

24. The computer readable memory device of claim 20, wherein the program instructions when executed further cause the processor to determine, for each data record, whether it scores at or above a first threshold and a second threshold, wherein the first threshold pertains to an overall match score and wherein the second threshold pertains to a percentage of a possible match per attribute type.

25. The computer readable memory device of claim 20, wherein the program instructions when executed further cause the processor to calculate candidate thresholds, wherein the candidate thresholds include auto-link and clerical-review thresholds.

26. The computer readable memory device of claim 20, wherein the program instructions when executed further cause the processor to perform the iteration process using recorded review results, wherein the recorded review results include information on matched pairs and unmatched pairs in the data records from the plurality of data source.

27. The computer readable memory device of claim 20, wherein the program instructions when executed further cause the processor to generate the unmatched probabilities by frequency counts, bootstrap sampling, and a hybrid of frequency counts and bootstrap sampling.

* * * * *